(12) United States Patent
Kihira et al.

(10) Patent No.: US 6,336,753 B1
(45) Date of Patent: Jan. 8, 2002

(54) OPTICAL DEVICE, A FABRICATING METHOD THEREOF, A DRIVING METHOD THEREOF AND A CAMERA SYSTEM

(75) Inventors: Toru Kihira; Toru Udaka, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/497,921

(22) Filed: Feb. 4, 2000

Related U.S. Application Data

(63) Continuation-in-part of application No. 09/482,983, filed on Jan. 14, 2000, now abandoned.

(30) Foreign Application Priority Data

Jan. 20, 1999 (JP) .............................. 11-011330
Jan. 22, 1999 (JP) .............................. 11-013844
May 31, 1999 (JP) .............................. 11-151468

(51) Int. Cl.[7] ................................. G02F 1/00
(52) U.S. Cl. ........................................ 396/506
(58) Field of Search ............... 396/457, 506; 349/139

(56) References Cited

U.S. PATENT DOCUMENTS 5,471,339 A * 11/1995 Ise et al. ................ 396/506 X

* cited by examiner

*Primary Examiner*—W. B. Perkey
(74) *Attorney, Agent, or Firm*—Sonnenschein, Nath & Rosenthal

(57) ABSTRACT

An optical device used for an optical filter or the like capable of controlling a light transmittance or light reflectance in a visible light region, a fabrication method thereof, a driving method thereof and a camera system are provided, including the optical device comprising a working electrode and a counter electrode in which an electrolyte is disposed in contact with both of the electrodes and light is controlled electrochemically by controlling an electric field applied to the electrolyte, and a first layer of the counter electrode present on the side of the electrolyte comprises a metal having a lower ionization tendency than that of a metal deposited at the working electrode, an optical device having a reference electrode having no direct concerns with oxidation/reduction reaction of the working electrode and the counter electrode for measuring the potential for one or both of the electrodes, a method of fabricating an optical device having a counter electrode and a reference electrode comprising a single layer or a laminate structure, comprising forming each of the layers by a gas phase film forming method or the like and forming each of the electrodes as a thin film of a predetermined pattern by etching, a method of driving the optical device by measuring the potential of the working electrode and the counter electrode to the reference electrode and controlling the supply of current as well as a camera system mounting the optical device.

105 Claims, 31 Drawing Sheets

EXAMPLE 1

COMPARATIVE EXAMPLE 2

COMPARATIVE EXAMPLE 1

COMPARATIVE EXAMPLE 3

COMPARATIVE EXAMPLE 4

COMPARATIVE EXAMPLE 5

EXAMPLE 1
(FIRST LAYER : PLATINUM)

FIG. 15 COMPARATIVE EXAMPLE 1 (FIRST LAYER : CHROMIUM)

COMPARATIVE EXAMPLE 2
(ONLY ITO)

COMPARATIVE EXAMPLE 3
(ITO WITH VAPOR DEPOSITED SILVER)

COMPARATIVE EXAMPLE 4
(FIRST LAYER: SILVER PLATE)

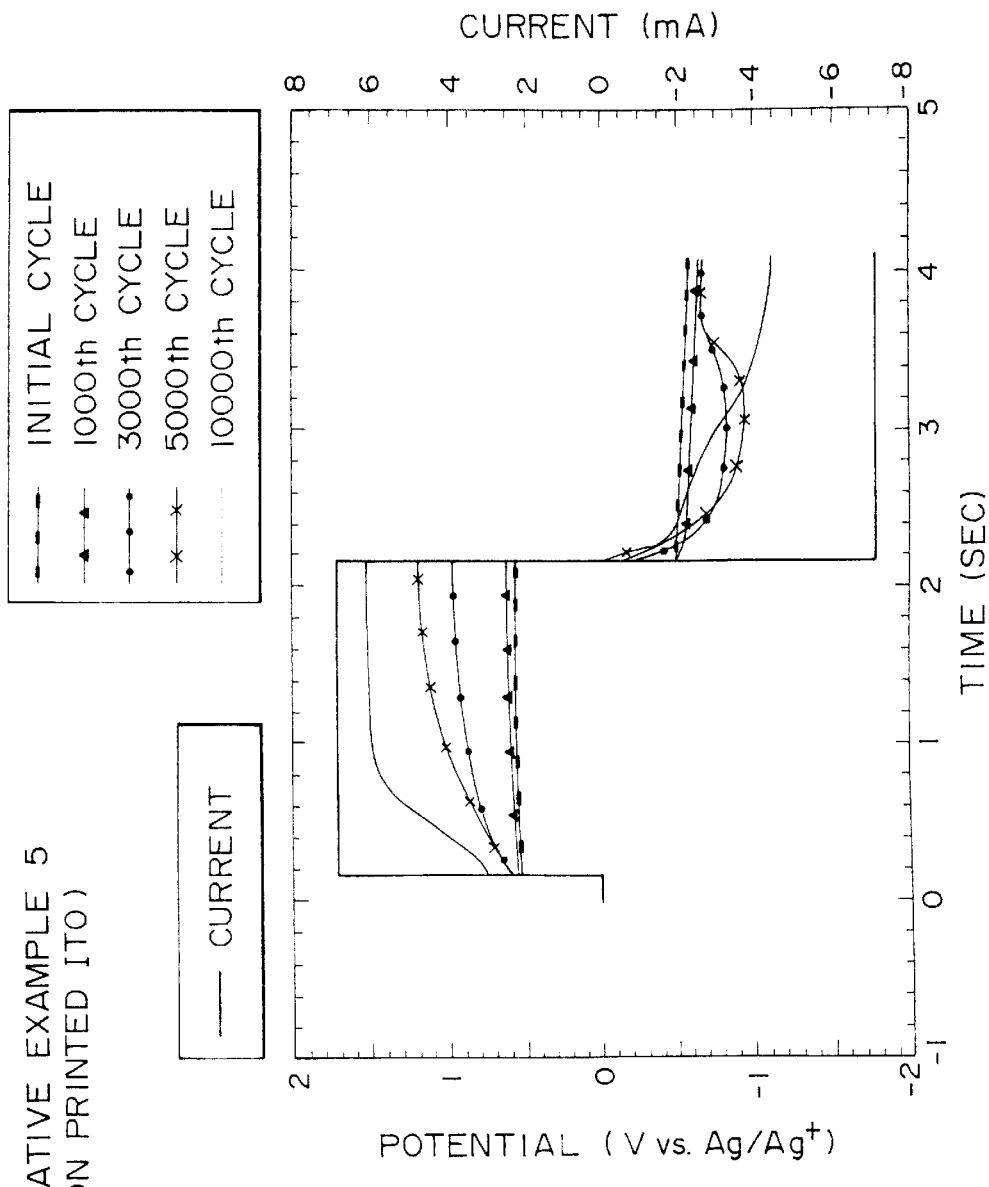
F I G. 19
COMPARATIVE EXAMPLE 5
(CARBON PRINTED ITO)

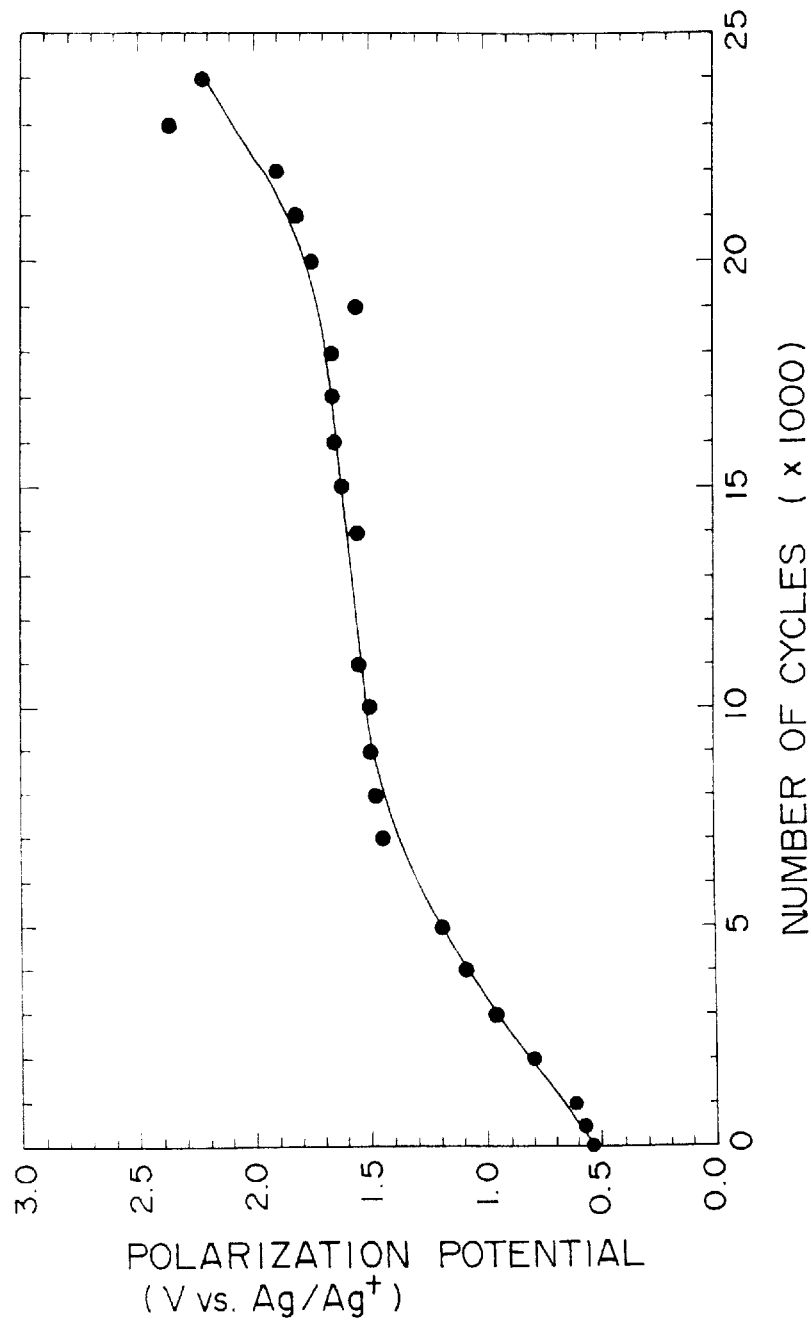

EXAMPLE 2
(SILVER-PLATED PLATINUM)

EXAMPLE 2 (SILVER-PLATED PLATINUM : AFTER REFRESHING)

EXAMPLE 4
(FIRST LAYER : GOLD)

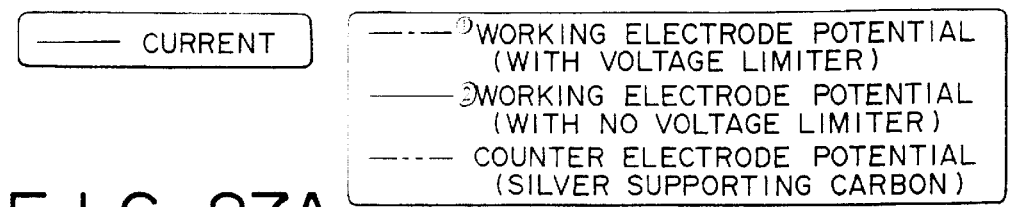
F I G. 27A
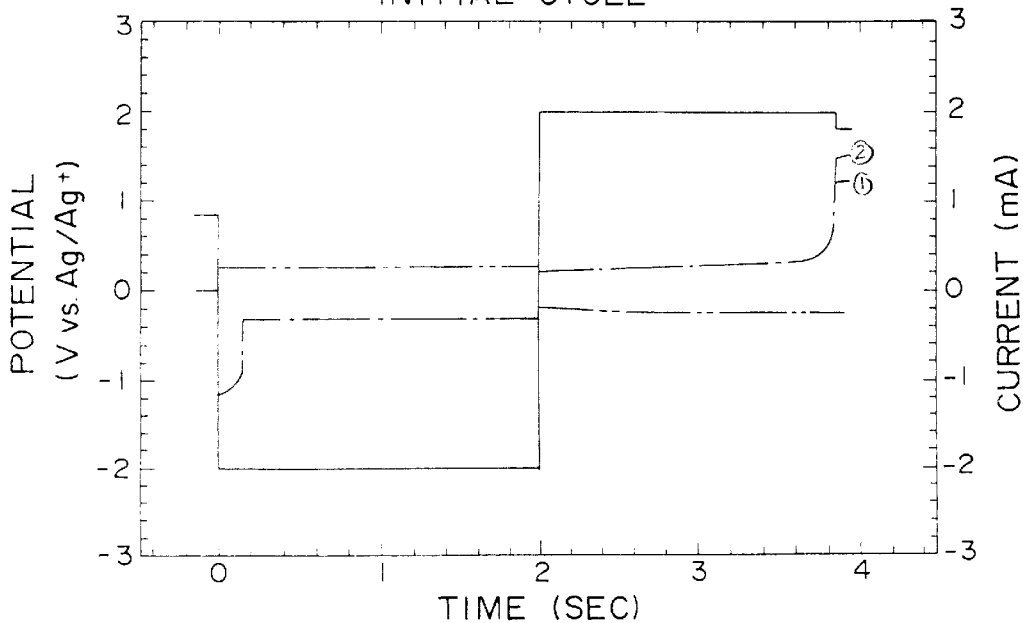
F I G. 27B
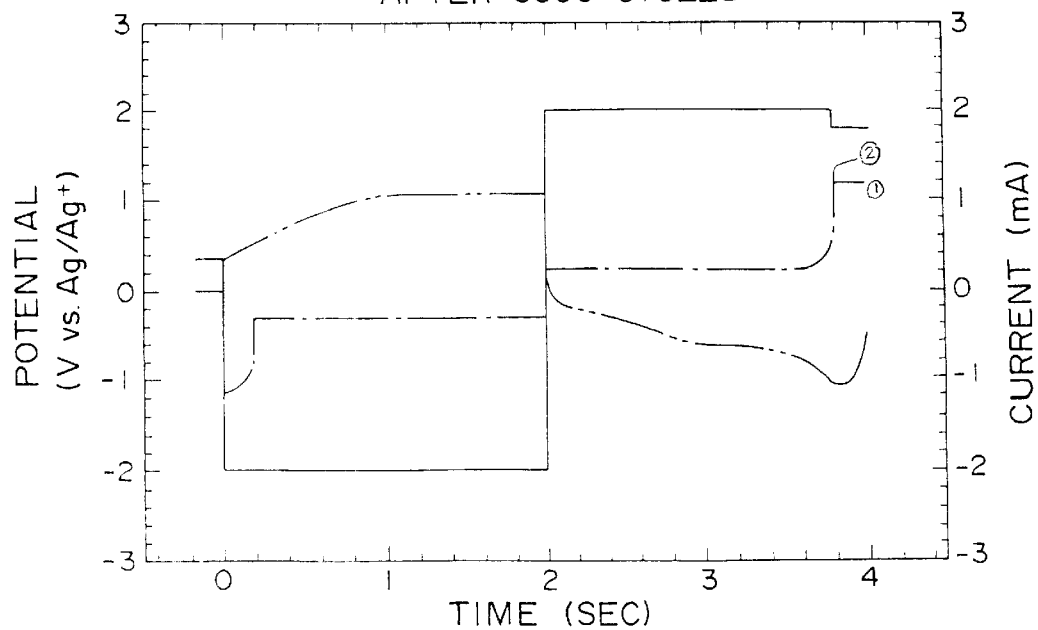

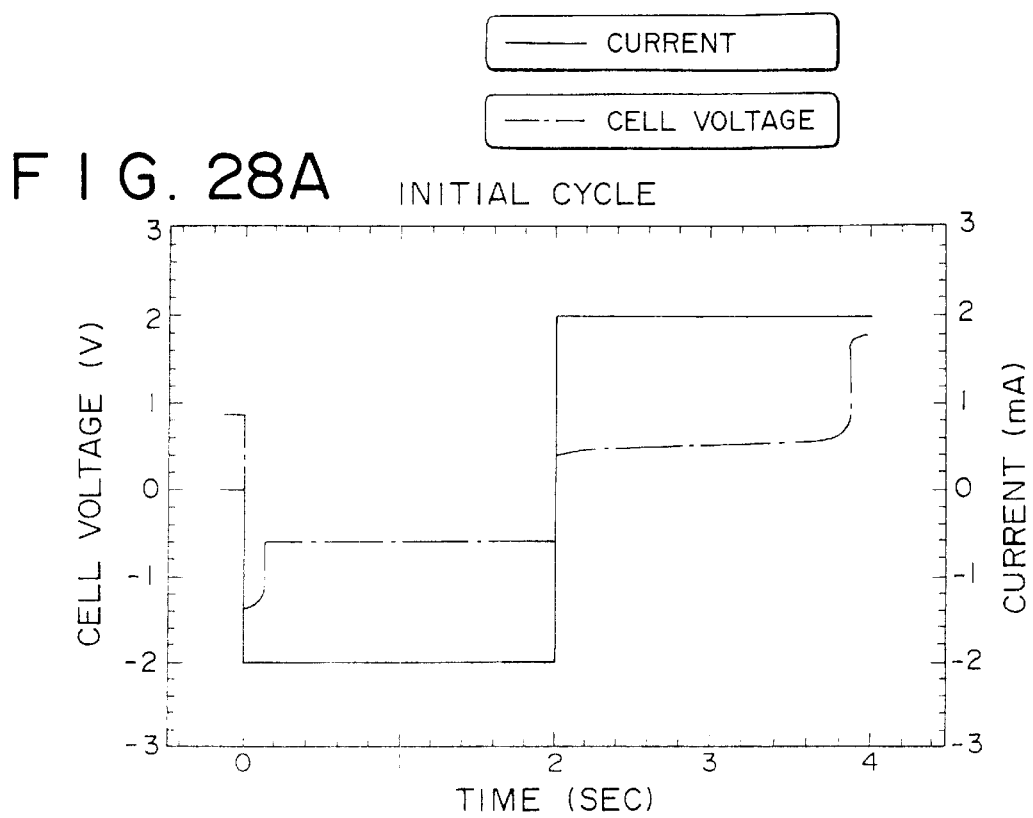
F I G. 28A  INITIAL CYCLE
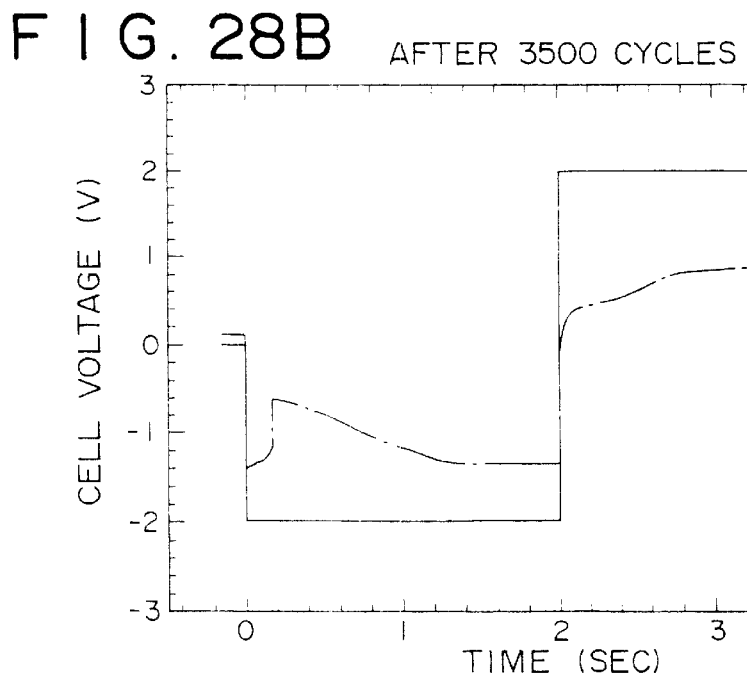
F I G. 28B  AFTER 3500 CYCLES

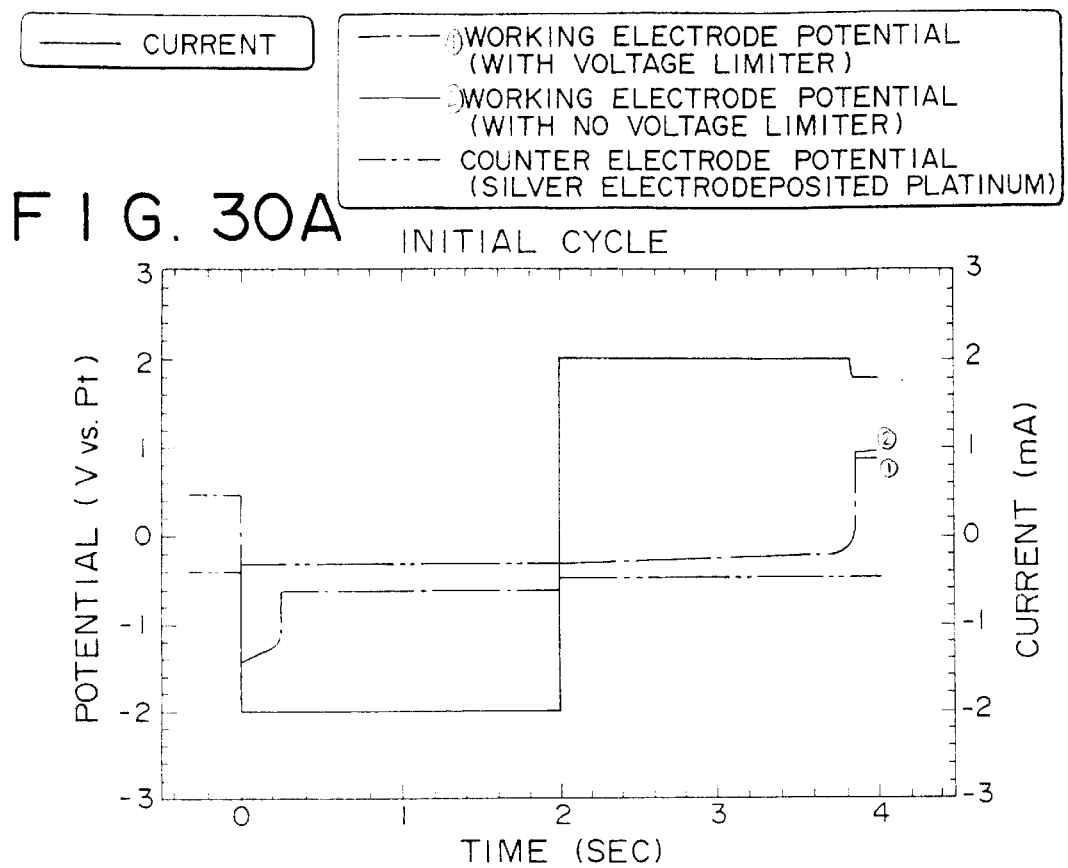
FIG. 30A INITIAL CYCLE
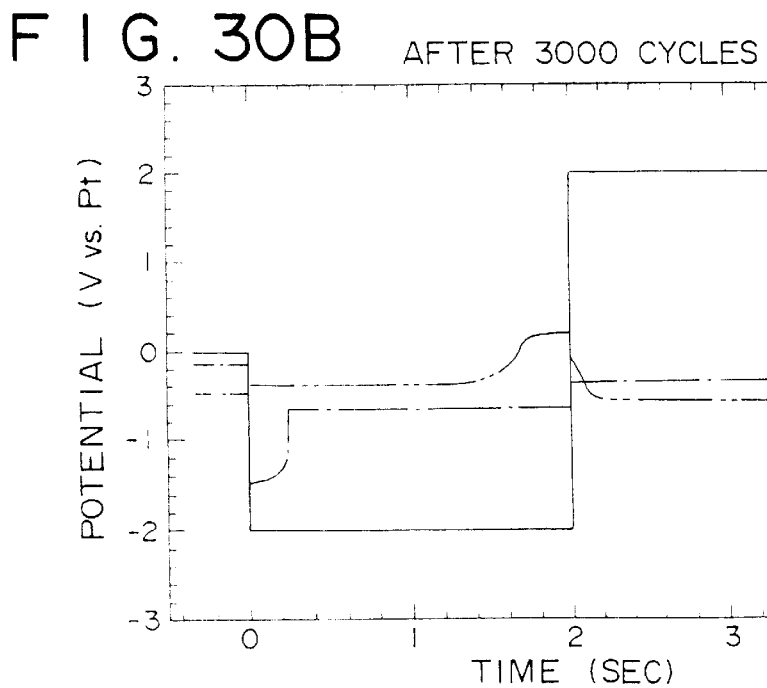
FIG. 30B AFTER 3000 CYCLES

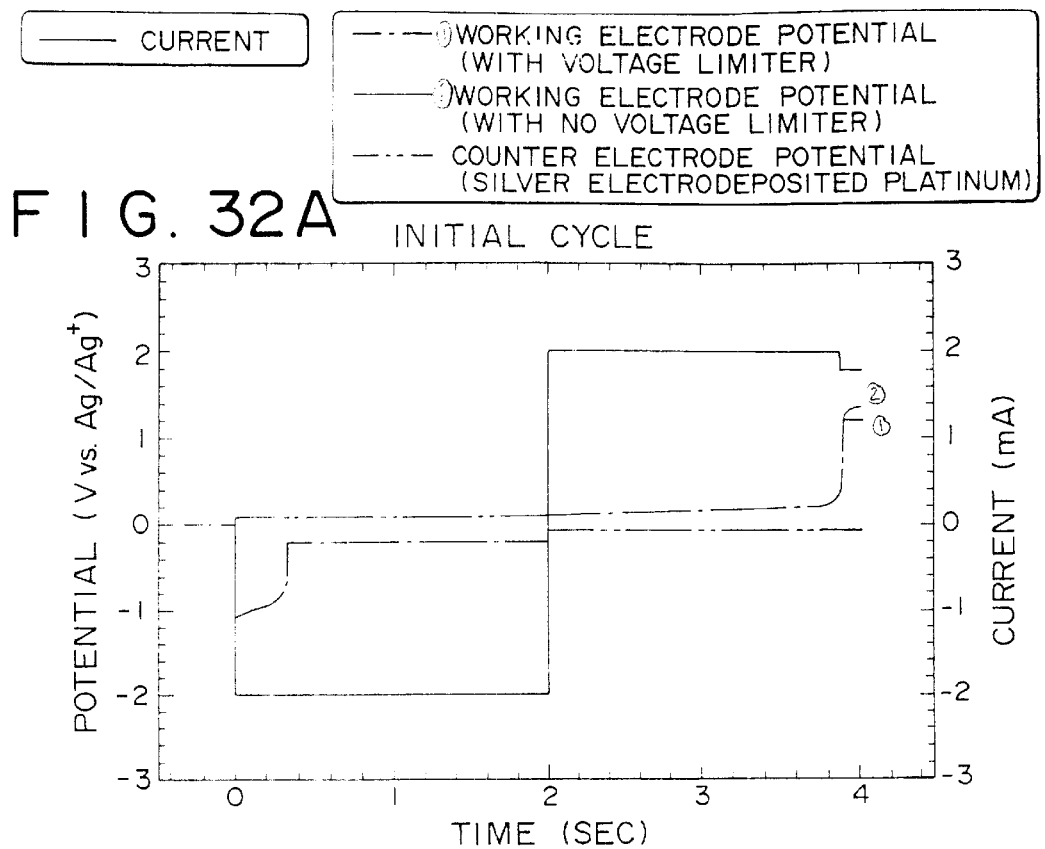
FIG. 32A INITIAL CYCLE
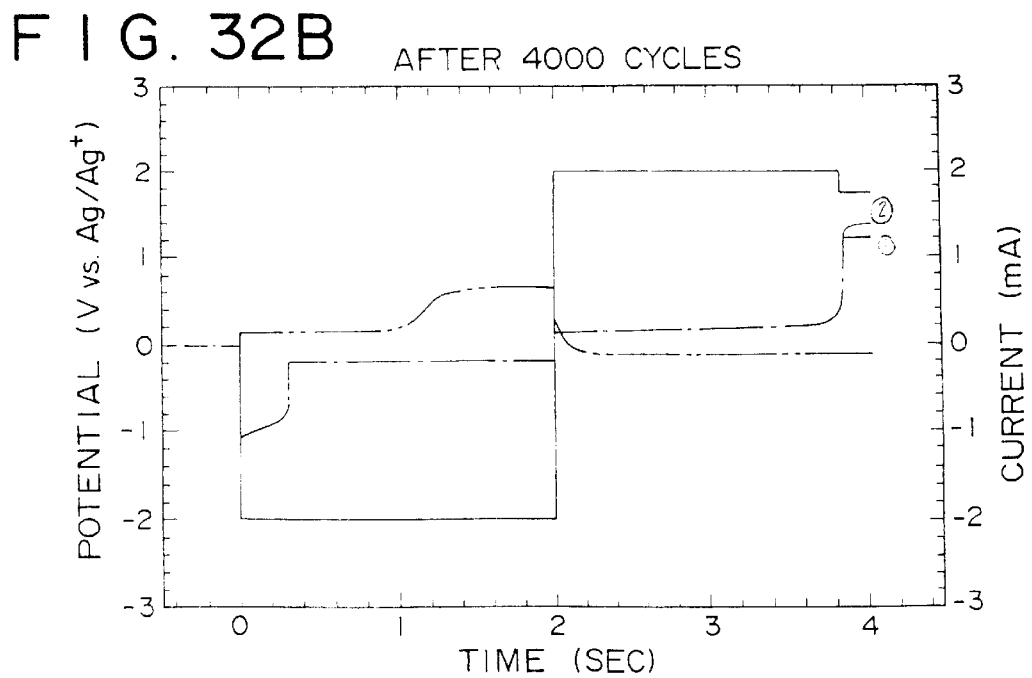
FIG. 32B AFTER 4000 CYCLES

F I G. 33
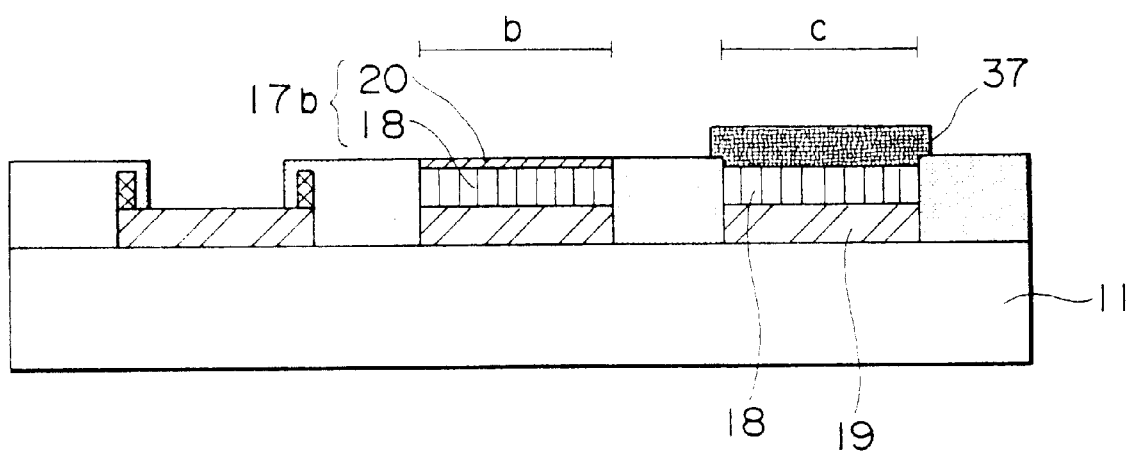

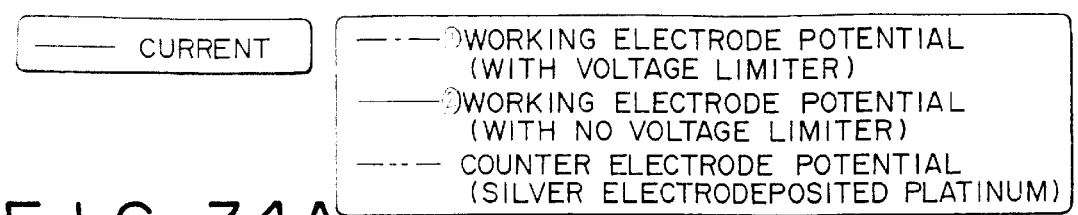
FIG. 34A  INITIAL CYCLE
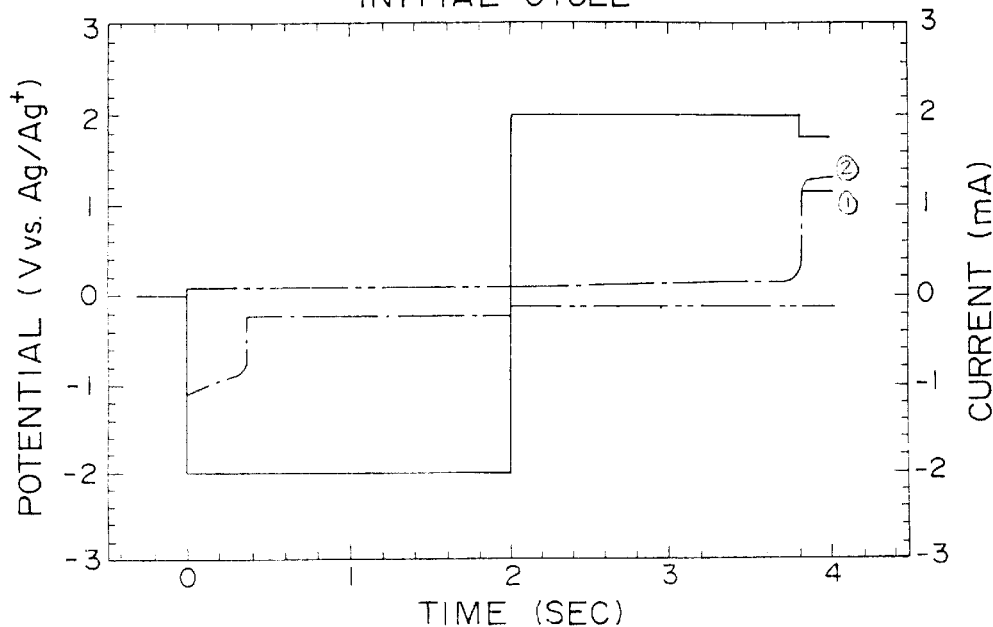
FIG. 34B  AFTER 10000 CYCLES
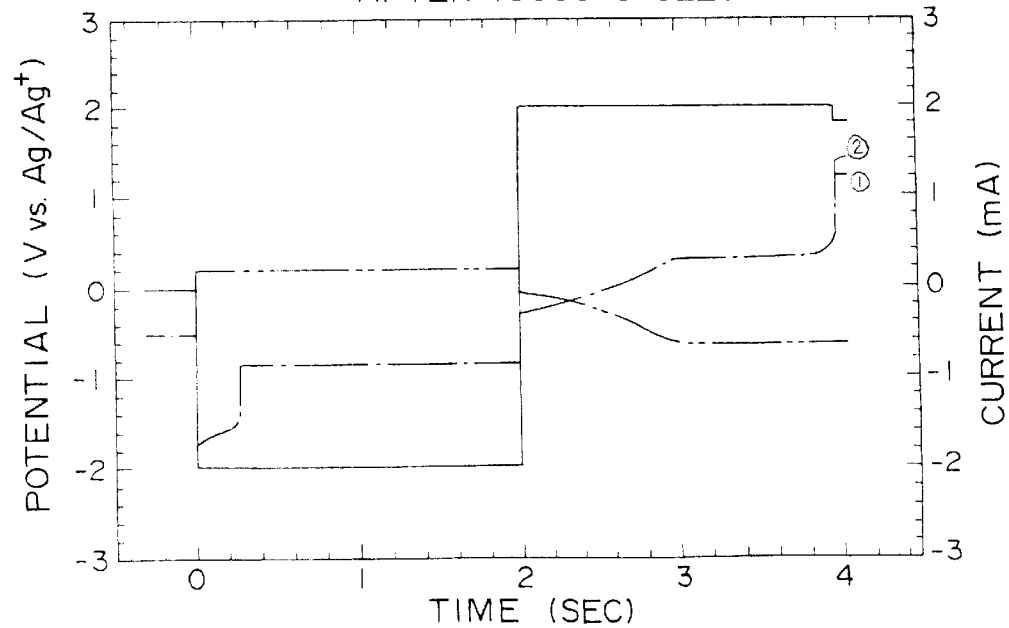

OPTICAL DEVICE, A FABRICATING METHOD THEREOF, A DRIVING METHOD THEREOF AND A CAMERA SYSTEM

This application is a continuation in part of Ser. No. 09/482,983, filed Jan. 14, 2000 now abandoned.

BACKGROUND OF THE INVENTION

1. Field of the Invention

The present invention concerns an optical device suitable, for example, to display apparatus for conducting display of numericals or characters or X-Y matrix display, as well as an optical filter capable of controlling light transmissivity or light reflectivity in a visible light region (wavelength at 400 to 700 nm), as well as a fabricating method thereof, a driving method thereof and a camera system.

2. Description of the Related Art

An electrochromic display device employed in display apparatus such as digital watches (hereinafter simply referred to as "ECD") is a non-light emission type display device which conducts display by reflection light or transmission light as a light control device by electrochemical operation, so that it has a merit giving less feeling of fatigue even in long time observation, as well as a merit that if requires relatively low driving voltage and less consumption power.

For instance, as disclosed in Japanese Published Unexamined Patent Application No. Sho 59-24879, a liquid type ECD using organic molecule type viologen molecule derivatives that reversibly form states of coloration/color extinction as the electrochromic material (EC material) has been known. However, ECDs using the viologen molecule derivatives involve a problem that response speed or degree of shielding is insufficient. In addition, as a light amount control device, it is necessary that the light transmissivity can be controlled in a visible light vision (wavelength at 400 to 700 nm), and no sufficient characteristics can be obtained with the ECD material as described above.

In view of the above, the present inventor has noted on a light control device utilizing deposition/dissolution of a metal salt, instead of ECD, and has found that it can provide more excellent characteristics than the EC material with respect to the response speed and the degree of shielding in the course of research and development thereof.

While various metals salts can be used for such an optical device, those systems using deposition/dissolution of silver particles are excellent in view of optical characteristics. That is, an electrolyte is used as the material for a reversible plating, that is, RED (Reversible Electro-Deposition) in which a solution for the electrolyte shows no absorption spectrum in a visible light region (wavelength at 400 to 700 nm) upon preparation and causes deposition/solution of silver particles from a silver salt (including silver complex salt) capable of forming substantial uniform shielding in the visible light region upon coloration. Further, the silver salt has a possibility of deposition/solution by control for driving. Meanwhile, a cyan type solution has been used so far as a plating bath regarding deposition of silver particles from a silver salt but, since the cyan type solution is fatally poisonous, it is preferred to use a non-cyan type silver salt in the optical device of the present invention in view of safety for operation environment and discarding of liquid wastes.

Under the situations described above, it is possible to provide a non-light emitting type optical device such as an optical filter which consumes less electric power and which is suitable to a visible light region.

FIG. 1A and FIG. 1B, and FIG. 2 show a cell structure of an existent electrochemical light control device described above.

As shown in FIG. 1A and FIG. 2, a pair of transparent glass substrates 4 and 5 are disposed at a predetermined distance as a display window. As shown in FIG. 1A, working electrodes 2 and 3 each comprising an indium tin oxide (ITO) film obtained by doping tin to indium oxide are opposed to each other on the inner surfaces of the substrates 4 and 5, and an electrolyte 1 containing a metal salt dissolved therein is sealed between the opposed working electrodes 2 and 3. Counter electrodes 6 are disposed at the circumferential edges between the substrates 4 and 5 that function also as spacers, by which the sealed electrolyte 1 is sealed between the substrates 4 and 5.

In the optical device described above, when a DC driving voltage is applied for a predetermined period of time, as shown in FIG. 1B, between the counter electrode 6 as an anode and the working electrodes 2 and 3 as the cathode, metal ions dissolved in the electrolyte take place the oxidation/reduction reaction at the cathode as shown by the following formula (1):

$$M^{n+} + ne^- \rightarrow M \tag{1}$$

(n: natural number)
and the working electrodes 2 and 3 on the cathode change from transparent to colored states by deposited metal particles. FIG. 1B is a conceptional view illustrating the electrochemical mechanism in this reaction.

When the foregoing reaction is explained specifically to a case of using a silver salt solution as the electrolyte 1, a silver plate is used for the counter electrodes 6 and the silver salt solution is formed, for example, by dissolving silver bromide into dimethyl sulfoxide (DMSO). As shown in FIG. 1B when a DC driving voltage is applied for a predetermined period of time between the counter electrode 6 as the anode and the working electrodes 2 and 3 as the cathode, oxidation/reduction reaction is taken place for silver ions at the cathode as shown by the following equation (2):

$$Ag^+ + e^- \rightarrow Ag \tag{2}$$

and the working electrodes 2 and 3 on the cathode change from transparent to colored states by deposited Ag particles.

When the metal particles are deposited on the working electrodes 2 and 3 as described above, a specified reflection color with the deposited metal particles is observed through the display window. The filter effect due to the coloration, namely, the transmissivity for the visible light (or density of coloration) changes depending on the level of voltage or the application time thereof. Accordingly, the cell can function as a variable transmissivity display device or an optical filter by controlling the factors.

On the other hand, in a state where the cell is in the colored state, when a DC voltage is applied in the opposite direction between the counter electrode 6 and the working electrodes 2 and 3, the working electrodes 2 and 3 on which the metal particles are deposited now act as the anode to cause a reaction of the following formula (3):

$$M \rightarrow M^{n+} + ne^- \tag{3}$$

and Ag particles deposited on the working electrodes 2 and 3 are restored from the colored state to the transparent state.

This is to be explained to a case of using a silver salt solution for the electrolyte 1. When a DC voltage is applied in the direction opposite to the above between the counter electrode 6 and the working electrodes 2 and 3 in a state where the cell is in the colored state, the working electrodes 2 and 3 on which Ag particles are deposited now act as the anode to take place the reaction of the following formula (4):

$$Ag \rightarrow Ag^+ + e^- \quad (4)$$

and Ag particles deposited on the working electrodes 2 and 3 are restored from the colored state to the transparent state.

FIG. 3 and FIG. 4 show another electrochemical light control device of the prior art.

In this example, as shown in the cross sectional view of FIG. 3, working electrodes 8a, 8b, 8c, 8d, 8e and 9a, 9b, 9c, 9d, 9e each comprising a pair of ITO films are opposed to each other on the inner surfaces of a pair of transparent glass substrates 11 and 12 constituting a cell. Counter electrodes 7a, 7b each comprising a silver plate are disposed to the outer circumference of the outer working electrodes 8e and 9e. The substrates 11 and 12 are kept and sealed at a predetermined distance by a spacer 13 and an electrolyte 1 is sealed between the substrates.

As shown in a plan view of FIG. 4, the working electrodes 8a–8e and 9a–9e, and counter electrodes 7a and 7b are planer electrodes formed in a coaxial pattern. Each of the electrodes are paired as 8a with 9a, 8b with 9b, 8c with 9c, 8d with 9d, 8e with 9e and 7a with 7b, respectively, and connected to driving power sources 14a, 14, 14c, 14d, 14e and 14f by way of wirings 15a, 15b, 15c, 15d, 15e and 15f, respectively, each comprising fine chromium wires.

In this constitution, metal particles can be deposited from the electrolyte 1 on each of the electrodes as the anode and colored by applying a predetermined potential (V1, V2, V3, V4 and V5, V6 being a standard potential at the counter electrodes 7a and 7b) to each of the opposing pair of working electrodes 8a and 9a, 8b and 9b, 8c and 9c, 8d and 9d, 8e and 9e respectively. The filter effect by the coloration, namely, the transmissivity to the visible light (or density of coloration) changes with the level of the voltage or the application time thereof.

If V1=V2=V3=V4=V5, the cell can be colored uniformly over the entire region of the cell and the degree of density can be changed uniformly in accordance with the voltage or the application time thereof. Further, if it is determined as |V1|>|V2|>|V3|>|V4|>|V5|, the color density decreases from the central portion to the periphery (that is, transmissivity is increased). On the other hand, if it is determined as |V1|<|V2|<|V3|<|V4|<|V5|, the transmissivity is decreased from the central portion to the periphery and the constitution is useful as an optical diaphragm for use in CCD (Charge Coupled Device) such as of a television camera and since the size of the device can be reduced, it can sufficiently cope with increase for the integration degree of CCD.

By the way, in the existent electrochemical light control devices described above, a pure metal plate comprising the same kind of metal as the metal deposited/dissolved at the working electrode was used as it is for the counter electrodes 6, 7a, 7b. In this case, since the metal can be supplied smoothly from the electrolyte when the metal is deposited on the working electrode and, on the other hand, the metal can be absorbed rapidly to the electrolyte when the metal is dissolved on at the working electrode, the oxidation/reduction reaction of metal at the working electrode is advantageously conducted smoothly. Particularly, the above-mentioned merit is remarkable when a silver plate is used as the counter electrode in a case of using the silver salt solution for the electrolyte 1.

However, when a pure metal plate is used for the counter electrode, since the oxidation/reduction reaction is not uniform as the life of the device is increased, inactivated metal particles deposited on the counter electrode suspend in the electrolyte to contaminate the inside of the device and lower the transparency upon driving of the device, which may lead to a problem of lowering the transmissivity to the visible light or causing short-circuit between the electrodes.

For example, in the existent device shown in FIG. 3 and FIG. 4, upon color extinction of the working electrode, metal particles are deposited on the counter electrodes 7a and 7b as the cathode. In this case, since lines of electric force of the electric field are concentrated to the angled portion (edge) of the electrode, deposited metals are grown on the portion and relatively large metal particles are deposited/grown and detached from the edge. Different from fine particles of metal B deposited in a thin-film state at other portions near the edge, the particulate metal A (refer to FIG. 5) not easily dissolved upon coloration of the working electrode and, as shown in the figure, and is detached from the edge in an activated state as it is and suspended in the electrolyte 1. When such metal A is increased in the electrolyte, it lowers the transparency of the device upon color extinction of the working electrode and such metal particles also cause short-circuit between the electrodes to cause a significant problem that has to be dissolved when the metal plate is used as the counter electrode of the device.

For overcoming the foregoing problems regarding the counter electrode, one of the present inventors has proposed a counter electrode prepared by coating or printing a resin paste containing conductive particles such as of conductive carbon, silver, copper or nickel, on a current collector of the underlying layer instead of the existent counter electrode made of a metal plate. In this case, since the electrode can be formed into a shape with no substantial angled corner, local concentration of the electric field at the counter electrode can be moderated or prevented, whereby the problem of inactive metal particles relevant to the existent counter electrode can be overcome and an electrochemical light control device with a stabilized potential for the counter electrode and capable of stable driving can thus be attained (Japanese Patent Application No. Hei 10-009458).

However, when a carbon material is used, for example, as the conductive particles, adhesion between the conductive layer (resin layer containing the carbon material) of the counter electrode and the underlying layer (underlying electrode not electrochemically reacting with the electrolyte, that is, a current collector) as oxidation/reduction reaction of metal is repeated by a number of times at the transparent electrode and the counter electrode by driving the device and the conductor layer tended to be defoliated from the underlying layer. In such a state, the current collector is in direct contact with the electrolyte not by way of the layer of the carbon material and directly concerns reaction with the electrolyte. In this case, if the current collector is made of such a material that no smooth charge transfer is conductor to the electrolyte, it increases polarization resistance thereof extremely. Further, if the material allows relatively smooth charge transfer to the electrolyte, it causes deposition of silver or a silver-containing compound on the current collector or side reaction such as decomposition of electrolyte ingredients. Particularly, when the deposits are insulative, subsequent charge transfer can not also be conducted smoothly and, as a result, the polarization resistance is increased remarkably. Since such great polarization resistance not only causes large electric power consumption but also promotes the side reaction, it results in a problem of shortening the life of the device.

On the other hand, in the optical device such as the electrochemical light control device described above in the prior art, when the working electrodes 8a–8e, 9a–9e are operated as the anode and the potential thereof is polarized in the noble (+) direction in order to proceed the oxidation reaction at the working electrodes 8a–8e, 9a–9e, there was a problem that the ingredients of the electrolyte 1 are oxidized and denatured if polarization at the working electrodes 8a–8e, 9a–9e proceed excessively. Particularly, when a silver salt solution is used for the electrolyte, a supporting electrolyte is often dissolved for promoting the dissolution of the silver salt. In this case, the electrolyte 1 is colored probably mainly due to oxidation of anions dissolved as an electrolyte or support electrolyte in the electrolyte 1. For example, when iodine ions are contained in the anions of the electrolyte or support electrolyte, the electrolyte near the working electrode is colored yellow, probably mainly due to iodine ($I_2$) caused by oxidation reaction of iodine ions (that is, $2I \rightarrow R\ I_2 + e-$). This gives undesired effects on the light transmissivity or reflectivity in the optical device to cause lowering of characteristics of the optical device and deteriorate the optical device.

In view of the above, it is necessary to detect and control the potential of the working electrodes 8a–8e, 9a–9e, thereby preventing coloration of the electrolyte. It is the same as the potential of the counter electrodes. However, the potential of the working electrodes 8a–8e, and 9a–9e in the electrolyte 1 can not but be detected as the potential difference relative to the counter electrodes 7a and 7b in the device constituted described above. As has been described above, the potential of the counter electrodes 7a and 7b changes as the polarization at the counter electrode increases due to repeating electrochemical reaction in the electrolyte 1. Accordingly, the potential of the working electrodes 8a–8e and 9a–9e in the electrolyte 1 can not be measured accurately and, as a result, it was impossible to control the potential of the working electrodes 8a–8e and 9a–9e.

OBJECT AND SUMMARY OF THE INVENTION

In view of the above, it is an object of the present invention to provide an optical device free from the defoliation as described above, enabling stable driving by stabilizing the potential of the counter electrode and, at the same time, capable of attaining low electric power consumption and improved life of the device, by using a specified material different from the existent material for the counter electrode of an electrochemical light control device utilizing deposition/dissolution reaction of a metal, as well as a method of fabricating the device.

Another object of the present invention is to provide an optical device such as an electrochemical light control device of a constitution capable of suppressing formation of inactive metal particles on a counter electrode, which may contaminate the inside of the device, as well as a fabrication method thereof.

That is, the optical device according to the present invention for overcoming the foregoing subject provides an optical device having working electrodes and counter electrodes in which an electrolyte is disposed in contact with both of the electrodes and light can be controlled electrochemically by controlling an electric field applied to the electrolyte, wherein the counter electrode comprises a single layer or a laminate structure having at least two layers, the single layer or the first layer of the laminate structure which is present on the side of the electrolyte comprises a metal having a lower ionization tendency than the metal deposited/dissolved at the working electrode, and a second layer below the first layer comprises a metal or an oxide thereof different from that in the first layer.

Further, the present invention also provides a method of fabricating an optical device having a working electrode and a counter electrode in which an electrolyte is disposed in contact with both of the electrodes and light can be controlled electrochemically by controlling an electric field applied to the electrolyte, wherein the method comprises:

a step of depositing a metal having a lower ionization tendency than that of a metal contained in an electrolyte and deposited on a working electrode by means of a gas phase film forming method or a plating method or a sol-gel method on a substrate thereby forming a counter electrode material layer, a step of forming the counter electrode by patterning the counter electrode forming material layer, and a step of covering the circumferential edge or the periphery of the counter electrode with a shading layer.

The optical device and the fabricating method thereof according to the present invention have a prominent feature in that the counter electrode comprises a single layer or a laminate structure having two or more of layers in which the first layer comprises a metal element having an ionization tendency lower than that of the metal to be deposited/dissolved at the working electrode. For example, when the electrolyte is a solution containing a silver salt dissolved therein, the first layer comprises palladium, platinum or gold that is a metal having an ionization tendency lower than that of silver. Further, the second layer below the first layer comprises a metal different from the first layer (for example, titanium, chromium or tungsten) or an oxide thereof (for example, indium-tin oxide prepared by doping tin to indium oxide (hereinafter simply referred to as ITO)) or tin oxide.

This will be explained with reference to a relation between the ionization tendency of the metal and the standard electrode potential shown below. In most cases, the standard electrode potential means a potential of an electrode material based on a normal (or standard) hydrogen electrode (NHE or SHE) at a standard pressure of a hydrogen gas of 1 atm and the value varies depending on temperature. Several standard electrode potentials in metal electrode reactions arranged orderly from negative values are referred to as electrochemical series. The following table shows metal series based on electrochemical series for main metals and standard electrode potentials thereof (at 25° C.).

TABLE 1

| Metal | Standard Electrode Potential (V vs. NHE) |
|---|---|
| Li | −3.03 |
| K | −2.925 |
| Ca | −2.87 |
| Na | −2.713 |
| Mg | −2.37 |
| Al | −1.66 |
| Zn | −0.7628 |
| Cr | −0.74 |
| Fe(II)/Fe | −0.440 |
| Cd | −0.402 |
| Co | −0.277 |
| Ni | −0.23 |
| Sn | −0.140 |
| Pb | −0.126 |
| Fe(III)/Fe | −0.036 |
| H | 0.000 |

TABLE 1-continued

| Metal | Standard Electrode Potential (V vs. NHE) |
|---|---|
| Cu(II)/Cu | 0.337 |
| Hg(I)/Hg | 0.789 |
| Ag | 0.7994 |
| Pd | 0.987 |
| Pt | 1.2 |
| Au | 1.50 |

The standard electrode potentials correspond to potentials exhibited when the materials are dipped an aqueous solution (referred to as dipping potential, rest potential or natural potential) and those metals showing high dipping potentials are referred to as noble metals and those metals showing low potentials are referred as basic metals. Further, while a standard electrode potential in a non-aqueous solution system is usually different from that in the aqueous solution system, the relation regarding the level of the standard electrode potential in the non-aqueous system substantially corresponds, in most cases, to that in the aqueous solution system. This is the same, for example, to metal oxides. Then, the degree of the ionization tendency as a measure for the ease of ionization corresponds to the level of the standard electrode potential. That is, a material showing a lower standard electrode potential has a higher ionization tendency, whereas a material having a higher standard electrode potential has a lower ionization tendency. Then, it is assumed in this invention that "low ionization tendency" means high standard electrode potential.

The same thing can be applied to metal compounds such as ITO or tin oxide. For example, ITO, In:Sn ratio of which is 9:1, is 0.4V more noble relative to silver in a variety of aqueous or non-aqueous solutions. Therefore, the standard electrode potential of the ITO is about+1.2 V vs. NHE.

In the optical device, a material having a more noble potential than the metal to be deposited/dissolved at the working electrode is used for constituting the first layer of the counter electrode in contact with the electrolyte. For example, in a case of using a silver salt solution for the electrolyte, the first layer for the electrode is constituted with a metal having a more noble potential than metal silver (Ag). That is, as can be seen from the table described above, any of metal such as Ag, palladium (Pd), platinum (Pt) and gold (Au) having lower ionization tendency than hydrogen is a noble metal having a positive potential with reference to the standard potential (0V) of hydrogen. In addition, since the positive potential of the metal used for the first layer is higher than that of silver, Pd, Pt or Au showing a lower ionization tendency than that of Ag is referred to as a metal having a more noble potential than Ag. For example, metals having higher ionization tendency than hydrogen, for example, Li, Al, Ni, Sn and Pb can be said to be metals having basic potential with (−) potential with reference to the hydrogen standard potential (0V).

A metal having a lower ionization tendency (referred to as D) than the metal to be deposited/dissolved at the working electrode (referred to as C), has such a nature that deposition/dissolution reaction of the metal C at the surface proceeds reversibly and smoothly and polarization resistance at the counter electrode is not increased so much even if deposition/dissolution reaction of the metal C is repeated on the working electrode. As a result, this is stable, can suppress the polarization resistance at the counter electrode upon driving of the device the electric power consumption can be reduced and, in addition, contamination caused by side reactions on the counter electrode can also be suppressed.

This is particularly remarkable in a case where the metal C is silver and the metal D is platinum, palladium or gold. In a case where the carbon material or the like is used for the counter electrode, since silver is deposited from the inside of the counter electrode or silver is incorporated into the counter electrode during driving to change the constitution of the counter electrode and show a potential different from that in the initial stage, making it sometimes difficult to control driving. However, if the counter electrode is constituted with palladium, platinum or gold, they are formed uniformly as a dense thin-film by a gas phase film forming method or a plating method or a sol-gel method, by which obstacles are not intruded into the counter electrode, the potential for the counter electrode is not disturbed and the potential of the electrode is stabilized as described above during driving.

Therefore, according to the present invention, in an electrochemical light control device utilizing the metal deposition/dissolution reaction for instance, when a metal D having a lower ionization tendency than a metal C to be deposited/dissolved at the working electrode (or metal showing more noble potential than metal C) is used for the first layer of the counter electrode, the metal D in the first layer is less ionized than the metal C and smoothly proceeds deposition/dissolution reaction of the metal C on the surface of the metal D, so that the device is electrochemically stable, polarization at the counter electrode upon device driving can be suppressed and electric power consumption can be reduced, as well as contamination due to side reaction at the counter electrode can be suppressed.

In the present invention, the counter electrode comprises a single layer or a first layer of a metal having a lower ionization tendency than that of the metal to be deposited/dissolved at the working electrode (platinum, palladium or gold in a case of using a silver salt solution for the electrolyte), and the layer may be formed of a single species of material or two species of materials (which may be an alloy or a mixture), or the first layer may be a laminate of metals selected from those metals having lower ionization tendency than the metal to be deposited/dissolved at the working electrode.

Further, according to the present invention, the counter electrode is covered with a layer of a metal having a lower ionization tendency that of the metal to be deposited/dissolved at the working electrode and adhered favorably with a substrate by way of a second layer comprising a metal or an oxide thereof different from that of the first layer. The second layer is not necessary if adhesion is favorable between the first layer and the substrate. However, if the adhesion is not satisfactory in view of the matching between the materials, the adhesion between the counter electrode and the substrate can be ensured to stabilize the potential of the counter electrode by disposing a material having a satisfactory adhesion to both of the first layer and the substrate as a second layer.

Further, when a layer of the metal element D having a lower ionization tendency than that of the metal C to be deposited/dissolved on the surface of the working electrode is disposed as the first layer of the counter electrode and, further, a material containing the metal C is formed as a third layer on the surface thereof, the dipping potential of the counter electrode when dipped in the electrolyte is identical with that of the metal C and is stabilized as well. Then, as described above, since deposition/dissolution reaction of the metal C on the surface of the metal D is conducted smoothly, polarization resistance at the counter electrode can be suppressed to ensure the performance of the optical device.

In any of the cases described above, since the surface of the counter electrode is not coated with a resin paste layer containing the conductive particles as described above but formed with the same kind of metal as the metal to be deposited/dissolved at the working electrode or a metal having a lower ionization tendency, the metal layer can be formed with good adhesion by a gas phase film forming method or a plating method or a sol-gel method, so that when it is dipped in the electrolyte, or even during driving in the electrolyte, it is not defoliated or separated and increase of the polarization potential can be suppressed.

Further, in the counter electrode comprising the single layer or the laminate structure, since the first layer can be formed by the gas phase film forming method or the plating method or the sol-gel method, it can be formed in a thin film state compared with the case of constituting the entire counter electrode with a metal plate or the like, so that the end edge of the counter electrode is formed into such a shape as less causing an angled corner (edge) as shown in FIG. 5.

Accordingly, when immersing and driving the counter electrode in the electrolyte, local concentration of electric fields can be moderated or prevented and deposition of inactive particulate metal on the counter electrode can be suppressed or prevented effectively. As a result, lowering of the transparency of the device or short circuit between electrodes caused by suspension of the inactive metal particles in the electrolyte which could not be prevented in the existent device can be suppressed or prevented effectively.

A further object of the present invention is to provide an optical device such as an electrochemical light control device capable of detecting and controlling the potential of the working electrode or the counter electrode accurately, as well as a fabricating method thereof and a driving method thereof.

In the optical device according to the present invention, a reference electrode having no direct concerns with reversible electrolytic deposition on the surface of the working electrode is disposed in contact with the electrolyte. The reference electrode, being in contact with the electrolyte, always shows a constant dipping potential. Accordingly, by detecting the potential difference between the reference electrode and the working electrode or the counter electrode, the potential of the working electrode or the counter electrode can be obtained from the detection potential difference also when oxidation/reduction is taken place in a state being dipped in the electrolyte.

The reference electrode in the present invention may be formed as a single layer or a laminate structure having two or more of layers in the same manner as the counter electrode but, since only a minute current flows for the measurement and monitoring of the potential for the working electrode and/or the counter electrode and no violent oxidation/reduction reaction occurs as done at the working electrode or the counter electrode, the constituent material for the first layer can be selected from a wider range than that for the counter electrode. That is, any of materials that is not dissolved when dipped in the electrolyte and shows a constant stable dipping potential can be used in principle. In view of the stability in a state in contact with the electrolyte, the first layer of the reference electrode is preferably constituted with the same kind of metal as the metal to be deposition/dissolved at the working electrode upon driving of the optical device, or a metal having a lower ionization tendency than the metal. With such a constitution, even when the reference electrode is dipped in the electrolyte, the first layer is chemically stable and not dissolved spontaneously into the electrolyte and the reference electrode shows a constant dipping potential. Therefore, the potential for the working electrode or the counter electrode can be detected more accurately based on the stable potential of the reference electrode.

In a case of the laminate structure having two or more layers, a second layer is disposed between the first layer and the substrate like that in the case of the counter electrode described above if the material constituting the first layer has no satisfactory adhesion with the substrate material or if electric connection with the lead electrode to the reference electrode is not satisfactory. When such a second layer is disposed, adhesion of the reference electrode as the substrate can be ensured to stabilize the potential of the reference electrode.

Further, when a layer of a material having a lower ionization tendency than the metal to be deposited/dissolved on the surface of the working electrode upon electrolytic deposition is disposed and a substance containing a metal to be deposited/dissolved on the surface of the working electrode is disposed on the surface to constitute a third layer, the potential of the reference electrode upon dipping into the electrolyte is equal with the potential of the material to be deposited on the surface of the working electrode and stabilized. Also in this case, the potential of the working electrode or the counter electrode can be detected more accurately based on the stable potential of the reference electrode.

Since the reference electrode is used for measuring and monitoring the potential of the working electrode and/or the counter electrode, no large current flows as in the counter electrode, and the third layer can be constituted with a conductive particle layer containing particles of a metal to be deposited/dissolved on the surface of the working electrode. Also in this case, the potential of the working electrode or the counter electrode can be detected more accurately based on the stable potential of the reference electrode. Further, if the electric connection of the conductive particle layer constituting the third layer with the lead electrode to the reference electrode is not satisfactory, a first layer is disposed as the current collector layer below the third layer. Further, if adhesion with the substrate material is not satisfactory, a second layer as an adhesion layer is disposed between the third layer and the substrate. The first layer and the second layer may be formed separately or the first layer may be used also as the second layer. In any case, by the provision of the first layer or the second layer, electric connection and adhesion of the reference electrode with the substrate can be ensured to stabilize the potential of the reference electrode.

Further, the present invention also provides a method of fabricating an optical device having a working electrode and a counter electrode, as well as a reference electrode in which an electrolyte is disposed in contact with the electrodes and light is controlled electrochemically by controlling a voltage applied to the working electrode and the counter electrode relative to the reference electrode, in addition to the same method as that for forming the counter electrode described above, the method comprising:

a step of depositing a transition metal or a conductive metal oxide on a substrate by way of a gas phase film forming method or a plating method or a sol-gel method, thereby forming a reference electrode collector layer, a step of patterning the reference electrode collector layer, thereby forming the reference electrode collector, a step of covering the portion of the reference electrode collector with a conductive particle layer, and a step of covering the circumferentially edge or peripheral portion of the reference electrode current collector with a shading layer.

Further, the present invention also provides the optical device described above in which an external circuit having a limiter for controlling an external power source is preferably provided for keeping a potential difference between the working electrode and the reference electrode within a predetermined range.

Provision of the limiter can keep the potential of the working electrode within a predetermined range to suppress excess polarization at the working electrode. Therefore, undesired effect of the excess polarization at the working electrode on the materials in the electrolyte can be prevented. Specifically, coloration of the electrolyte assumed to be attributable mainly to the oxidation of anions in the electrolyte or supporting electrolyte caused by excess polarization at the working electrode can be prevented.

Further, the present invention also provides a method of driving an optical device for controlling light by reversible electrolytic deposition from an electrolyte to the surface of a working electrode disposed on a substrate, wherein the method comprises disposing a reference electrode having no direct concerns with electrolytic deposition/dissolution between the electrolyte and the working electrode and/or the counter electrode, detecting a potential difference between the reference electrode and the working electrode and/or the counter electrode, and controlling current supply to the working electrode and/or the counter electrode upon reversible electrolytic deposition to the surface of the working electrode and/or the counter electrode so as to keep the potential difference within a predetermined range.

According to the driving method for the optical device described above, since the potential difference between the reference electrode and the working electrode is detected, the potential of the working electrode when dipped in the electrolyte is detected based on the reference electrode showing a constant dipping potential when dipped in the electrolyte. Then, since the current supply to the working electrode is controlled so as to keep the potential difference within the predetermined range, excess polarization at the working electrode during current supply is suppressed. Therefore, light can be controlled by reversible electrolytic deposition from the electrolyte to the surface of the working electrode while preventing undesired effects caused by excess polarization at the working electrode on the substances in the electrolyte.

Then, the present invention further provides a camera system mounting an optical device therein. Since the optical device is excellent in the optical characteristic and can be driven stably, the reliability of the camera system can be enhanced as well. Further, according to the camera system, since the optical device utilizing the electrochemical reaction is mounted and portions of the device can be reduced in the size compared with the existent case, the size of the camera system itself can also be reduced.

BRIEF DESCRIPTION OF THE DRAWINGS

FIG. 19 is a graph showing the change with time of the counter electrode potential and the current value upon driving the device of Comparative Example 5;

FIG. 20 is a graph showing the change with cycle of the counter electrode potential upon driving the device of Comparative Example 5;

FIGS. 27A and 27B are graphs for explaining the driving method and the driving state of the optical device of Example 5;

FIGS. 28A and 28B are graphs for explaining the driving method and the driving state of the optical device of Comparative Example 6;

FIG. 30 is a graph for explaining the driving method and the driving state of the optical device of Example 6;

FIG. 32 is a graph for explaining the driving method and the driving state of the optical device of Comparative Example 7;

FIG. 33 is a cross sectional view for explaining the constitution of an optical device of Example 8;

FIG. 34 is a graph for explaining the driving method and the driving state of the optical device of Comparative Example 8;

DETAILED DESCRIPTION OF THE PREFERRED EMBODIMENT

Figure 1A:
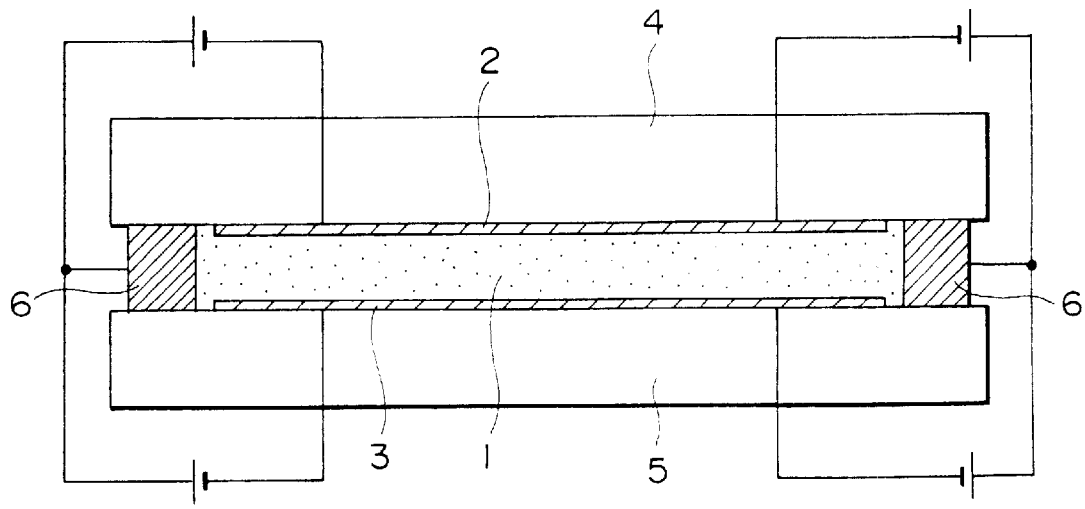
FIG. 1A and FIG. 1B show a cross sectional view for the constitution of an existent optical device and a conceptional views illustrating the operation principle thereof.
Figure 1B:
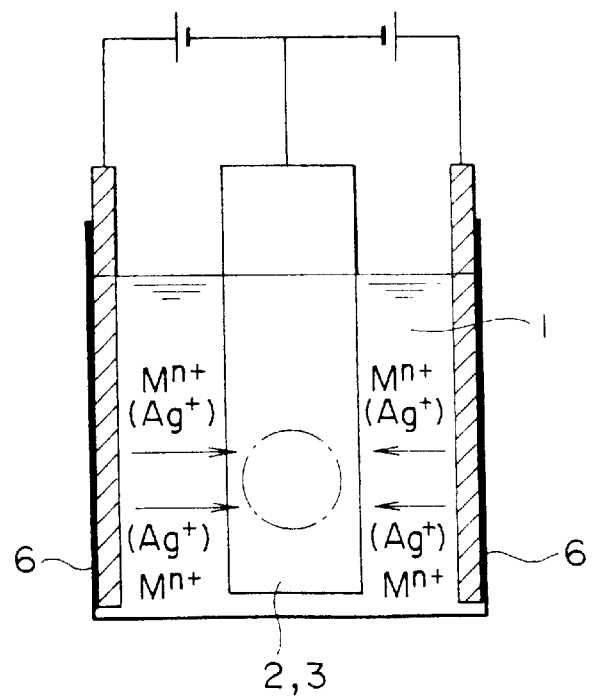
Figure 2:
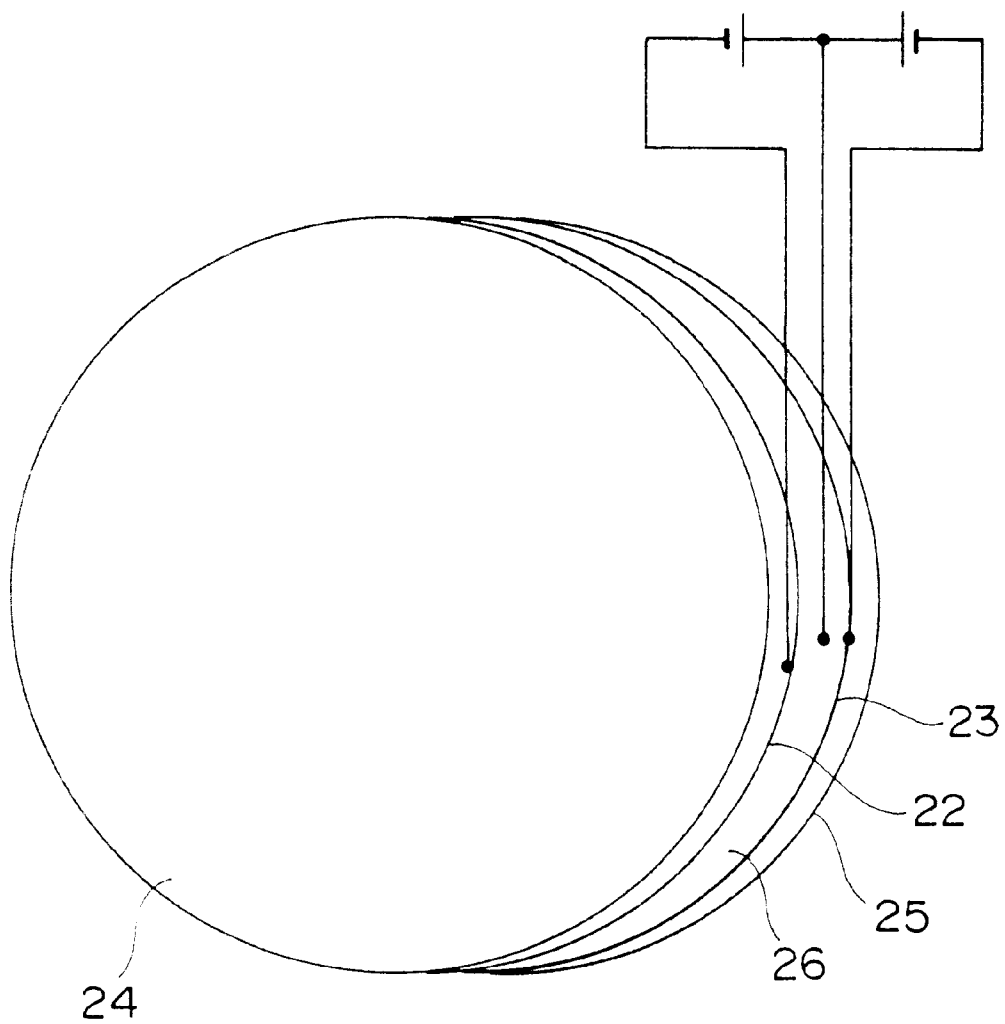
FIG. 2 is a perspective view for the appearance of the optical device.

In the optical device according to the present invention and the fabrication method thereof, a counter electrode disposed on an insulative substrate such as made of glass is preferably formed as a laminate structure comprising a first layer made of a metal having a lower ionization tendency than a metal deposited/dissolved at a working electrode of the optical device and a second layer covered with the first layer and made of a metal or an oxide thereof which is effective as an adhesion layer for the first layer (or a first layer is laminated on the second layer).

This is advantageous for improving the adhesion of the first layer to the substrate but the second layer is not always necessary depending on the material of the first layer (therefor, only the first layer is disposed on the substrate and the counter electrode can be formed as a single layer in this case).

For example, if the material used for the first layer can be formed as a film with good direct adhesion with the substrate, it can be properly determined whether the second layer is interposed between the first layer and the insulative substrate, so that the counter electrode can be formed as a single layer depending on the case. When an electrolyte used in the optical device of the present invention is a silver salt solution, the metal deposited/dissolved at the working electrode mainly comprises silver. In this case, platinum, palladium or gold can be mentioned as a metal having a lower ionization tendency than silver. If it is disposed directly, for example, on an amorphous silicon substrate showing good adhesion with the noble metal described above, a counter electrode comprising a single layer of such metal can be formed.

Further, when a second layer is disposed as an adhesion layer for the first layer of the counter electrode, it is preferred that the material for the second layer comprises a metal or an oxide thereof different from that of the first layer, has excellent adhesion with the substrate and is a good conductor.

When the first layer comprises platinum, palladium or gold as described above, the second layer can preferably include a layer comprising at least one of metals, for example, titanium, chromium or tungsten or a metal oxide such as tin oxide or ITO. Compared with a case of directly forming the first metal layer on a substrate such as made of glass (that is, as a single layer), the second layer is firmly adhered as an underlying layer with the substrate and functions as an adhesion layer for improving the deposition of the first layer, so that the counter electrode of the present invention formed as a laminate structure on the substrate is less defoliated from the substrate even after driving the optical device for a number of cycles.

An insulator such as silicon nitride or amorphous silicon is also available for adhesion between the first layer and the substrate and functions as the second layer.

Further, as a method of forming the single layer or the first layer and the second layer (laminate structure) constituting the counter electrode, a gas phase film forming method (physical vapor deposition method or sputtering method) or a plating method (electrolytic plating or electroless plating method)or a sol-gel method is preferred.

In the present invention, use of the metal described above as it is for the counter electrode gives no trouble at all in view of the performance of the optical device. However, for lowering the counter electrode potential, it is preferred to form a layer comprising a different kind of metal element showing less noble potential as a third layer while covering the first layer metal. That is, the single layer or the first layer described above may optionally be covered with a third layer comprising a metal different from that of the layers, preferably, a metal of the same kind as that deposited/dissolved at the operational electrode of the optical device according to the present invention. For example, when a silver salt solution is used, silver is deposited/dissolved at the working electrode. Then when a silver layer is formed as the third layer covering the layer of platinum or palladium as the first layer, the potential of the counter electrode can be made substantially equal with that of silver when dipped in the solution described above, and the counter electrode of excellent reversibility in deposition/dissolution reaction of silver can be provided.

In the optical device according to the present invention, when a silver salt solution is used, for example, as an electrolyte, since platinum, palladium or gold used preferably as the constituent metal for the counter electrode is a metal showing more noble potential than silver, a natural potential formed upon dipping into the electrolyte is higher than the potential of silver. For instance, since the standard electrode potential in an aqueous solution at 25° C. is 1.188 V vs. NHE for platinum, 0.915 V vs. NHE for palladium, 1.50 V vs. NHE for gold and 0.799 V vs. NHE for silver (refer to Chemistry Manual), noble potential relative to silver is shown as 0.389 V vs. $Ag/Ag^+$ with platinum, 0.116 V vs. $Ag/Ag^+$ with palladium and 0.701 V vs. $Ag/Ag^+$ with gold. Further, also in a non-aqueous solution comprising dimethylsulfoxide (DMSO)/acetonitrile (AN) at 55/45 ratio, relative potential to silver of platinum, palladium and gold shows a noble potential approximate to the potential in the aqueous solution respectively.

In the present invention, the thickness for the constituent layer of the counter electrode is, preferably, 50 to 500 nm (preferably, 100 to 300 nm) in the case of the single layer, 50 to 300 nm (preferably, 100 to 200 nm) for the first layer, 300 nm or less (preferably, 50 to 200 nm) for the second layer and 10 to 5000 nm (preferably, 100 to 3000 nm) for the third layer in the case of the laminate structure.

In the present invention, the counter electrode is preferably constituted with a dense thin film-shaped metal layer formed by a gas phase film forming method or a plating method or a sol-gel method instead of using a metal plate or the like as it is as a counter electrode or coating or printing a paste of conductive particles such as of carbon material to form a counter electrode as described above.

For example, for the single layer, the first layer, the second layer and the third layer are formed, preferably, by using a physical vapor deposition method of vaporizing a corresponding metal or oxide thereof in a reduced pressure and depositing a film on a predetermined surface or a sputtering method of applying an AC voltage or an AC voltage combined with a DC voltage in a reduced pressure or in an ambient pressure using metals or oxides thereof as a target thereby depositing a film of a desired metal or oxide thereof on a predetermined surface. For the physical vapor deposition method, a method of vaporizing a metal or oxide thereof by ohmic heating in high vacuum or a method of vaporizing them by irradiating electron beams to a vapor deposition source (EB vapor deposition) can be adopted. In the present invention, any of the methods described above can be used properly.

Further, the other gas phase film forming methods such as MOCVD (Metal Organic Chemical Vapor Deposition), MBE (Molecular Beam Epitaxy) are available to form each layer of the electrode like semiconductor film fabrication.

In case of forming a film of silicon nitride or amorphous silicon as the second layer of the counter electrode, CVD using silane gas such as monosilane or disilane for monomer gas and nitrogen or argon for carrier gas is available because a stable film can be formed in a comparatively low temperature atmosphere.

In addition to the various vapor deposition method described above, the layers can be formed easily without changing the characteristics as the counter electrode by a plating method or a sol-gel method. Particularly, the third layer is suitably formed by the plating method.

In the present invention, if it is desirable that the working electrode is a transparent electrode, ITO or tin oxide excellent in transparency and conductivity is preferably used as the material for the working electrode. Since ITO or tin oxide is also preferred as the underlying layer for the counter electrode (second layer), they can be used optionally for both of the working electrode and the counter electrode. In this case, since both of them can be formed into films simultaneously by using an identical material, it is possible to improve the operationability and decrease the cost upon fabricating the device.

Further, in the present invention, when the first layer is deposited after depositing the film of the second layer as a good conductor, since the material for the second layer may sometimes be chemically instable and reactive with an electrolyte, it is desirable for such a structure that the first layer completely covers the second layer such that the second layer is not in direct contact with the electrolyte.

Figure 5:
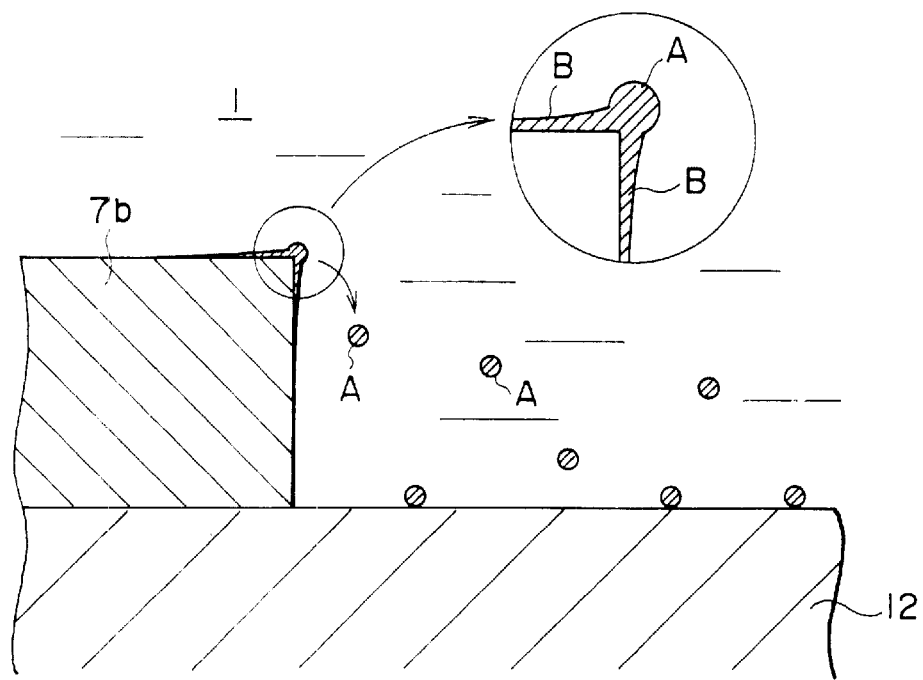
FIG. 5 is a conceptional view illustrating depositing/growing/detaching phenomenon of silver particles in an existent optical device using a silver plate for a counter electrode.

Further, in the present invention, if the third layer is disposed to the counter electrode, since the third layer can also be formed into a thin film by a gas phase film forming method or a plating method or a sol-gel method, an edge is less formed to the end edge also in this case, and it causes less problem due to deposition in the particulate state as shown in FIG. 5.

In the present invention, when each of the circumferential edge or the periphery of the counter electrode is covered with the shading layer and the main surface of the counter electrode situates nearer to the substrate than the surface of the shading layer by the manufacturing method for the counter electrode described above, the peripheral edge of the counter electrode does not protrude to further prevent concentration of the electric field described above. In this case, a black resist layer can be used, for example, as the shading layer.

That is, when the black resist is disposed, the circumferential periphery of the counter electrode is not in direct contact with the electrolyte even when it is put in an electrolyte. The shading layer described above may also be disposed to the working electrode, by which the same effect can be attained, as well as it is sometimes effective for the shading separation between each of the working electrodes constituting a picture element and for the improvement of contrast.

Further, in addition to deposit the single layer or the laminate structure on the substrate by the film deposition method described above, it is also possible to previously fabricate the constituent material into a desired shape and form a predetermined corresponding concave part on the surface of the substrate and fit to secure the same into the concave part. When the material is fixed by fitting, since it is secured by properly using the adhesive as necessary, it can provide an advantage of easy arrangement on the substrate.

Further, a reference electrode as another important feature of the present invention may be optionally regarding driving of the optical device and this is extremely effective for stable control of the optical device. The reference electrode may be located at any position so long as it keeps electrical insulation from the working electrode and the counter electrode at a portion other than the electrolyte and the reference electrode surface is in contact with the electrolyte.

The reference electrode shows a constant dipping potential inherent to the material of the reference electrode when dipped in the electrolyte. The reference electrode is utilized for measuring the relative potential of the working electrode and/or counter electrode relative to the dipping potential. That is, when current is supplied by an external power source to the working electrode and the counter electrode, the potentials of the electrodes change currently. However, the dipping potential of the reference electrode scarcely changes since only a minute current is supplied to the reference electrode for measuring/monitoring the potential of the electrodes. Accordingly, when the relative potential of the working electrode and/or counter electrode is measured with reference to the dipping potential of the reference electrode, exact potentials for them can be determined.

The reference electrode of the present invention can be formed as a single layer or a laminate structure comprising two or more of layers in the same manner as the counter electrode described above. Since only the minute current flows for the measuring/monitoring of the potentials of the working electrode and/or counter electrode and no such violent oxidation/reduction reaction occurs as that in the working electrode or the counter electrode, the material constituting the first layer can be selected from a wider range compared with the counter electrode. That is, any material can be used in principle so long as it is not dissolved and shows a constant stable dipping potential when dipped in an electrolyte.

In view of the stability in a state in contact with the electrode, the material for the first layer of the reference electrode dipped in the electrolyte is desirably constituted with a metal of the same kind as the metal deposited/dissolved at the working electrode or a material having a lower ionization tendency than the metal upon driving the optical device. For example, in a case of using a silver salt solution for the electrolyte of the optical device in the present invention, the first layer is preferably formed of platinum (Pt), palladium (Pd) or gold (Au) which is a metal more noble than silver. With such a constitution, the first layer is chemically stable and is not dissolved spontaneously in the electrolyte when the reference electrode is dipped in the electrolyte and the reference electrode shows a constant dipping potential. Therefore, the potential for the working electrode or the counter electrode can be detected more accurately with reference to the stable potential of the reference electrode.

The thickness of the layer of the metal having lower ionization tendency than the metal deposited/dissolved at the working electrode may be 10 to 500 nm, preferably, 50 to 300 nm. Particularly, since only the minute current flows to the reference electrode, the lower limit for the film thickness can be determined as thin as about 10 nm.

Further, the first layer for the reference electrode of the optical device in the present invention can also be constituted with a conductive material less undergoing chemical change upon electrochemical reaction with the electrolyte. For such a material, ITO, tin oxide ($SnO_2$) or the like can be used in a case where the electrolyte is a silver salt solution for instance.

In the reference electrode of the optical device in the present invention, a second layer may be disposed as an adhesion layer between the first layer and the substrate. The second layer is not required if adhesion between the first layer and the substrate is satisfactory but the second layer is particularly effective if the adhesion between the first layer and the substrate is not satisfactory. Particularly, when the first layer is made of platinum, palladium or gold, since adhesion with the glass substrate is not so favorable, it is preferred to dispose the second layer.

Further, for the reference electrode of the optical device in the present invention, a layer containing a metal deposited/dissolved at the working electrode can be disposed as the third layer so as to cover the first layer. In this case, since the first layer is protected by the third layer, the material for the first layer can be selected from a further wide range.

For the first layer in this case, titanium, chromium, molybdenum, tungsten, cobalt, iron, nickel, palladium, platinum, silver, gold, copper, ITO, $SnO_2$, stainless steel (for example, SUS304) and the like can be used. Further, since only the minute current flows in the reference electrode, tantalum or niobium having a high specific resistivity and not suitable to use as a current collector for the counter electrode can also be used as the first layer of the reference electrode.

In the case described above, the manufacturing method for the counter electrode of the present invention described above such as a gas phase film forming method or a plating method or a sol-gel method can be used as it is for the method of manufacturing the reference electrode.

Further, since current as large as the current supplied to the counter electrode is not applied to the reference electrode as described above in principle, it is possible to use a material comprising conductive particles dispersed in a binder or a material comprising sintered conductive particles which had to be improved in view of the working life when used for the counter electrode can also be used for the third layer covering the first layer. As the conductive particles, those comprising a metal material or carbon material can be used alone or as a mixture.

As the metal material, those metals deposited/dissolved at the working electrode, metals having less ionization tendency and, further, alloys of such metals can be used suitably, and, particularly, materials deposited/dissolved at the working electrode can be used preferably.

Further, the carbon material can include graphite, easily graphitizable carbon (soft carbon), less graphitizable carbon (hard carbon), carbon black and activated carbon. Among them, the easily graphitizable carbon is a carbon material which is graphitized when heat treated at about 2800° C. to 3000° C. and the less graphitizable carbon is a carbon material which is not graphitized even if heat treated at about 3000° C.

The easily graphitizable carbon is formed by sintering coal or pitch in a nitrogen gas stream under the conditions, at a temperature elevating rate of 1 to 20° C. per minute, at a final temperature of 900 to 1300° C., for a retention time at the final temperature of about 0 to 5 hours. Pitch includes those obtained by the operation of distillation (vacuum distillation, atmospheric distillation and steam distillation), heat polycondensation, extraction or chemical polycondensation from tars or asphalts obtained by high temperature heat decomposition of coal tar, ethylene bottom oil and crude oil, or pitches formed upon dry distillation of wood.

Further, easily graphitizable carbon can be formed also by carbonizing starting polymeric compound materials such as polyvinyl chloride resin, polyvinyl acetate, polyvinyl butyrate or 3,5-dimethylphenol resin in a nitrogen gas stream at 300 to 700° C. and then sintering then under the same conditions as described above.

Further, easily graphitizable carbon is formed also by carbonizing and sintering polycondensated polynuclear hydrocarbon compounds such as naphthalene, phenanthrene, anthracene, triphenylene, pyrene, perylene, pentaphene or pentacene and derivatives thereof (for example, carboxylic acids, carboxylic acid anhydrides, carboxylic acid imides thereof), as well as mixtures of each of the compounds, and condensated heterocyclic compounds such as acenaphthylene, indole, isoindole, quinoline, isoquinoline, quinoxaline, phthalazine, carbazole, acridine, phenazine and phenanthridine and derivatives thereof, in the same manner as described above.

On the other hand, less graphitizable carbon is formed, for example, by carbonizing and sintering furan resins, for example comprising homopolymers or copolymers of furfuryl alcohol or furfural under the same conditions as those for the easily graphitizable carbon.

Further, the less graphitizable carbon is formed from an organic material in which an oxygen-containing functional groups are introduced (so-called oxygen crosslinking) to petroleum pitch having a certain H/C atom ratio, for example, 0.6 to 0.8. For example, the less graphitizable carbon material is formed by carbonizing and sintering organic polymeric compounds having an H/C atom ratio of 0.6 to 0.8 such as phenol resin, acrylic resin, halogenated vinyl resin, polyimide resin, polyamideimide resin, polyamide resin, conjugated resin and cellulose or derivatives thereof, or condensated polynuclear hydrocarbon compounds such as naphthalene, phenanthrene, anthracene, triphenylene, pyren, perylene, pentaphene and pentacene or derivatives thereof (for example, carboxylic acids, carboxylic acid anhydrides and carboxylc acid imide thereof), as well as condensated heterocyclic compounds such as various kinds of pitches, acenaphthylene, indole, isoindole, quinoline, isoquinoline, quinoxaline, phthalazine, carbazole, acridine, phenazine and phenanthridine or derivatives thereof, comprising the mixture of each of the compounds described above as the main ingredient under the same conditions as described above.

Further, the starting material or the precursor for the easily graphitizable carbon and less graphitizable carbon described above may be carbonized or sintered after adding phosphorus compounds to them.

Further, when graphite is used as the conductive particles comprising the carbon material, natural graphite or artificial graphite prepared from the easily graphitizable carbon as a precursor and then heat treated at a high temperature of 2000° C. or higher can be used.

Characteristics of the graphite, easily graphitizable carbon, less graphitizable carbon and activated carbon are shown in Table 2 below:

TABLE 2

| Carbon Species | Crystallinity | Density | Porosity | Sintering Temperature | Conductivity |
|---|---|---|---|---|---|
| Graphite | high | high | small | high | high |
| Soft Carbon | ↓ | ↓ | ↑ | ↓ | ↓ |
| Hard Carbon | ↓ | ↓ | ↑ | ↓ | ↓ |
| Activated Carbon | low | low | large | low | low |

Further, any binder may be used so long as it has a durability to the electrolyte. For example, when a silver salt solution is used as the electrolyte, at least one of resin materials selected from natural rubber series, cellulose series, phenolic series, urethane series and epoxy series can be used for the binder.

The ratio of the conductive particles in the binder is preferably within a range from 1% by weight to 20% by weight and, particularly preferably, within a range from 1% by weight to 10% by weight. This can ensure the strength and the conductivity of the reference electrode in which conductive particles are dispersed in the binder.

Particularly, when the electrolyte is a silver salt solution and a material comprising silver particles dispersed in the binder is used for the reference electrode, Ag particles are added such that the weight ratio of the silver particles relative to a solid ingredient comprising the conductive particles and the binder to be mixed additionally is from 0.01 to 100 times, preferably, from 0.05 to 10 times. This can stabilize the potential of the reference electrode in a state in contact with the electrolyte and ensure ease of preparing the material of the reference electrode.

Further, for ensuring the dispersibility of the conductive particles to the binder and keeping the conductivity of the material to a certain level, the grain size of the conductive particles is preferably controlled within a range from several $\mu$m to tens of $\mu$m.

Further, in the reference electrode having the conductive particle layer as the third layer, the first layer has a function as a current collector layer. The first layer is disposed at the upper portion of the reference electrode, between the electrode and the adhesion layer, between the electrode and the substrate or being disposed in the electrodes. When the first layer is disposed to the upper portion of the reference electrode, the area of the first layer is made smaller than the area of the third layer so as to ensure the area of the electrode surface of the reference electrode (that is, surface in contact with the electrolyte). This allows the reference electrode to show the function thereof.

Particularly, when the reference electrode has a constitution in which the third layer of a material comprising conductive particles dispersed in a binder or of a material sintered conductive particles covers the first layer as the current collector layer, the thickness of the third layer may be from several $\mu$m to tens of $\mu$m and the thickness of the first layer may be about from 100 nm to 400 nm.

In this case, for the first layer, titanium, chromium, molybdenum, tungsten, cobalt, iron, nickel palladium, platinum, silver, gold, copper, ITO, $SnO_2$ or stainless steel (for example, SUS304) can be used in the same manner as described above. Further, only a minute current flows to the reference electrode, tantalum or niobium which has a high specific resistivity and is not suitable to the use as a current collector for the counter electrode can also be used as the current collector for the reference electrode.

If adhesion between the first layer and the substrate is not satisfactory, a second layer may be disposed as an adhesion layer between the first layer and the substrate. However, if adhesion between the first layer and the substrate is satisfactory, the second layer may be disposed only optionally, and the first layer may have a function both as the current collector layer and the adhesion layer.

Further, also in a case of constituting the material for the first layer, the second layer and the third layer of the reference electrode with the metals or metal oxides described above, they can be formed by patterning the film of the material formed, for example, by a gas phase film forming method such as vapor deposition or sputtering, or a plating method in the same manner as the counter electrode or a sol-gel method.

That is, for forming the film of the metal element or the metal oxide, it may be adopted a physical vapor deposition method of vaporizing a metal in a reduced pressure to form a film on a predetermined surface or a sputtering method of using a metal element or a metal oxide as a target and applying an AC voltage or an AC voltage combined with a DC voltage under a reduced pressure or an ambient pressure to form a desired film of a metal element or a metal oxide on a predetermined surface. The physical vapor deposition method usable herein can include a method of vaporizing a metal element or metal oxide by ohmic heating in high vacuum or a method of vaporizing a target metal or a metal oxide in high vacuum by irradiation of an electron beam (EB vapor deposition). Therefore, when the reference electrode is fabricated at the same time with the fabrication of the counter electrode, the production efficiency is improved and the cost is reduced.

Furthermore, the other gas phase film forming methods such as CVD, MOCVD and MBE are also available to form each layer of the electrodes like semiconductor film fabrication.

In case of forming a film of silicon nitride or amorphous silicon as the second layer of the counter electrode, CVD using silane gas such as monosilane or disilane for monomer gas and nitrogen or argon for carrier gas is available because a stable film can be formed in a comparatively low temperature atmosphere.

In addition, the constituent material for the first layer, second layer and the third layer of the reference electrode may be fabricated each into a desired shape and secured by means of an adhesive on a substrate or to a concave portion formed on the substrate surface in the same manner as that for the counter electrode. Such a forming method is particularly effective to form the electrode by using a material not suitable to film formation by a gas phase film forming method or a plating method or a sol-gel method, for example, iron (Fe) or stainless steel, or sintered electroconductive particles.

Further, when the third layer is constituted by using a material in which the conductive particles are dispersed in the binder, the layer can be formed by coating a binder paste in which the conductive particles are dispersed on a current collector metal or a substrate by a spin coating, spray drying, coating or printing (for example, screen printing) method.

Further, in the light control cell with the constitution described above, a spacer for defining the gap between the substrates may have a constitution serving also as the reference electrode.

In the optical device according to the present invention, the working electrode is transparent or semi-transparent (preferably having a light transmittance of 70% or higher in a visible light region)(also for the substrate), and is disposed to each of opposed pair of substrates, a counter electrode is disposed, for example, to the periphery of the working electrode (for example, at an outer edge thereof), the peripheral edge between the substrate is sealed with a spacer and the electrolyte comprising, for example, the silver salt solution described above is sealed between the opposed substrates in contact with the working electrode, the counter electrode and the reference electrode by which a cell can be assembled.

The shape of the substrate may be any of circular (for example, complete circle or ellipse) or polygonal (square, rectangular, trigonal, trapezoidal, or rhombic) shapes and the surface thereof may be flat, concave or convex.

In the present invention, the working electrode, the counter electrode and the reference electrode may be disposed on the substrate, for example, in a coaxial manner as described above but it is not restricted only to such an arrangement. For example, they may be disposed in a solid form, or in a stripe or lattice pattern. Further, a different cell may be disposed on each of divisional electrodes.

Further, ITO described above is used suitably, for example, to the working electrode, and a lead electrode such as made of chromium may be disposed in close contact with the working electrode (the lead electrode may of course be formed by patterning the same material as that of the working electrode).

Further, an aqueous or non-aqueous solution in which a salt containing a metal deposited/dissolved at the working electrode is dissolved can be used as the electrolyte. Particularly, in the optical device according to the present invention, a silver salt solution is suitable and a solution formed by dissolving a silver halide such as silver bromide, silver chloride or silver iodide in an aqueous or non-aqueous solvent can be used properly. The non-aqueous solvent usable herein can include, for example, dimethylsuolfoxide (DMSO), dimethyl formamide (DMF), diethyl formamide (DEF), N,N-dimethylacetamide (DMAA), N-methylpropionic acid amide (MPA), N-methylpyrrolidone (MP), propylene carbonate (PC), acetonitrile (AN), 2-methoxyethanol (MEOH) and 2-ethoxyethanol (EEOH).

The non-aqueous or aqueous solution in which the metal salt described above is dissolved can be used each alone or as a combination of two or more of them so long as this gives no troubles. Further, a solvent can be used alone or as a combination of two or more of solvents.

The metal salt in the electrolyte can be used at a concentration within an appropriate range in view of the conductivity of the electrolyte and the optical characteristics of the optical device. Particularly, the silver halide in the silver salt solution can be used at a concentration within a range preferably from 0.03 to 2.0 mol/l and, more preferably, from 0.05 to 2.0 mol/l.

Further, a supporting electrolyte (or an indifferent salt) may be added in order to improve the conductivity of the electrolyte and for dissolving the metal salt. In the case of the silver salt solution, it is preferred to add a salt capable of supplying bromine or like other halogen for dissolving silver halide in the case of the silver salt solution. Such a supporting salt can include, for example, sodium halide, potassium halide, calcium halide and halogenated quaternary ammonium salt. The addition amount is preferably within a range from 0.5 to 5 times the equivalent amount of the silver halide.

Since the polarization value required for depositing/dissolving the metal onto the working electrode can be reduced by electrochemically or physically modifying the working electrode, for example, an ITO electrode, this can facilitate deposition/dissolution of the metal and mitigate injuries caused by oxidation/reduction reaction of the working electrode or the electrolyte itself.

For example, as a chemical modification, the ITO electrode can be chemically plated with palladium by a 2-solution processing method using a tin salt solution and a palladium salt solution. This can deposit palladium nuclei on the surface of the ITO electrode to enhance the activity of the ITO electrode surface and, as a result, make deposition/dissolution of the metal on the surface of the ITO electrode more smoothly.

In this treatment, it is possible to use a silver salt solution obtained by dissolving from 0.10 to 1.0 g of tin chloride ($SnCl_2$) at a concentration of 0.010 to 0.10% by weight in 1 liter of hydrochloric acid as the silver salt solution, or to use a palladium salt solution obtained by dissolving from 0.10 to 1.0 g of palladium chloride ($PdCl_2$) at a concentration of 0.010 to 0.10% by weight in 1 liter of hydrochloric acid as a palladium salt solution.

The physical modification includes a method of physically vapor depositing a metal which is more noble than the metal deposited/dissolved at the working electrode on the same electrode, by which the same effect as described above can also be obtained.

The optical device according to the present invention may be fabricated also by patterning the working electrode, the counter electrode and the reference electrode, then covering the entire surface with a shading layer such as black resist and, subsequently, removing the region of the shading layer on the main surface of the working electrode, the counter electrode and the reference electrode.

Further, with regard to the counter electrode and the reference electrode it may be fabricated by forming a material layer forming the second layer on the substrate by way of a gas phase film forming method or a plating method or a sol-gel method, forming the second layer by patterning the material layer, then depositing the material for forming the first layer while covering the portion other than the main surface of the second layer with a resist over the entire surface by a gas phase film forming method or a plating method or a sol-gel method, removing an unnecessary portion of the deposited film by a lift off method by removing the resist to form the counter electrode and the reference electrode and, further, covering the entire surface with an insulation layer such as black resist and removing the insulation layer from the portion on the main surface of the counter electrode and the reference electrode.

Further, when working electrode, the counter electrode and the reference electrode are preferably formed by conducting:

a step of forming films of a material layer for forming the working electrode and a wiring material layer for the working electrode successively in this order respectively by a gas phase film forming method on a substrate, a step of patterning the material layers in an identical shape, a step of etching the wiring material layer in a state covering the peripheral edge and a portion other than the wiring region of the wiring material layer in the region of the working electrode, the counter electrode and the reference electrode by a mask, leaving the wiring material layer only in the peripheral edge and the wiring region in the region of the working electrode, the counter electrode and the reference electrode, thereby forming the working electrode, the second layer for the counter electrode and the reference electrode, and the wiring of each of those electrodes, a step of removing the mask and then depositing the material for forming the first layer over the entire surface while covering a portion other than the main surface of the second layer for the counter electrode and the reference electrode by a gas phase film forming method, removing the mask together with the material for forming the first layer thereabove by a lift-off method thereby forming the first layer for the counter electrode and the reference electrode, a step of covering the entire surface with a shading layer and then a step of removing a predetermined portion of the shading layer such as black resist thereby exposing each of the main surfaces of the first layer for the working electrode, the counter electrode and the reference electrode.

Further, when the third layer is formed to the counter electrode and the reference electrode, various steps may be considered.

At first, when the third layer is formed on the first layer by a gas phase film forming method, it is preferred to adopt a step of forming the film for the first layer and, successively, depositing the third layer over the entire surface by a gas phase film forming method.

Then, the process may be proceeded to the lift-off step, which can shorten the time for evacuation for forming the third layer to improve the production efficiency.

Further, when the third layer is formed with plated film, a film by sol-gel method, or a conductive particle layer, this is preferably conducted subsequent to the step of exposing the main surface of the first layer.

However, the present invention is not restricted only to such preferred fabrication methods and various other methods used for the production process of semiconductor devices or various displays can also be used appropriately.

In the optical device having the light control cell of the constitution described above, since the reference electrode in contact with the electrolyte is disposed, a potential difference between the reference electrode and the working electrode or the counter electrode can be detected. The reference electrode has no direct concerns with reversible electrolytic deposition/dissolution to the surface of the working electrode like that the working electrode or the counter electrode but always shows a constant dipping potential in a state in contact with the electrolyte. Accordingly, the potential for the working electrode or the counter electrode in contact with the electrolyte can be obtained based on the detected potential difference.

Then, when the reference electrode is constituted with a material deposited on the surface of the working electrode or a material containing the metal, the potential for the reference electrode in contact with the electrolyte can be made equal with that of the substance deposited on the surface of the working electrode. Therefore, the potential for the working electrode or the counter electrode can be detected based on the stable potential for the reference electrode.

Further, in the reference electrode of the constitution disposing the second layer as an adhesion layer between the first layer and the substrate, it is possible to ensure adhesion between the first layer and the substrate and ensure the mechanical stability and the potential stability of the reference electrode on the surface of the substrate.

Also in the reference electrode, when gold, platinum or palladium is used for the first layer, adhesion with a glass substrate can be ensured by using a transition metal such as chromium, titanium or tungsten, a metal oxide such as ITO or tin oxide or an insulation material such as silicon dioxide or amorphous silicon as the adhesion layer for the second layer like that the counter electrode.

Further, in the optical device having the light control cell of the constitution described above, after disposing the current collector layer as the first layer, the first layer is covered with a material comprising conductive particles dispersed in a binder as the third layer to constitute the reference electrode, and the potential for the electrodes can be stabilized.

Then, the circuit constitution of the optical device using the light control cell of the constitution described above is to be explained.

In the optical device, an external power source is connected to the working electrode and the counter electrode for supplying current to the electrodes. As the external power source, a constant current power source is often used. However, the power source is not restricted only thereto but various power sources such as a constant voltage power source or a pulse power source can be used in accordance with appropriate control. Further, a voltmeter is connected between the reference electrode and the working electrode. Further, a controlling means such as a limiter is connected between the voltmeter and the external power source such that the current supplied from the external power source can be controlled by a potential difference measured by the voltmeter.

The optical device having the circuit constitution described above is driven, for example, as described below.

That is, a driving voltage of a direct current is applied for a predetermined period of time between the working electrode as a cathode and the counter electrode as an anode, and a deposition substance (for example, Ag in case of using a silver salt solution) is deposited from an electrolyte on the surface of the working electrode to make the working electrode in a colored state. Further, a driving voltage is applied between the working electrode as the anode and the counter electrode as the cathode and the deposition substance on the working electrode is dissolved into the electrolyte to render the working electrode transparent. In this case, a potential difference of the working electrode and/or the counter electrode relative to the reference electrode is monitored by the voltmeter. Then, current flowing from the external power source is controlled by a limiter such that the potential differences is kept within a predetermined range. That is, it is constituted such that current supplied from the external power source is controlled by the limiter at the instance the voltmeter indicates that the potential difference between the working electrode and the reference electrode reaches a predetermined value and the potential difference between the working electrode and the reference electrode is kept within a predetermined range.

The range for the potential difference of the working electrode and/or the counter electrode relative to the reference electrode is determined depending on the composition of the electrolyte, the material of the working electrode, the material of the first or third layer of the counter electrode and the material of the first or the third layer of the reference electrode constituting the light control cell. That is, the range of the potential difference is determined such that the constituent substances of the electrolyte do not cause oxidation/reduction reaction by the polarization at the working electrode. For example, when iodine ions (I–) is included as the anion in the electrolyte, the external power source is controlled by the limiter such that the potential of the working electrode is kept within a range of +2 V or lower relative to the potential of the standard hydrogen electrode (in the range not causing discoloration of the electrolyte considered to be attributable mainly to oxidation reaction of the iodine ions). In this case, assuming that the surface of the reference electrode is constituted by using silver (Ag), since the standard electrode potential of silver is +0.798 V vs. NHE, which shows substantially the same value also in a non-aqueous medium, the external power source is controlled by the limiter such that the potential of the working electrode is kept within a range of +1.2 V vs. NHE or lower.

When the electrolyte described above is used and the reference electrode is constituted by using a metal which is more noble than silver (Ag), that is, platinum (Pt), palladium (Pd) or gold (Au), the external power source is controlled within a range of the potential of such a metal relative to silver (Ag).

For example, in an aqueous solution constituting the electrolyte, a noble potential is shown relative to silver (Ag) of about 0.39 V with platinum (Pt), about 0.12 V with palladium (Pd) and about 0.72 V with gold (Au). Substantially the same potential is shown also in the silver salt solution described previously.

In view of the above, the external power source is controlled by the limiter such that the potential difference of the working electrode relative to the reference electrode is kept within a range of about +0.81 V (=+1.2V–0.39 V) or lower in the electrolyte described above.

Further, for the reference electrode using palladium (Pd), the external power source is controlled by the limiter such that the potential difference of the working electrode relative to the reference electrode is kept within a range of about +1.08 V (=+1.2 V–0.12 V) or lower.

Further, for the reference electrode using gold (Au), the external power source is controlled by the limiter such that the potential difference of the working electrode relative to the reference electrode is kept within a range of about +0.48 V (=+1.2 V–0.72 V) or lower.

In the optical device having such a constitution, the external power source is controlled by the limiter and the potential of the working electrode is kept within the predetermined range. Therefore, excess polarization at the working electrode can be prevented.

Then, in the method of driving the optical device described above, since current supply to the working electrode is controlled such that the potential between the reference electrode and the working electrode is kept within the predetermined range, excess polarization at the working electrode during current supply is suppressed. Then, light control is conducted by reversible electrolytic deposition/dissolution between the electrolyte and the surface of the working electrode while preventing the undesired effect of excess polarization at the working electrode exerted on the substance in the electrolyte.

Accordingly, when iodine ions (I) are dissolved, for example, as anions of the electrolyte or the supporting electrolyte, coloration of the electrolyte considered to be attributable mainly to the oxidation of the iodine ions can be prevented. As a result, it is possible to keep the optical characteristics of the optical device satisfactorily.

Further, also when polarization of the counter electrode is so large, the undesired effect of the excess polarization can be suppressed by connecting the limiter between the counter electrode and the reference electrode, monitoring the potential of the counter relative to the reference electrode and controlling a current to the counter electrode and the working electrode.

Further, since the external power source is controlled based on the stable potential of the reference electrode, it is also possible to prevent insufficient deposition/dissolution at the working electrode due to unnecessary suppression of the current to cause disadvantages such as insufficient extinction or insufficient deposition of the deposited substances. Accordingly, light control can be conducted accurately.

The optical device according to the present invention is not restricted only to the reflection type but it is applicable also to a transmission type. Other known filter materials, for example, organic electrochromic material, liquid crystal, electro-luminescent material or the like may be used in combination. Further, the device is applicable to optical diaphragm for CCD, as well as for optical amount control in various optical systems, for example, electro-photographic copiers or communication equipments and, further, to such application uses as various types of image display devices displaying characters or images other than the optical filters.

Figure 4:
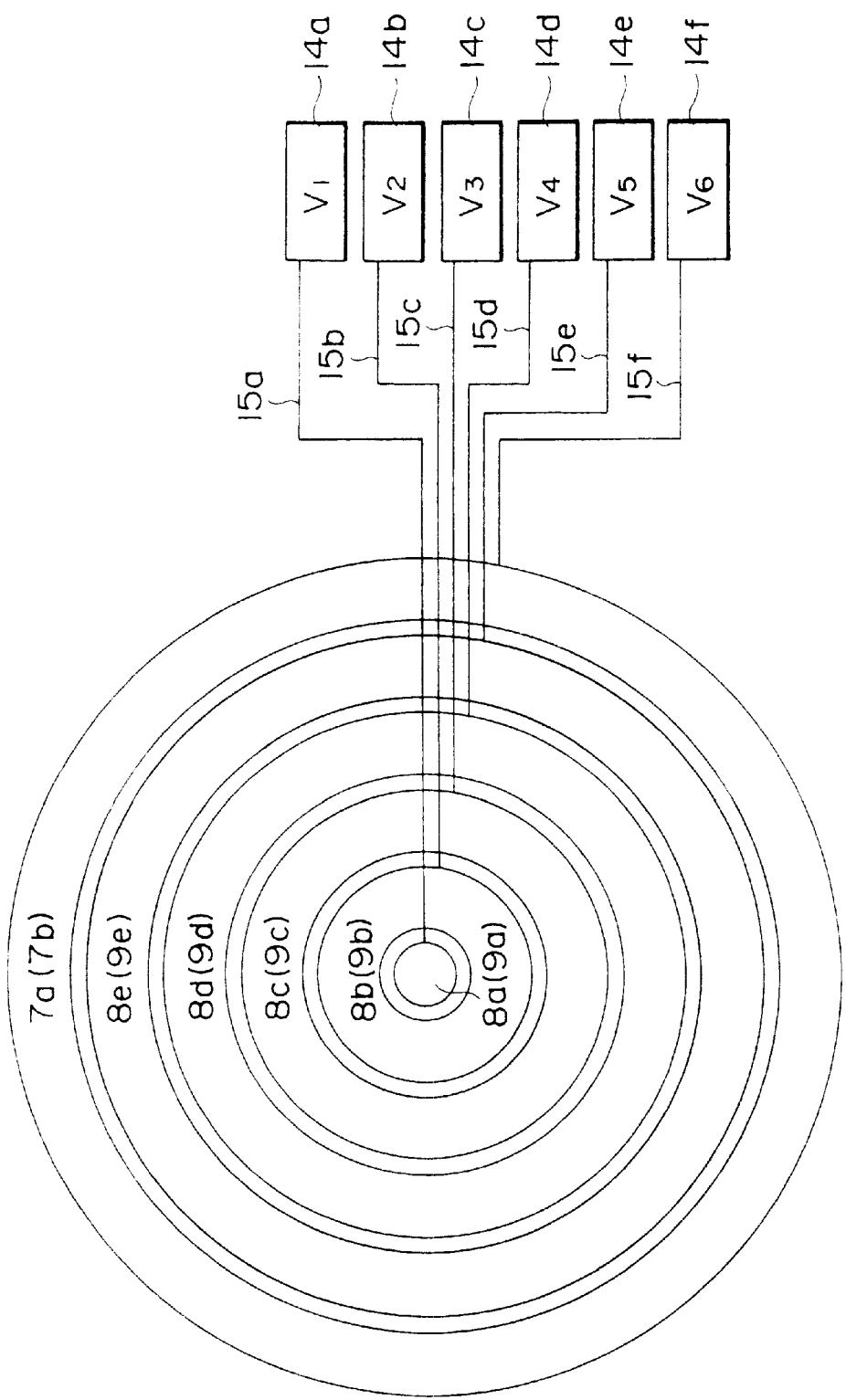
FIG. 4 is a schematic plan view for a working electrode and a counter electrode used in the existent optical device.

Further, the optical device according to the present invention described above (for example those having an electrode pattern as shown in FIG. 4) is used suitably for light control in a camera systems such as a CCD (Charge Coupled Device) camera. In this case, when the light control cell of the optical device according to the present invention is attached on the same optical path as an existent optical filter or an optical diaphragm has been installed so far for the light amount control (light amount restriction) of a camera, while replacing the existent optical parts entirely or partially a stable control of the light amount ca be done.

Since the optical device according to the present invention can control the amount of light by the application of the electric field as described previously, it requires no mechanism for driving the diaphragm and is different basically from the existent mechanical light amount control mechanism, so that the system can be reduced in the size, substantially, to the effective range of the optical width. Accordingly, it is possible to reduce the size of the CCD camera. Furthermore, since the amount of light can be stably controlled appropriately depending on the level of the voltage applied to the patterned electrodes, diffraction phenomenon in the prior art can be prevented and a sufficient amount of light can be entered into an image sensing device to eliminate image blurring. Since the optical device according to the present invention can be driven stably, stable light amount control is possible if the light control cell of the optical device according to the present invention is attached on the identical optical path for the light amount control (light amount restriction), stable optical amount control is possible.

EXAMPLES

The present invention is to be explained more specifically with reference to preferred examples.

First Example

Figure 3:
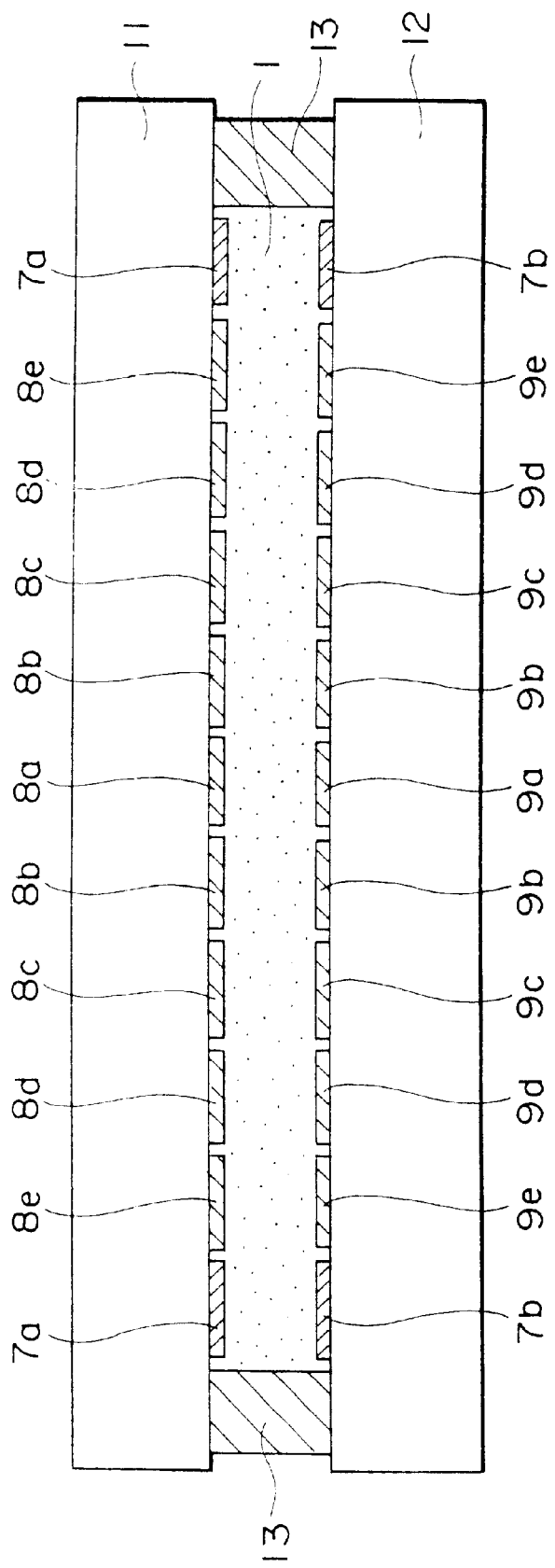
FIG. 3 is an enlarged cross sectional view illustrating the constitution of another existent optical device.

In this example, the cell structure of an electrochemical light control device (optical filter) has similar constituent parts to an existent structure explained with reference to FIG. 3 and FIG. 4. As shown in an enlarged view in FIG. 6, it is a significant feature to dispose a counter electrode and a reference electrode according to the present invention (FIG. 7 shows a schematic cross section for the entire cell structure).

Figure 6:
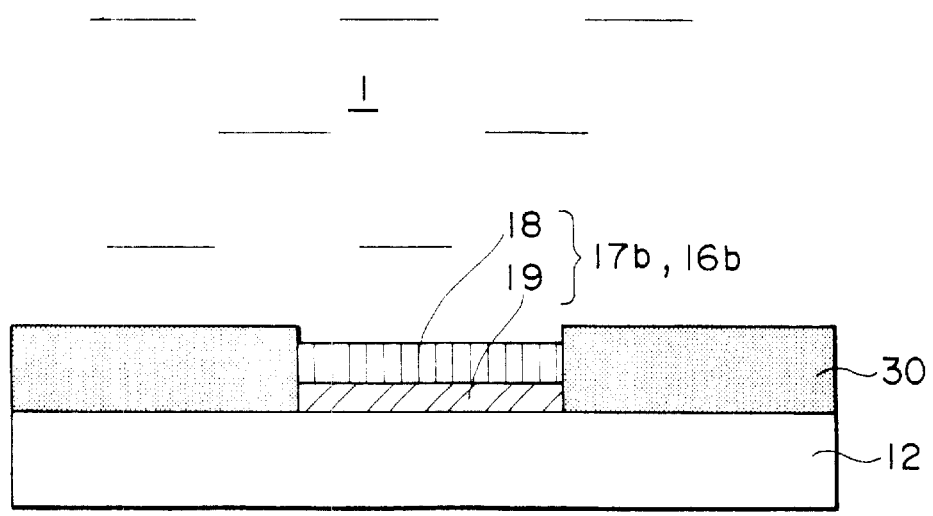
FIG. 6 is an enlarged cross sectional view of a counter electrode having a 2-layered structure used in an optical device as a preferred embodiment of the present invention.

As shown in FIG. 6, a counter electrode 17b and a reference electrode 16b are formed as a laminate structure of an underlying layer (a second layer) 19 comprising ITO and a first layer 18 comprising platinum on a glass substrate 12. The counter electrode 17b and the reference electrode 16b are surrounded at the circumferential edge thereof with black resist 30 in intimate contact in which the surface of the counter electrode or the reference electrode is at the position nearer to the substrate than the black resist surface (lower position). The same constitution is also adopted for the opposing counter electrode 17a and reference electrode 16a.

Accordingly, when the counter electrodes 17a, 17b are dipped in a silver salt solution 1, particularly, no edges in contact with the solution 1 are not present at the peripheral edge of the counter electrodes. Further, in the counter electrode 17b and the reference electrode 16b, the first layer 18 in contact with the solution 1 comprises platinum having lower ionization tendency than silver (showing more noble potential), and the second layer 19 comprises ITO having good adhesion with the glass substrate 12.

Figure 7:
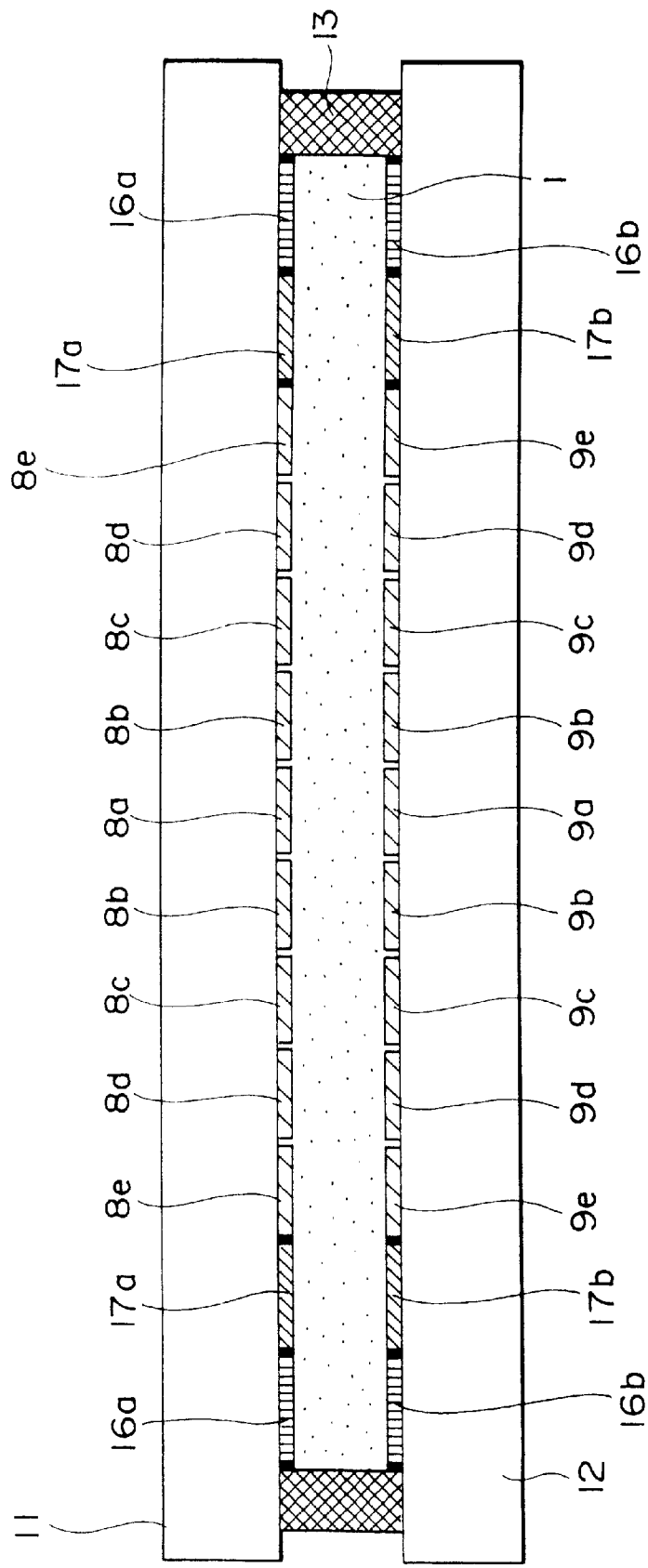
FIG. 7 is a schematic cross sectional view illustrating the constitution of a light control cell in the optical device.

Further, as shown in FIG. 7, on opposing surfaces of a pair of glass substrates 11 and 12 opposed to each other, are disposed transparent working electrodes made of ITO (electrodes 8a, 8b, 8c, 8d, 8e and electrodes 9a, 9b, 9c, 9d and 9e are opposed respectively to each other) and counter electrodes (electrodes 17a, 17b are opposed to each other at the peripheral position of the working electrodes) in a similar pattern as shown in FIG. 4. The substrates 11 and 12 are kept at a predetermined distance by spacers 13 disposed to the outer edge thereof and an electrolyte 1 in which a silver salt is dissolved is sealed in a gap. The counter electrodes 17a, 17b and the reference electrodes 16a, 16b are electrodes each of a laminate structure in which an ITO film 19 as an underlying layer is formed as a second layer by gas phase film forming method such as sputtering on the glass substrate 11, 12, and a platinum film 18 as a first layer is formed thereon by a gas phase film forming method such as EB deposition.

The working electrodes 8a–8e, 9a–9e, the counter electrodes 17a, 17b and the reference electrodes 16a and 16b were formed on the glass substrates by fabrication steps to be explained below. Explanation is to be made for the counter electrode 17b and the reference electrode 16b on one side but the counter electrode 17a and the reference electrode 16a on the other hand were formed in the same manner.

Figure 8A:
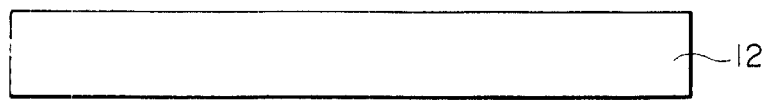
FIG. 8A through FIG. 8F are cross sectional views illustrating the steps of fabricating a working electrode, a counter electrode and a reference electrode in the optical device successively.
Figure 8B:
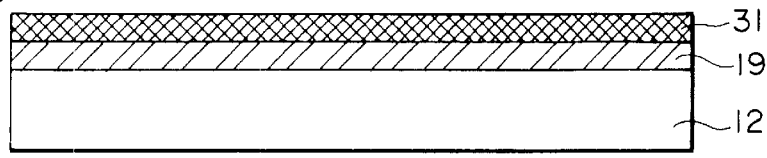

At first, on a glass substrate 12 shown in FIG. 8A, an ITO film 19 was formed to a thickness of about 200 nm by a sputtering method and then a chromium metal film 31 was formed further thereon in the same manner to a thickness of about 200 nm as shown in FIG. 8B.

Figure 8C:
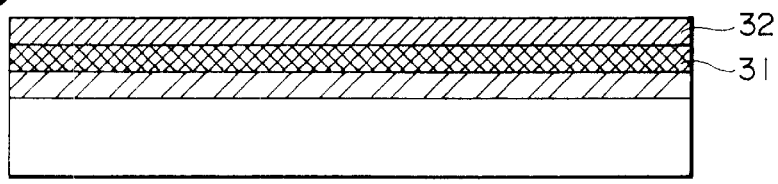
Figure 8D:
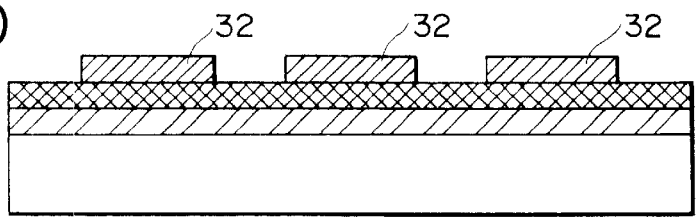

Then, as shown in FIG. 8C, a photo-resist 32 was coated by a spin coating method and then as shown in FIG. 8D, it was exposed to a desired pattern by using an exposure mask (a pattern for forming working electrode, counter electrode and reference electrode portions) and developed.

Figure 8E:
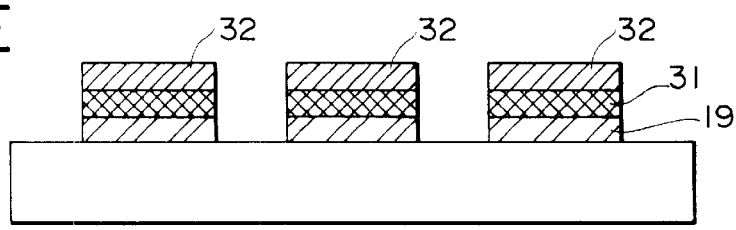
Figure 8F:
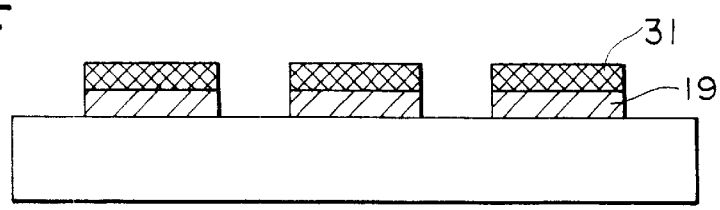

Subsequently, as shown in FIG. 8E and FIG. 8F, the chromium layer 31 was etched and, further, the ITO layer 19 therebelow was etched patternwise using the photo-resist 32 as a mask, to peel the photo-resist 32 and leave a working electrode material layer comprising the ITO layer 19 and the chromium layer 31 and the counter electrode material layer and the reference electrode material layer comprising the ITO layer 19 were formed on the substrate 12.

Figure 9A:
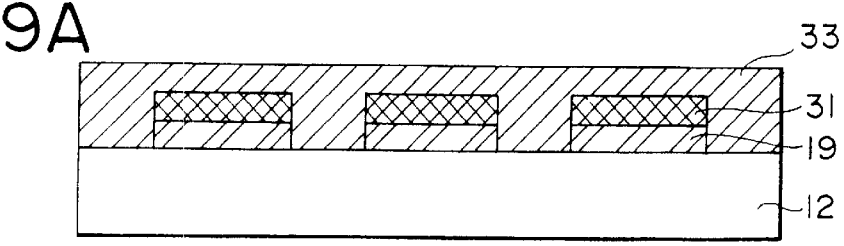
FIG. 9A through FIG. 9F are cross sectional views illustrating the fabrication steps of the optical device successively.
Figure 9B:
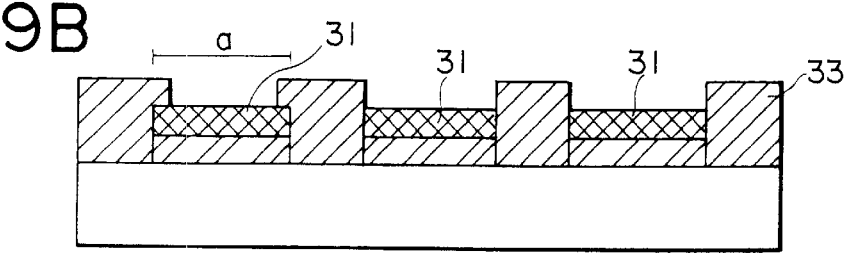

Then, as shown in FIG. 9A, a photo-resist 33 was coated over the entire surface by a spin coating method and then, as shown in FIG. 9B, exposure and development were conducted to a predetermined pattern by using an exposure mask.

Figure 9C:
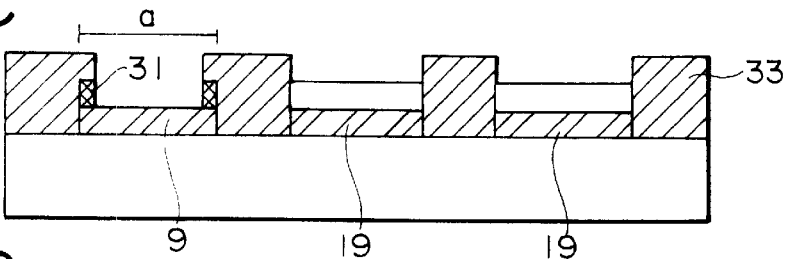

Then as shown in FIG. 9C, the chromium film 31 was etched so as to leave the chromium layer 31 as the lead electrode on the ITO 9 of the working electrode portion, on the ITO 19 of the counter electrode and reference electrode portions. In FIG. 9C, the lead electrodes on the counter electrode and the reference electrode portions are not shown (the same in figures thereafter). However, the lead electrodes were also left on a part of the counter electrode and reference electrode by the photo-resist so as to connect these electrodes to an external circuit electrically (Later examples and comparative examples are the same).

Figure 9D:
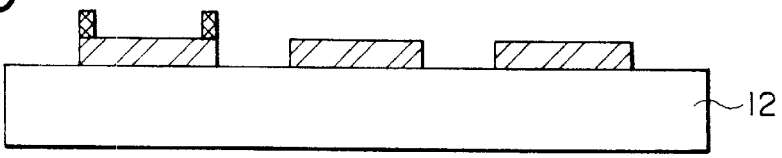
Figure 9E:
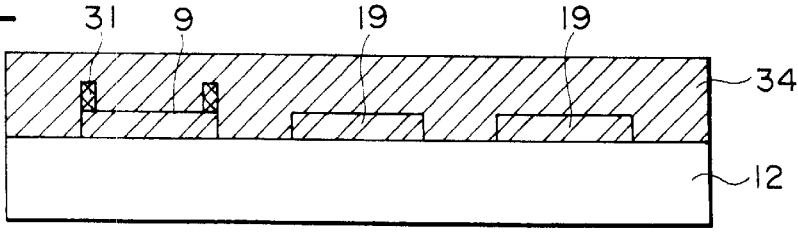
Figure 9F:
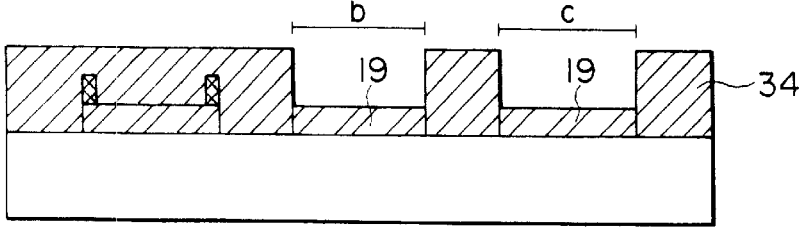

Then, as shown in FIG. 9D, after peeling the photo-resist 33, a photo-resist 34 was coated entirely by a spin coating method as shown in FIG. 9E, and then exposure and development were conducted to such a pattern as removing the counter electrode and reference electrode portions by using an exposure mask as shown in FIG. 9F.

Figure 10A:
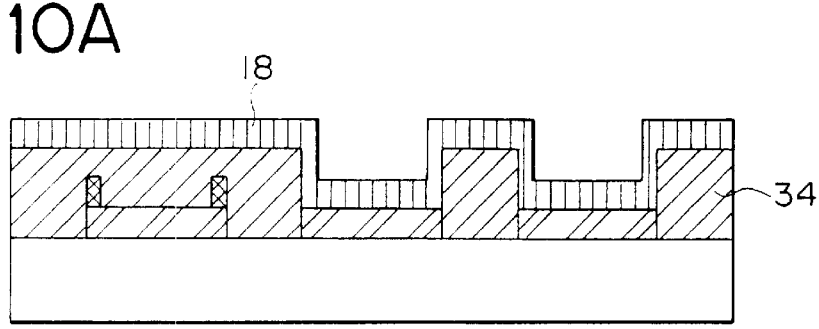
FIG. 10A through FIG. 10D are cross sectional views illustrating the fabrication steps of the optical device successively.

Then, as shown in FIG. 10A, a film of platinum 18 was formed over the entire surface to a thickness of 100 nm by an EB deposition method.

Figure 10B:
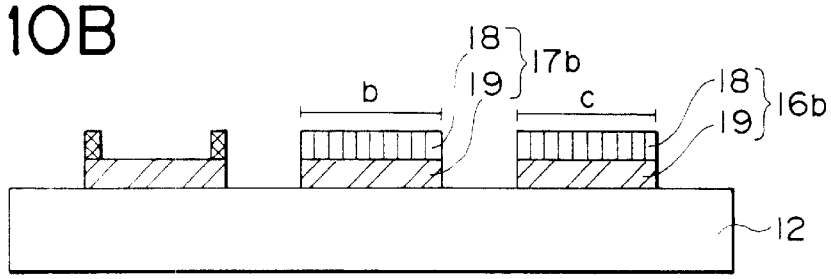

Then, as shown in FIG. 10B, the photo-resist 34 and platinum 18 thereon were peeled by a lift-off method by dipping in an acetone solution, to form a working electrode comprising the ITO layer 19 having the lead electrode 31, and the counter electrode 17b and the reference electrode 16b each comprising a platinum layer (first layer) 18 laminated on the ITO layer (second layer) 19 as the underlying layer were formed on the substrate 12.

Figure 10C:
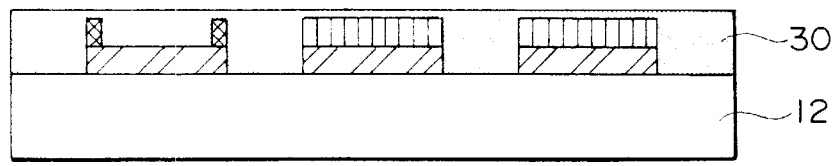
Figure 10D:
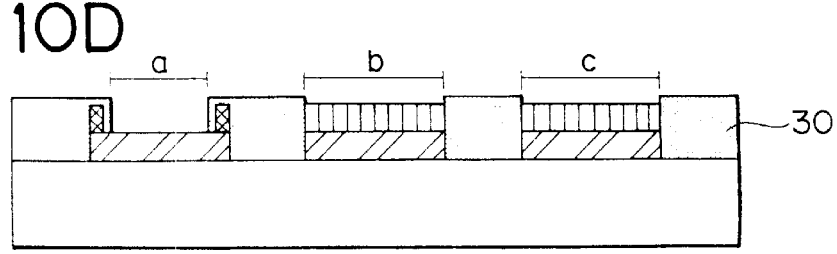

Then, in order not to allow light to permeate the portions other than the working electrode, a photosensitive black resist 30 completely absorbing the visible light was coated by a spin coating method as shown in FIG. 10C, and the black resist 30 was optically exposed and developed by using an exposure mask as shown in FIG. 10D to obtain a desired substrate in which the main surface for each of the electrodes was exposed while leaving the black resist 30 at the peripheral edge of the working electrode 9 and at the periphery of the counter electrode 17b and the reference electrode 16b.

In the thus obtained substrate, as shown in FIG. 10D, since each of the counter electrode 17b and the reference electrode 16b has a laminate structure of the first layer 19 comprising ITO and the second layer 18 comprising platinum, the periphery of the laminate structure was surrounded with the black resist 30 and the electrode surface thereof is on the side nearer to the substrate than the black resist surface. Accordingly, when the electrode surfaces are in contact with the silver salt solution, no edges in contact with the silver salt solution are not present at the peripheral edge of the counter electrode and the reference electrode.

The working electrode 9 was formed in the same manner and the peripheral edge including the lead electrode 31 is covered with the black resist 30.

By using the substrate obtained in the fabrication steps described above, a pair of substrate provided with the working electrodes 8a–8e and 9a–9e, the counter electrodes 17a and 17b and the reference electrodes 16a and 16b were appended by way of the spacers 13 and the following silver salt solution 1 was sealed in the inside to assemble a cell.

In the silver salt solution 1 used, 500 mM of silver bromide and 750 mM of sodium iodide were dissolved in a mixed solvent of dimethyl sulfoxide (DMSO)/acetonitrile (AN)=55/45 (by volume ratio).

Figure 11:
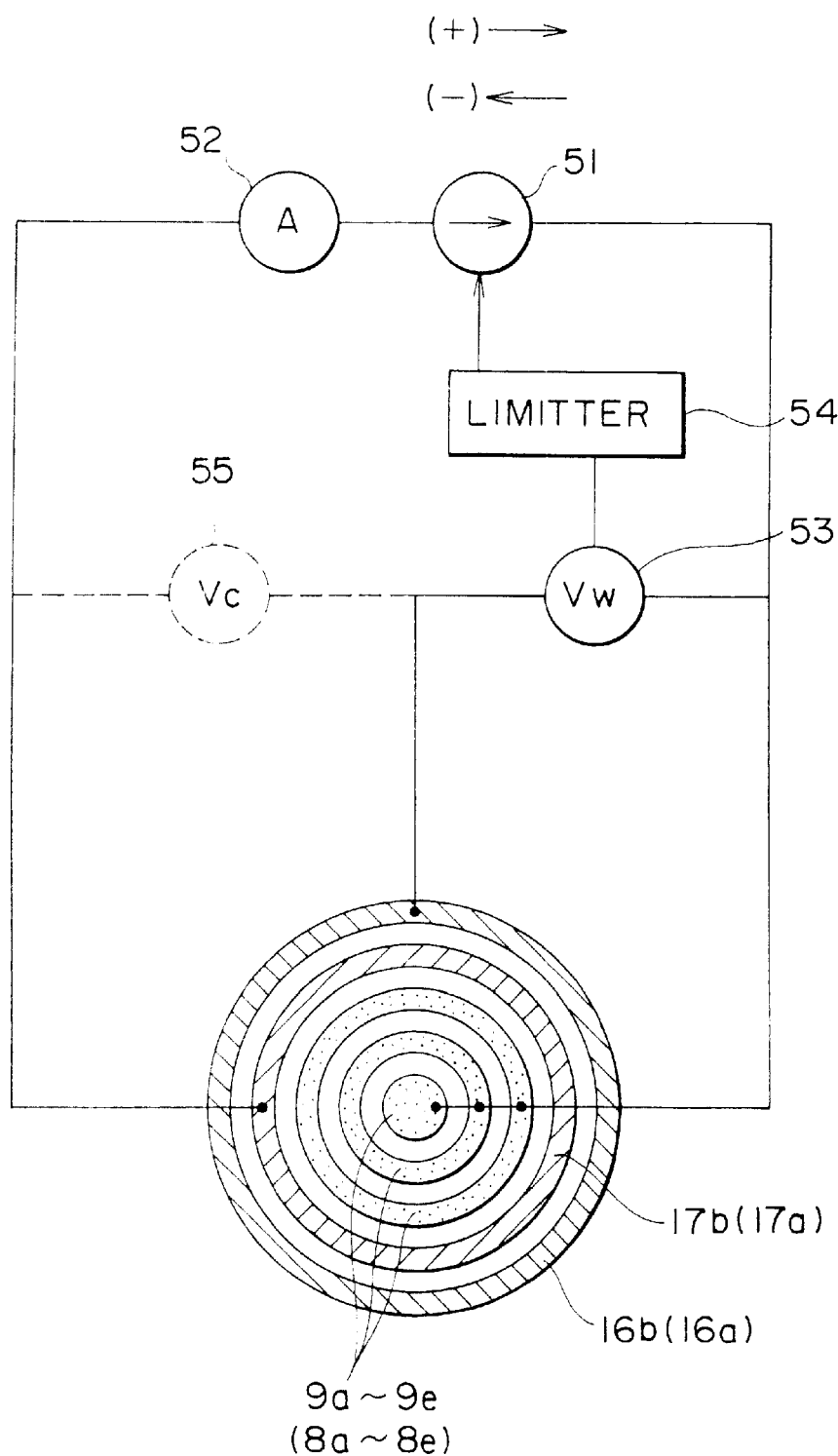
FIG. 11 is an enlarged cross sectional view illustrating the structure of various types of counter electrode used in an example of the present invention and a comparative example.

Subsequently, as shown in FIG. 11, an external circuit is attached to the light control cell to provide an optical device of Example 1.

That is, an external power source 51 and a current meter 52 are connected in series to each other to the working electrodes 8a–8e and 9a–9e, the counter electrodes 17a and 17b and the reference electrodes 16a and 16b. Further, a voltmeter 53 was connected between the reference electrode 16a and 16b, and the working electrode 8a–8e and 9a–9e in parallel with the external power source 51. Further, a limiter 54 is connected between the voltmeter 53 and the constant current power source 51 such that current supplied from the constant current power source 51 is controlled by the potential difference measured by the voltmeter 53. In this example, a voltmeter 55 (Vc) is disposed between the reference electrode 16b (16a) and the counter electrode 17b (17a) for measuring the potential of the counter electrode 17b (17a) relative to the reference electrode 16b (16a).

The optical device fabricated as described above was put to a driving test as below.

(A) Comparison Between the Counter Electrode of the Present Invention and the Existent Counter Electrode Substrates of Comparative Example 1–Comparative Example 5 were fabricated as shown below and, like that in Example 1, a light control cell was assembled as shown in FIG. 7 and an external circuit was attached as shown in FIG. 11 to obtain respective optical devices.

FIG. 12 shows cross sectional views of substrates obtained in each of the examples but the reference electrode is not illustrated in FIG. 12.

Comparative Example 1

Figure 12A:
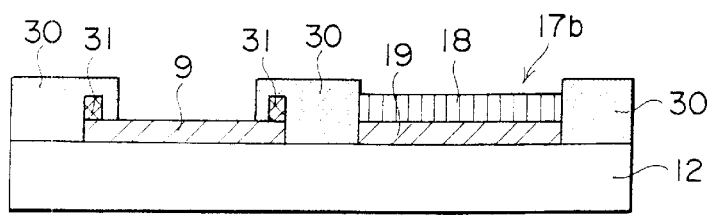
FIG. 12A through FIG. 12F are enlarged cross sectional views illustrating the constitution of an optical device according to the present invention.
Figure 12B:
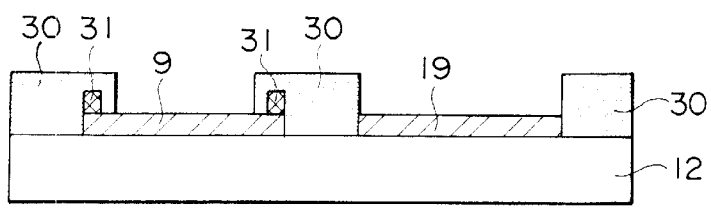
Figure 12C:
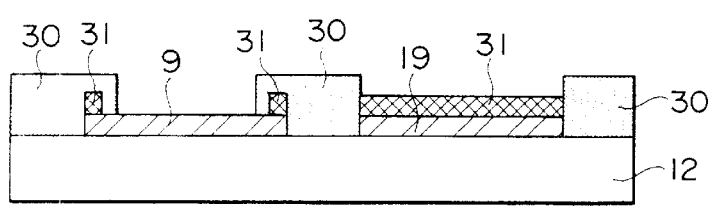

Processing steps of FIG. 9C and FIG. 9D were conducted without removing the resist at the counter electrode portion in the step of FIG. 9B and then the processing steps for FIG. 10C and FIG. 10D were conducted not by way of the processing steps for FIG. 9E–FIG. 10B conducted in Example 1 to obtain a substrate shown in FIG. 12C. A cell of a Comparative Example 1 was fabricated in the same manner as in Example 1 except for using the thus fabricated substrate. In the counter electrode 17b of the cell, the second layer 19 comprises ITO and the first layer 31 comprises chromium.

Comparative Example 2

In Example 1, processing steps for FIG. 10C and FIG. 10D were conducted not by way of the processing steps from FIG. 9E to FIG. 10B to obtain a substrate shown in FIG. 12B. A cell of Comparative Example 2 was fabricated in the same manner as in Example 1 except for using this substrate. The counter electrode 17b of the cell comprises only the ITO layer 19.

Comparative Example 3

Figure 12D:
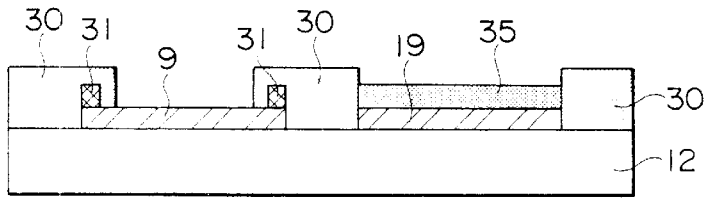

The same processing steps as in Example 1 were conducted except for vapor depositing silver 35 to a thickness of 150 nm by an EB vapor deposition method instead of EB vapor depositing platinum in the step of FIG. 10A to obtain a substrate shown in FIG. 12D. A cell of Comparative Example 3 was fabricated in the same manner as in Example 1 except for using the thus obtained substrate. The counter electrode 17b of the cell has a laminate structure in which the first layer (silver) 35 was laminated on the second layer (ITO) 19.

Comparative Example 4

Figure 12E:
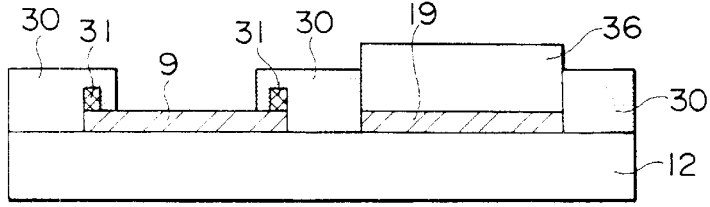

In Comparative Example 3, a substrate shown in FIG. 12E was obtained by fitting a silver plate 36 into a concave portion on the ITO layer 19 not by way of the vapor phase film forming method (EB vapor deposition method) of the counter electrode. A cell of Comparative Example 4 was fabricated in the same manner as in Example 1 except for using the substrate.

Comparative Example 5

Figure 12F:
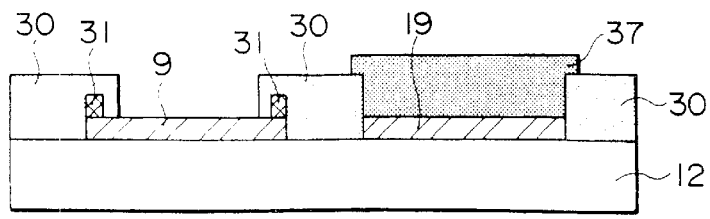

Comparative Example 1 has no platinum layer on the counter electrode portion, nor does Comparative Example 5 have a platinum layer formed by gas phase film forming method. In Comparative Example 5, a paste prepared by dispersing/mixing a fine silver powder at the same weight as graphite by a binder was screen printed to a thickness of about 20 μm covering the ITO layer 19 and then the solvent in the paste was removed by drying to obtain a substrate having a counter electrode 17b of a resin layer 37 containing a silver powder and graphite as shown in FIG. 12F to obtain a substrate. A cell of Comparative Example 5 was fabricated in the same manner as in Example 1 except for using the thus obtained substrate.

Using each of the cells of Example 1 and Comparative Example 1 to Comparative Example 5 described above, a constant current was supplied to the ITO electrode as the working electrode (8a, 8b, 8c, 8d, 8e and 9a, 9b, 9c, 9d, 9e) and a counter electrode (17a or 17A, 17b or 17B) to deposit/dissolve silver on the working electrode (ITO electrode). Since the performance of the counter electrode is compared in this case, control of the external power source by the limiter in accordance with the potential difference of the working electrode relative to the reference electrode was not conducted (also in Example 2 to Example 4 to be described later). Electric current supply was conducted for 2 sec both in deposition and dissolution such that the current density was 18 mA/cm2 in the ITO electrode both for the deposition and dissolution for about 2 sec. This is defined as 1 cycle for the deposition/dissolution of silver. The following Table 3 shows the changes observed in the cells after repeating the cycles of deposition/dissolution for a number of times

TABLE 3

| | |
|---|---|
| Example 1 | No abnormality |
| Comparative Example 1 | The electrolyte turned yellow around the counter electrode |
| Comparative Example 2 | The electrolyte turned yellow around the counter electrode |
| Comparative Example 3 | The electrolyte turned yellow around the counter electrode |
| Comparative Example 4 | The electrolyte was clouded |
| Comparative Example 5 | The electrolyte turned yellow around the counter electrode |

From the results, it can be seen that some or other disadvantages occur in Comparative Example 1–Comparative Example 5 other than Example 1.

Figure 13:
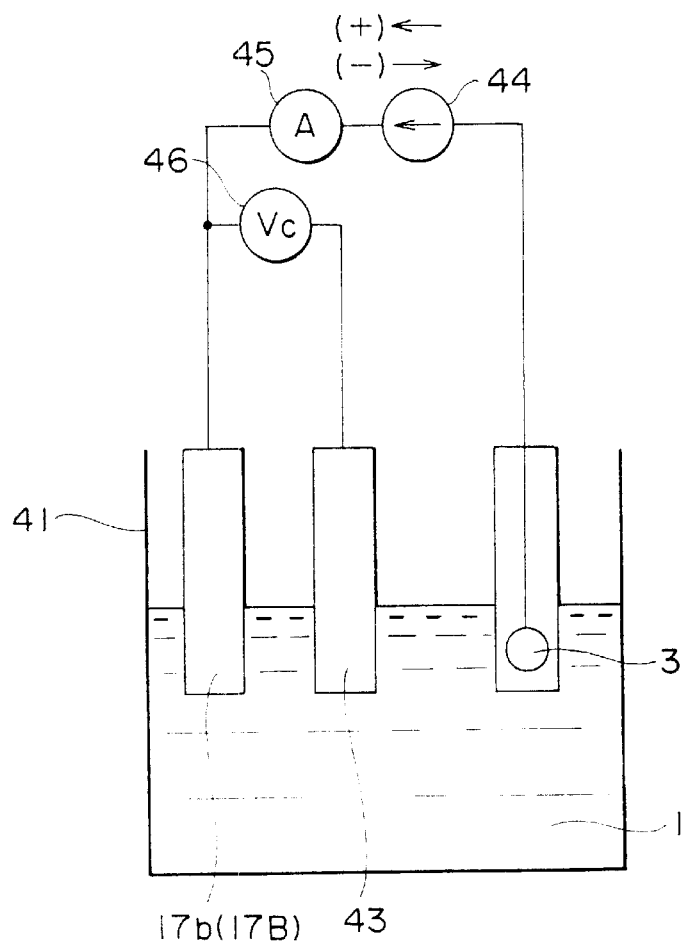
FIG. 13 is a conceptional view for explaining a beaker cell test of examining the polarization characteristics of a counter electrode in an optical device according to the present invention.

Then, in Example 1 and Comparative Example 1–Comparative Example 5, for examining the potential change with time, particularly, for the counter electrode (17a, 17b) during driving, the potential change of the counter electrode 17B of each of the same composition in Example 1 and Comparative Example 1–Comparative Example 5 relative to the silver plate 43 (polarization potential) was measured with lapse of time by using a beaker cell 41 shown in FIG. 13 and using a silver plate 43 as the reference electrode (standard electrode) in an identical solution system when a constant current at an identical current density was supplied to the working electrode 9. In this measurement, current flowing in the direction to the counter electrode 17B is defined as positive (+). In the drawing are shown a constant current source 44, a current meter 45 and a volt meter 46. Since the reference electrode 43 is disposed in contact with the electrolyte, an exact potential of the working electrode or the counter electrode in the electrolyte can be obtained.

Figure 14:
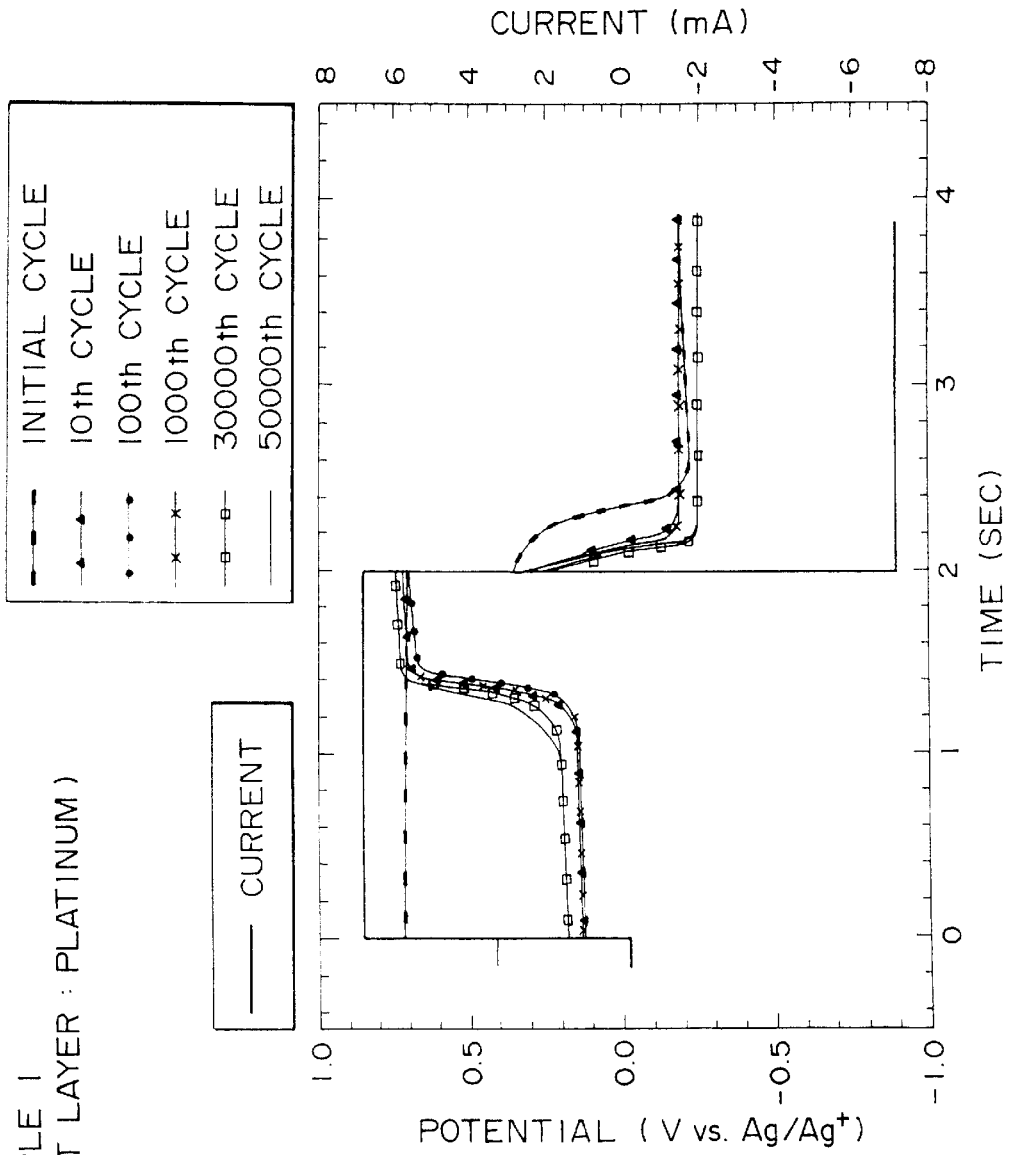
FIG. 14 is a graph showing the change with time for the counter electrode potential and current value upon driving the device of Example 1 of the present invention.

The change with time of the potential and the current at the counter electrode 17B relative to the silver plate 43 in the deposition/dissolution cycle of silver on the working electrode 9 is shown for Example 1 in FIG. 14 and Comparative Example 1–Comparative Example 5 in FIG. 15–FIG. 19, respectively (the scale on the ordinate (potential) may be different depending on the figures).

From the results, as shown in FIG. 14, since the uppermost surface (first layer) of the counter electrode 17b is platinum in Example 1, the natural potential of the counter electrode 17b shows about 0.4 V with reference to silver. Subsequently, silver is deposited/dissolved on the working electrode 9 as 1 cycle. When the working electrode is polarized to the reduction (−) direction and silver is deposited on the transparent electrode thereof, the counter electrode 17B is polarized in the opposite oxidation (+) direction. When the working electrode 9 is polarized conversely to the oxidation direction (+) and silver on the transparent electrode thereof is dissolved, the counter electrode 17B is polarized conversely to the reduction side (−).

In the initial cycle described above, since silver is not present on the counter electrode 17B, when silver is deposited on the ITO surface of the working electrode 9, the potential of the counter electrode 17B is polarized to the oxidation direction by about 0.7 V with reference to the silver plate. When silver is dissolved from ITO of the working electrode 9, the potential of the counter electrode 17B is conversely polarized to a more basic potential and silver is deposited on the platinum surface of the counter electrode 17B. It can be seen that polarization of the counter electrode 17B at second cycle and thereafter is much smaller than that in the initial cycle when an oxidation (+) current flows into the counter electrode 17B.

In this Example 1, silver deposited on the platinum surface of the counter electrode is white and deposited substantially uniformly on the platinum surface. While reaction occurs preferentially depending on the place due to the difference for the concentration of the electric field by repeating deposition/dissolution, the form of the deposits or the polarization potential of the counter electrode 17B scarcely changes even when the deposition/dissolution cycles of the silver are repeated for 50000 cycles or more. Then, platinum can be said to be an excellent electrode material for reversible deposition/dissolution reaction of silver thereon.

Figure 15:
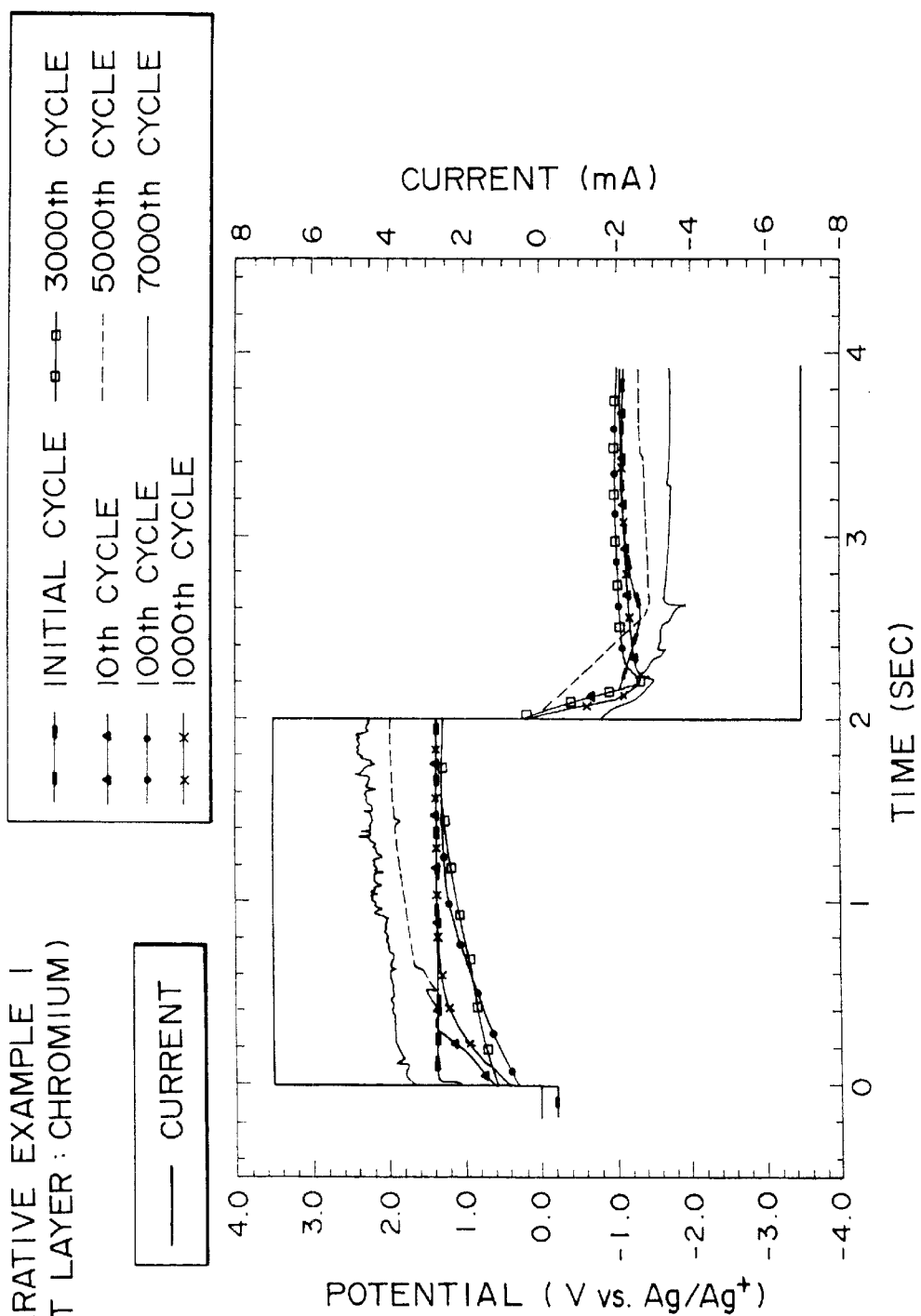
FIG. 15 is a graph showing the change with time of the counter electrode potential and the current value upon driving the device of Comparative Example 1.

On the contrary, in Comparative Example 1 as shown in FIG. 15, since the uppermost surface of the counter electrode 17B is made of chromium and silver is not present on the counter electrode 17b at the initial stage, the polarization potential of the counter electrode is high upon oxidation and shows a potential of about 1.3 V relative to the silver plate of the reference electrode. Subsequently, silver is deposited on the chromium surface of the counter electrode upon reduction, and the polarization potential upon oxidation at or after the second cycle is gradually lowered. Subsequently, while deposition/dissolution reaction of silver is observed on the chromium surface of the counter electrode 17B thereafter, the reaction is no more observed about at 1000 cycle and, instead, localized segregation of deposits not dissolved upon oxidation is observed on the surface of the counter electrode 17B. In the course of the process, the polarization potential upon oxidation also becomes higher and the electrolyte turns yellow near the surface of the counter electrode 17B. This is considered that the polarization value takes 1.2 V vs. Ag/Ag$^+$ or more and iodine ions are mainly oxidized (formation of iodine atoms or molecules), and coloration of the electrolyte becomes remarkable as the cycle proceeds and it gives undesired effect on the optical characteristics when it is used as an optical device.

Further, black deposits are formed on the chromium surface about after 3000 cycle and the polarization value upon oxidation of the counter electrode 17B exceeds 2 V vs. Ag/Ag$^+$ at 5000 cycle in which control is difficult and the electrode can no more be used.

Figure 16:
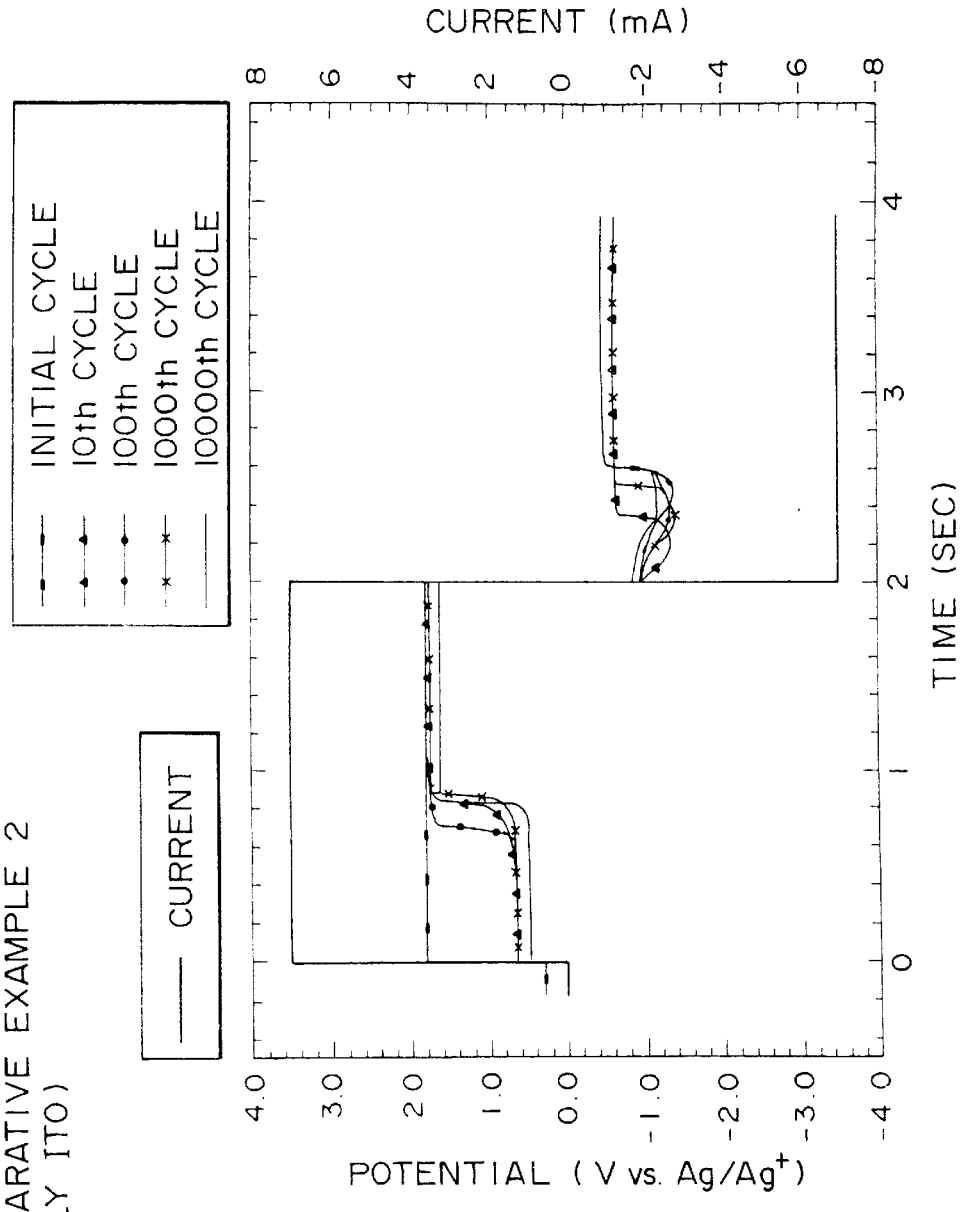
FIG. 16 is a graph showing the change with time of the counter electrode potential and the current value upon driving the device of Comparative Example 2.

Further, in Comparative Example 2, as shown in FIG. 16, the uppermost surface of the counter electrode 17B is formed of ITO and since silver is not present on the counter electrode 17B in the initial stage also in this case, the polarization potential of the counter electrode upon oxidation is high and shows a potential at about 1.8 V relative to the silver plate of the reference electrode. Subsequently, in the same manner as platinum in Example 1, silver is deposited on the ITO surface of the counter electrode upon reduction and the polarization potential upon oxidation at or after the second cycle is as low as about 0.6 V vs. Ag/Ag$^+$ at the initial stage, which is increased to about 1.7 V as silver on the ITO surface is dissolved. The deposition/dissolution reaction of silver on the ITO surface is also highly reversible and no significant change is observed for the polarization characteristic as the counter electrode even if cycles are repeated. However, since the potential of the counter electrode 17B goes up to 1.7 V vs. Ag/Ag$^+$ upon oxidation every cycle, the entire electrolyte turns yellow at about 10,000 cycle which is considered to be attributable to the diffusion of iodine atoms or molecules generated from iodine ions oxidized at the counter electrode 17B.

Figure 17:
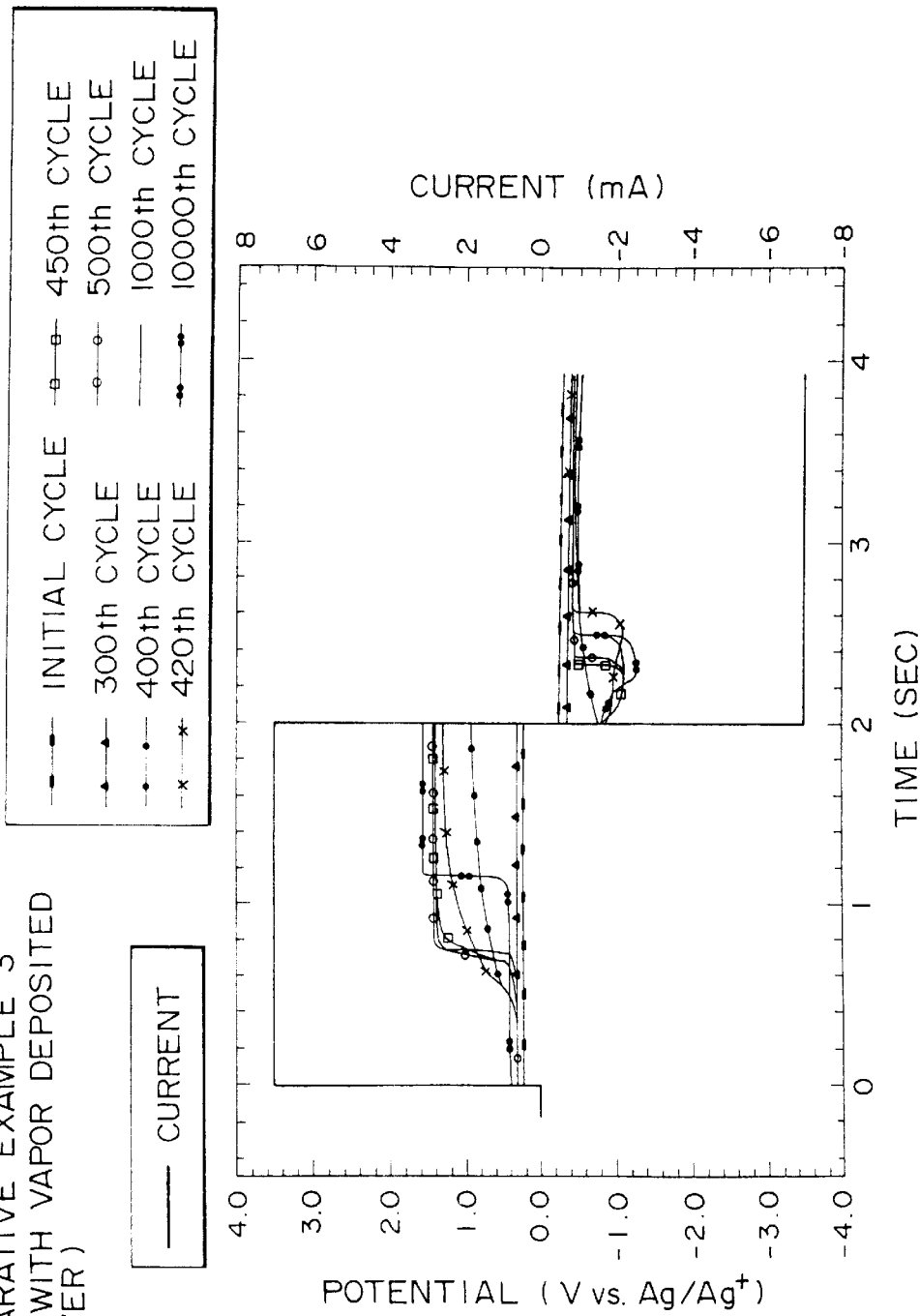
FIG. 17 is a graph showing the change with time of the counter electrode potential and the current value upon driving the device of Comparative Example 3.

Further, in Comparative Example 3, as shown in FIG. 17, since the uppermost surface of the counter electrode 17B is physically vapor deposited silver, the dissolution/deposition reaction of silver at the counter electrode 17B proceeds smoothly and polarization at the initial cycle can be suppressed extremely. However, silver on the ITO surface decreases gradually during repeating of deposition/dissolution cycles of silver and silver almost disappears after 400 cycle. Along with this, the polarization potential of the counter electrode 17B upon oxidation becomes higher, and polarization characteristic for deposition/dissolution of silver at the ITO surface is observed like that ITO in Comparative Example 2 after 500 cycle. In the same manner as in Comparative Example 1, the entire electrolyte turns yellow at about 10,000 cycle.

Figure 18:
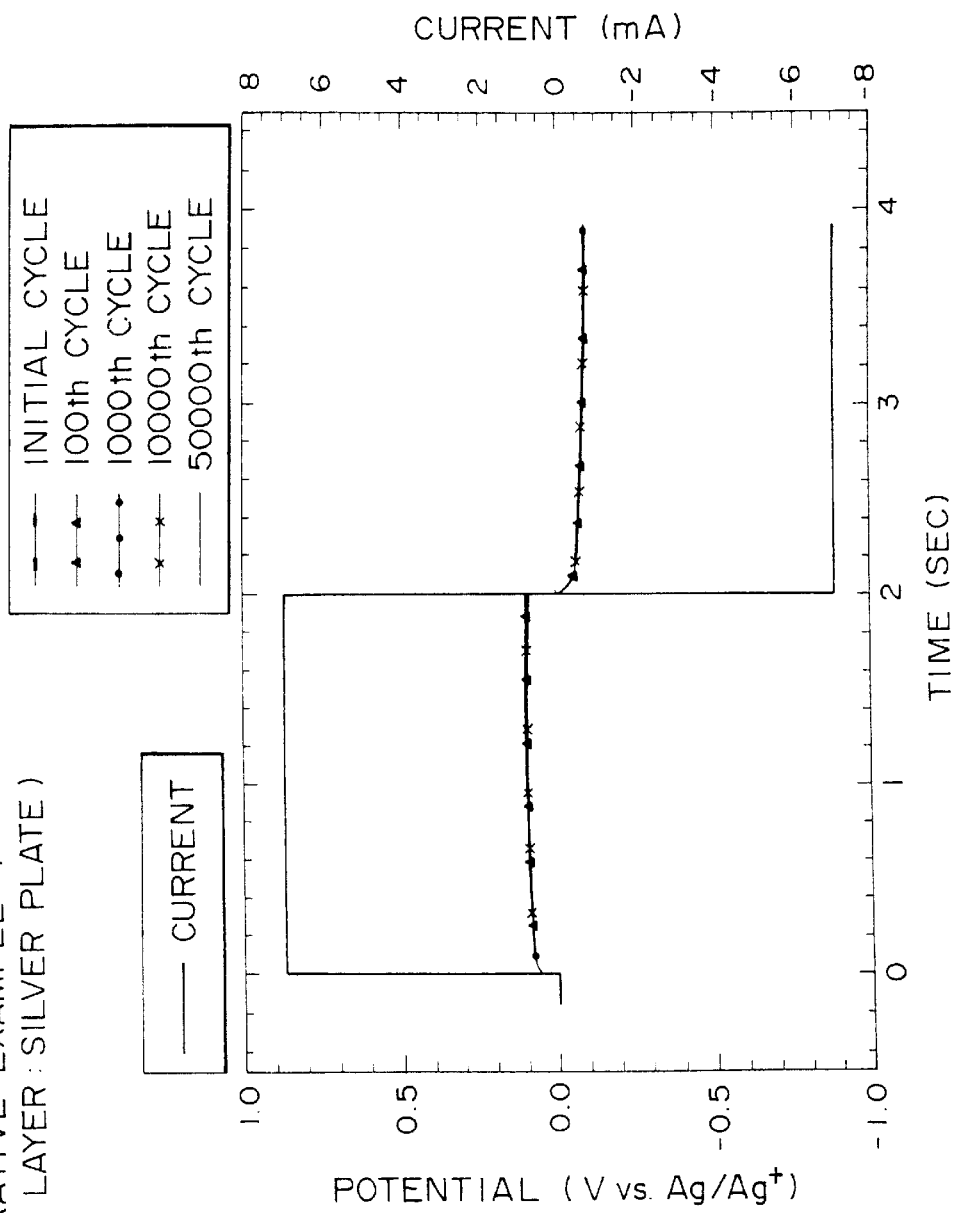
FIG. 18 is a graph showing the change with time of the counter electrode potential and the current value upon driving the device of Comparative Example 4.

In Comparative Example 4, as can be seen in FIG. 18, since a silver plate is used for the counter electrode 17B and the absolute amount of silver is much greater than that is Comparative Example 3, polarization potential of the counter electrode 17B is kept in an extremely low level even when deposition/dissolution cycles of silver are repeated for several tens of thousand times. However, an electric field is inevitably concentrated at the corner of the silver plate and the electrolyte becomes clouded due to irreversible deposition of silver at that portion. This phenomenon becomes more conspicuous particularly for a structure of the counter electrodes in an appended cell than in a case of the beaker cell test, and the transparency of the device is remarkably impaired by the clouding of the electrolyte.

Further, in Comparative Example 5, as shown in FIG. 19, since the carbon paste printed on the ITO surface contains silver, the polarization potential can be kept lower as low as about 0.5 V vs. Ag/Ag$^+$, particularly, upon oxidation of the counter electrode 17B in the initial cycle. However, the polarization potential increases gradually during repetition of deposition/dissolution cycles of silver and the polarization potential (as high as +1.5 V) relative to the silver plate as the reference electrode reaches when the cycles reaches 10000 times.

The, when deposition/dissolution cycles of silver is further repeated, wrinkles occur at some or other places on the surface of the carbon paste layer and peeling from ITO of the underlying layer is observed. FIG. 20 shows the progress of the maximum polarization value upon oxidation of the counter electrode 17B relative to oxidation/reduction cycle in Comparative Example 5. When the number of cycles exceeds 20000 cycles, the polarization potential of the counter electrode 17B increases abruptly. In a case where the carbon paste layer is peeled as in Comparative Example 5, the electrolyte takes place direct reaction with ITO of the underlying layer, so that the polarization value further increases than in Comparative Example 2, and the electrolyte turns yellow to reduce the spectral characteristic of the optical device probably due to oxidation at the counter electrode of iodine ions of the support electrolyte dissolved as anions in the electrolyte.

From the result described above, in Example 1 according to the present invention, since deposition/dissolution reaction of silver on platinum of the counter electrode is highly reversible, increase of the polarization potential of the counter electrode can be suppressed, yellowing of the electrolyte along with oxidation can be prevented and deposition of silver which would cause clouding of the electrolyte can also be suppressed, so that the transparency of the device is not lowered.

Second Example

Figure 21:
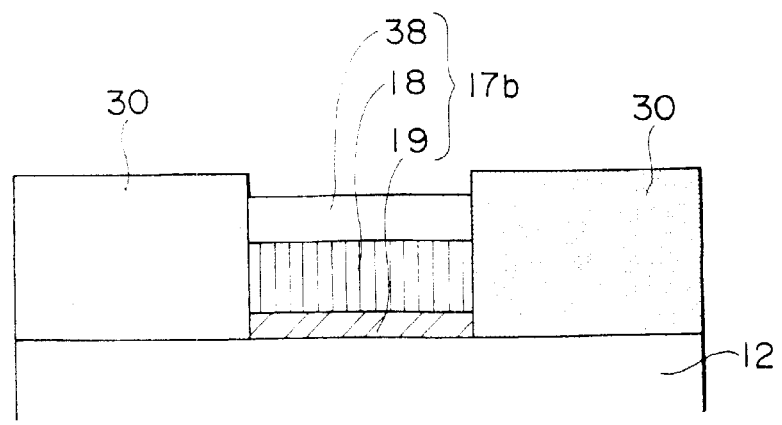
FIG. 21 is an enlarged cross sectional view of a counter electrode having a three-layered structure used in an optical device in another embodiment of the present invention.
Figure 22:
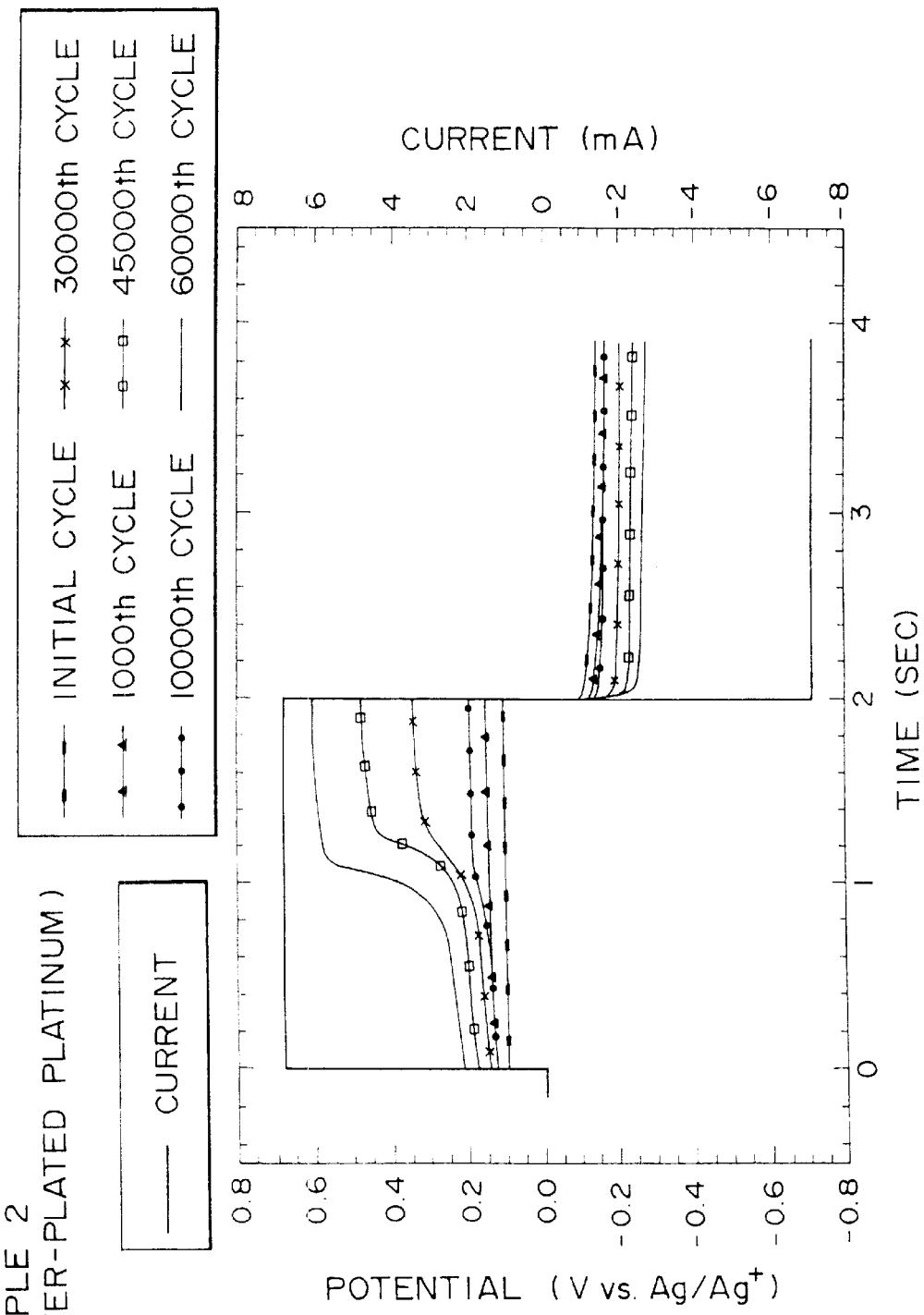
FIG. 22 is a graph showing the change with time of the counter electrode potential and the current value upon driving the device of Example 2 of the present invention.

A beaker cell test was conducted and the polarization characteristic of the counter electrode was examined in the same manner as for Example 1 except for applying silver as the third layer 38 on the first layer (platinum layer) of the counter electrodes (17a, 17b) of the substrate obtained in Example 1 by an electrolytic plating method (refer to FIG. 21). The result of a beaker test cell is shown in FIG. 22.

Silver was plated on the platinum surface of the counter electrodes in a solution of the same composition as that in the electrolyte sealed in the cell by supplying a current at a constant current density of 18 mA/cm$^2$ to platinum in the reduction (basic) direction for 2 min.

In this example, since the silver layer is previously formed on the surface of the counter electrode 17B, dissolution/deposition reaction of silver proceeds smoothly and it can be seen that polarization at the reference electrode relative to the silver plate is reduced extremely also upon polarization to the oxidation (noble) direction in the initial cycle different from Example 1.

Further, when dissolution/deposition of silver are repeated, the polarization potential of the counter electrode 17B increases gradually probably because silver on the surface of the counter electrode 17B is gradually leached into the electrolyte but the increasing rate is extremely slow and gives no problems at all in practical use.

Figure 23:
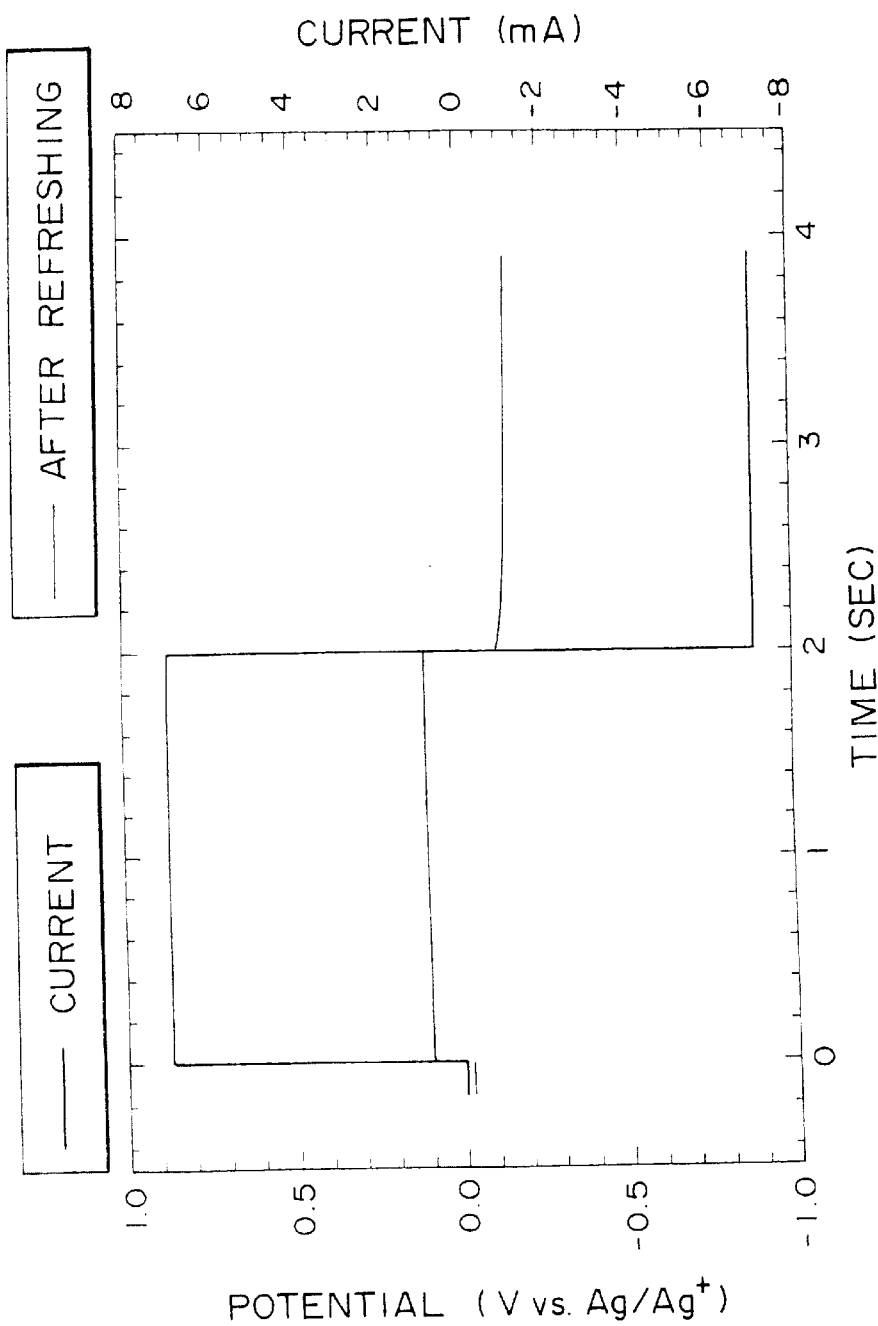
FIG. 23 is a graph showing the change with time of the counter electrode potential and the current value upon driving the device after refreshing treatment for the counter electrode in Example 2 of the present invention.

Then, when dissolution/deposition cycles of silver are further repeated and if it exceeds, for example, 60,000 cycles, the polarization potential of the counter electrode 17B increases to the same level as that in Example 1. When a reduction current is supplied again to the counter electrode 17B at this instance (this is referred to as a refreshing treatment), the polarization characteristic of the counter electrode 17B again shows substantially the same polarization characteristic as that at the initial cycle just after the silver plating as apparent from FIG. 23.

The refreshing treatment is not restricted only to the case of Example 2. Since deposition/dissolution reaction of silver on the platinum surface has excellent reversibility, the polarization value of the counter electrode can also be reduced by the same refreshing treatment as in Example 2 also in the counter electrode of Example 1 in which the first layer is platinum.

Also for the counter electrode in which the third layer of silver shown in FIG. 21 is formed by EB vapor deposition instead of the plating method, since silver is present from the first stage on the uppermost surface of the counter electrode, dissolution/deposition reaction of silver at the counter electrode proceeds smoothly and, for example, the polarization value relative to the silver plate of the reference electrode is extremely reduced also upon polarization to the oxidation (noble) direction in the initial cycle in the beaker cell test and it was confirmed that the polarization value relative to the silver plate of the reference electrode is reduced extremely, the same polarization characteristic as described above can be obtained and the counter electrode can be refreshed.

In view of the above, in Example 2, a cell in which the substrate shown in FIG. 7 was disposed in the same manner as in Example 1 was fabricated and, in the same manner as in Example 1, and it was confirmed that the cell could be operated with no problem such as yellowing of the electrolyte which is considered to be attributable mainly to formation of iodine atoms or molecules and clouding of the electrolyte caused by irreversible suspension of silver particles and it was also confirmed that increase in the polarization potential of the counter electrode could be suppressed and the life of the device could be enhanced by the refreshing treatment.

Third Example

A counter electrode comprising two layers was prepared in the same manner as in Example 1 except for EB vapor deposition of palladium instead of platinum as the first layer for the electrode and then silver was formed as a third layer thereon in the same plating method as in Example 2 (identical with the structure shown in FIG. 21). Further, the cell structure was also identical with that in Example 1. Silver plating on the palladium surface vapor deposited to the substrate was conducted in a solution of the same composition as that of the electrolyte sealed in the cell by supplying a current at a constant current density of 18 mA/cm$^2$ to palladium in the reduction (basic) direction for 2 min.

Figure 24:
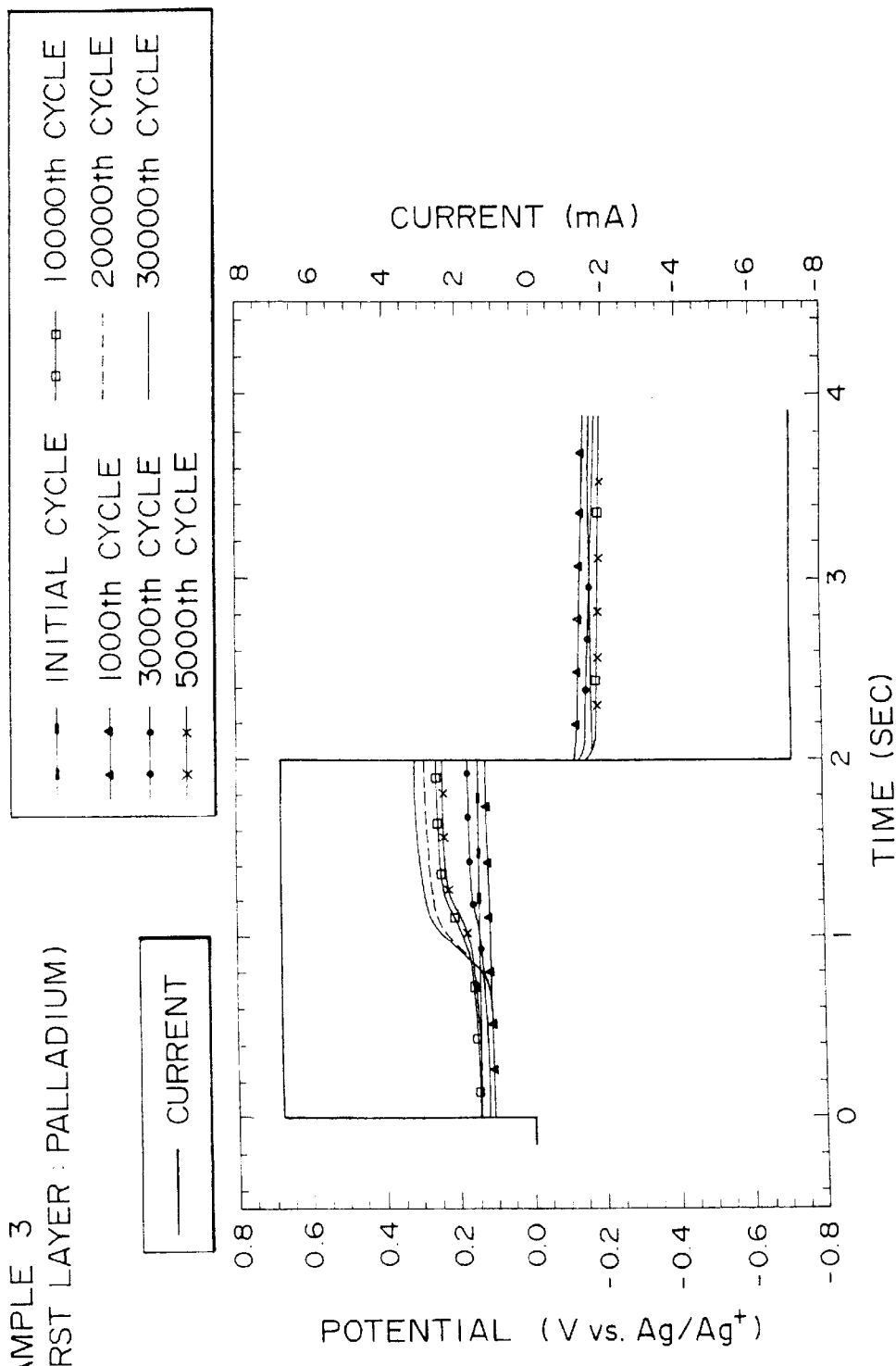
FIG. 24 is a graph showing the change with time of the counter electrode potential and the current value upon driving the device of Example 3 of the present invention.

At first, for examining the polarization characteristic of the counter electrode, a test was conducted under the same conditions in the same beaker cell as in Example 1. Further, for the cycle evaluation, a test was conducted in the same manner and the results are shown in FIG. 24.

Also in this example, since silver 38 is previously applied as the third layer to the counter electrode 17B as in Example 2, dissolution/deposition reaction of silver proceeds smoothly on the palladium surface and it can be seen that polarization at the reference electrode relative to the silver plate is reduced extremely also upon polarization to the oxidation (noble) direction in the initial cycle.

Further, also in this example, when a cell in which the substrate shown in FIG. 7 was disposed in the same manner as in Example 1 was fabricated under the same conditions as in Example 1, it was confirmed that the cell could be operated with no problem such as yellowing of the electrolyte which is considered to be attributable mainly to formation of iodine atoms or molecules and clouding of the electrolyte caused by irreversible suspension of silver particles and it was also confirmed that increase in the polarization potential of the counter electrode could be suppressed and the life of the device could be enhanced by the refreshing treatment.

Fourth Example

A counter electrode comprising two layers was prepared in the same manner as in Example 1 except for EB vapor deposition of gold instead of platinum as the first layer for the electrode and then silver was formed as a third layer thereon in the same plating method as in Example 2 (identical with the structure shown in FIG. 21). Further, the cell structure was also identical with that in Example 1. Silver plating on the gold surface vapor deposited on the substrate was conducted in a solution of the same composition as that of the electrolyte sealed in the cell by supplying a current at a constant current density of 18 mA/cm$^2$ to gold in the reduction (basic) direction for 2 min.

Figure 25:
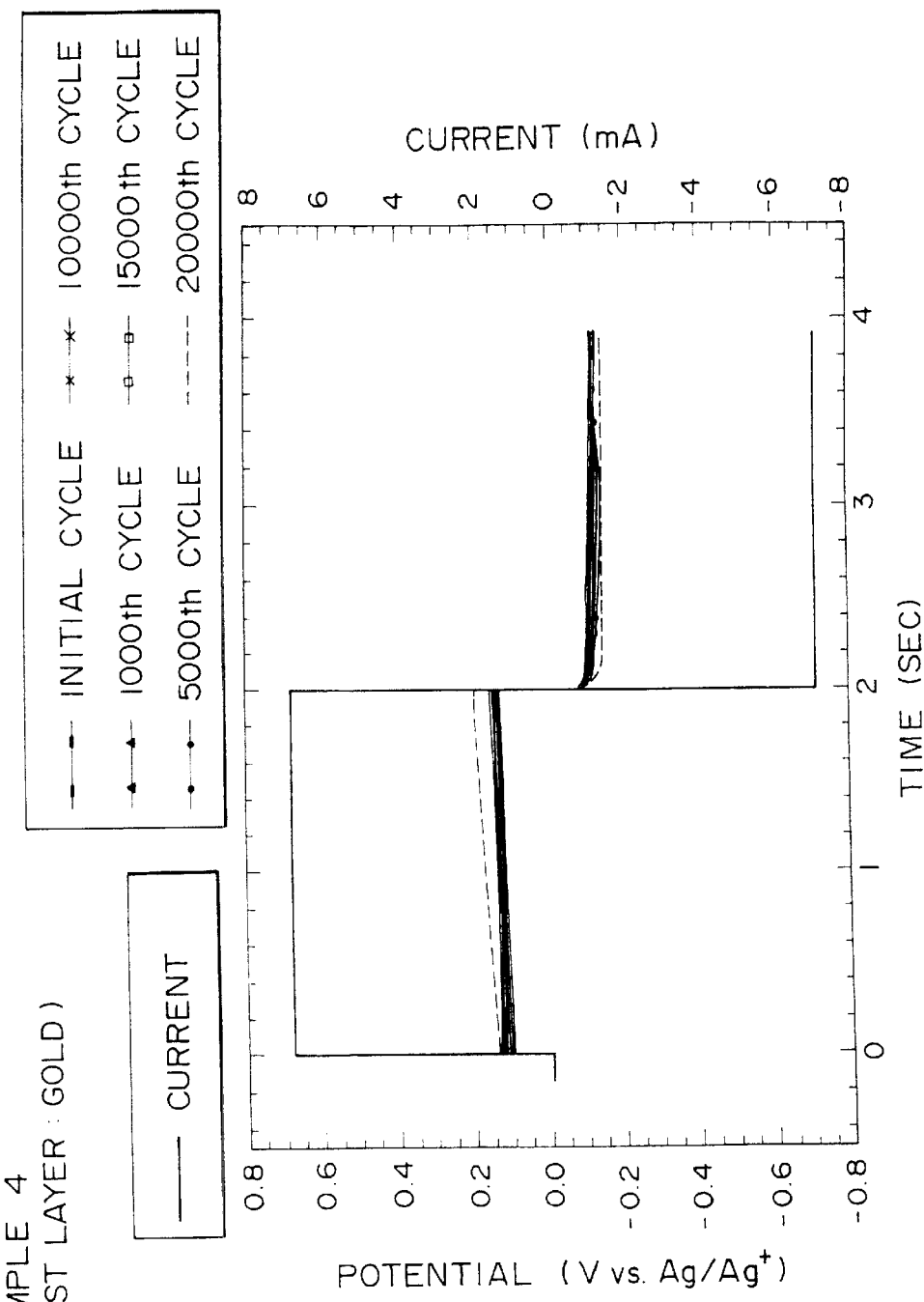
FIG. 25 is a graph showing the change with time of the counter electrode potential and the current value upon driving the device of Example 4 of the present invention.

At first, for examining the polarization characteristic of the counter electrode, a test was conducted under the same conditions in the same beaker cell as in Example 1. Further, for the evaluation of cycles, a test was conducted in the same manner, and the results are shown in FIG. 25.

Also in this example, since silver 38 is previously applied as the third layer to the counter electrode 17B, dissolution/deposition reaction of silver proceeds smoothly on the gold surface and it can be seen that polarization at the reference electrode relative to the silver plate is reduced extremely also upon polarization to the oxidation (noble) direction at the initial cycle.

Further, also in this example, when a cell in which the substrate shown in FIG. 7 was disposed in the same manner as in Example 1 was fabricated under the same conditions as those in Example 1, it was confirmed that the cell can be operated with no problem such as yellowing of the electrolyte which is considered to be attributable mainly to the formation of iodine atoms or molecules and clouding of the electrolyte caused by irreversible suspension of silver particles. Further, it was also confirmed that the polarization potential of the counter electrode could be suppressed as low as ±0.2 V or lower to Ag/Ag$^+$ at up to 20000 cycles, and the life of the device could be enhanced by the refreshing treatment.

(B) Comparison Between Presence and Absence of the Reference Electrode of the Present Invention Fifth Example In this example, an experiment of measuring a potential difference between the working electrodes 8a–8e and 9a–9e with reference to the reference electrodes 16a and 16b by the voltmeter 53 as shown in FIG. 11 and confirming the effect of controlling current supply from the external power source 51 by the limiter 54 based on the potential difference was conducted. For the sake of simplicity, the current density was made identical for each of the working electrodes 8a–8e and 9a and 9b.

Figure 26:
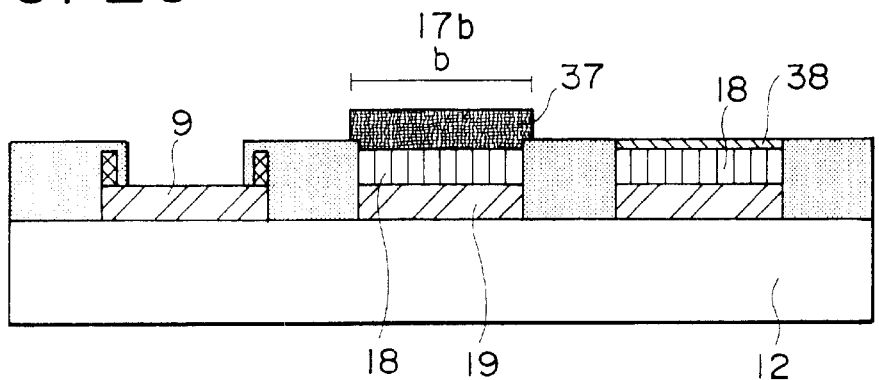
FIG. 26 is a cross sectional view for explaining the constitution of an optical device of Example 5.

In the substrate obtained in Example 1 as shown in FIG. 10D, a paste formed by dispersing/mixing a silver powder by the same weight as graphite in a binder was screen printed to the counter electrode portions at a thickness of about 20 μm and then the solvent in the paste was removed by drying, to obtain a substrate having a counter electrode 17b comprising a resin layer 37 containing the silver powder and graphite as shown in FIG. 26. Further, silver was deposited in the electrolyte by reduction on the reference electrode to form a silver layer 38 and obtain a substrate used in this experiment. Subsequently, a cell was assembled and an external circuit was attached to obtain an optical device as shown in FIG. 11. In the optical device current supply was controlled by the limiter in Example 5 and not controlled in Comparative Example 6.

The optical device was driven repeated at a current cycle as shown in FIG. 27A and FIG. 27B. That is, the current density in the working electrode was set to 18 mA/cm$^2$ and the time was set to 2 sec both for electrolytic deposition of silver (Ag) onto the working electrode and dissolution of deposition substance (Ag) from the working electrode (hereinafter referred to as deposition/dissolution). Current supply by the constant current power source 51 was controlled such that the potential of the working electrode relative to the reference electrode, the dipping potential of which was the same as silver, was kept at +1.2 V vs. Ag/Ag$^+$ or lower by the limiter. Further, a potential relative to the reference electrode of the counter electrode was also measured at the same time.

Further, FIG. 27A shows the potential for the working electrode and the potential of the counter electrode measured at the initial cycle in the driving test. Further, FIG. 27B shows the potential for the working electrode and the potential for the counter electrode measured at 3500$^{th}$ cycle in the driving test.

As shown in the graphs, when the limiter was used for controlling a potential difference of the working electrode relative to the reference electrode, it was confirmed that the potential difference was controlled within a range of +1.2 V or lower (shown as the line ①) and the potential difference of the counter electrode relative to the reference electrode was also kept within a range of +1.2 V or lower within the repeating driving range of 3500 cycles.

Further, while the polarization potential of the counter electrode was increased by the repeating driving after 3500 cycles, the polarization potential of the working electrode scarcely changed. Therefore, it was confirmed that the repeating driving could be conducted further with no undesired effects on deposition/dissolution at the working electrode, namely, in a state of keeping the light controlling performance.

When the limiter was not used, it was confirmed that the potential difference of the working electrode relative to the reference electrode was higher than +1.2 V at the end of oxidation (shown as the line ②) and the electrolyte turned yellow, which was considered to be attributable mainly to the oxidation reaction of iodine ions (I−) as anions in the supporting electrolyte, by the repeating driving for more than 3000 cycles. To the contrary, when the limiter was used, discoloration of the electrolyte was not seen and the electrolyte was kept transparent.

In Comparative Example 6, a driving test was conducted for the same cycles as in Example 1 and the cell voltage was measured not using the reference electrode, the result of which is shown in FIG. 28A and FIG. 28B. However, control for the constant current power source by the limiter was not conducted.

Further, FIG. 28A shows a cell voltage measured at the initial cycle in the driving test. Further, FIG. 28B shows a cell voltage measured at $3500^{th}$ cycle in the driving test. The cell voltage measured is a potential difference of the working electrode relative to the counter electrode, which changes along with the change of the potential for the counter electrode as well as the working electrode. Therefore, accurate potential of the working electrodes in the electrolyte could not be detected. Further, since the constant current power source was not controlled by the limiter, it was confirmed that the electrolyte near the working electrode turned yellow by the repeating driving for 3500 cycles.

Sixth Example

At first, an optical device was fabricated as described below.

In the substrate of the Example 1 described above, silver 20 was electrolytically deposited on the platinum film 18 in a counter electrode forming region b to obtain the counter electrode 17b as shown in FIG. 21. In this example, a reduction current was supplied at 18 mA/cm$^2$ for 1 min to the platinum film 18 in the counter electrode forming region b in the same electrolyte as that used in Example 1, to electrolytically deposit silver 20.

Figure 29:
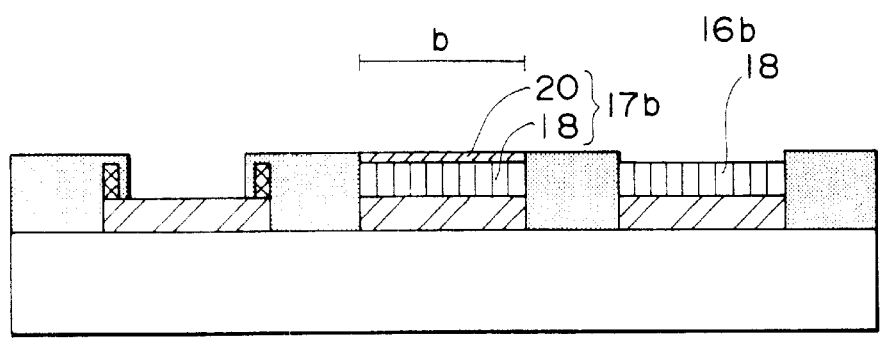
FIG. 29 is a cross sectional view for explaining the constitution of an optical device of Example 6.

Further, the reference electrode 16b was constituted with the platinum film 18, to obtain the substrate shown in FIG. 29.

Subsequently, an appended light control cell shown in FIG. 7 was fabricated in the same manner as described in Example 1 and, further, an external circuit was attached to the light control cell as shown in FIG. 11 to fabricate an optical device.

A driving test was conducted as described below for the optical device fabricated as described above.

The optical device was driven repeatedly at a current cycle as shown in FIG. 30A and FIG. 30B. That is, the current density in the working electrode was set to 18 mA/cm$^2$ and a time was set to 2 sec both for electrolytic deposition of silver (Ag) onto the working electrode and dissolution of deposition substance (Ag) from the working electrode (hereinafter referred to as deposition/dissolution). In the electrolyte of the constitution described above, platinum constituting the electrode surface of the reference electrode shows a potential more noble by about 0.4 V relative to silver as the deposition substance. Current supply by the constant current power source was controlled by the limiter such that the potential difference of the working electrode relative to the reference electrode was kept at +0.8 V or lower which is lower by 0.4 V than +1.2 V in Example 5. Further, a potential of the counter electrode relative to the reference electrode was also measured at the same time.

Further, FIG. 30A shows the potential for the working electrode and the potential for the counter electrode measured at the initial cycle in the driving test. Further, FIG. 30B shows the potential for the working electrode and the potential for the counter electrode measured at the $3000^{th}$ cycle in the driving test.

As shown in the graphs, it was confirmed that the potential of the working electrode relative to the reference electrode was controlled within a range of +0.8 V or lower and the potential of the counter electrode relative to the reference electrode was also kept within a range of +0.8 V or lower within the repeating driving range of 3000 cycles. Then, it was confirmed that coloration of the electrolyte considered to be attributable mainly to the oxidation reaction of iodine ions (I–) as anions in the support electrolyte was prevented at the working electrode and the counter electrode, and the electrolyte was kept transparent.

On the other hand, without controlling current supply by the limiter, the electrolyte near the working electrode was observed to turn yellow after a large number of cycles. It is assumed that iodine ions were oxidized because the potential of the working electrode was up higher than 0.8 V vs. Pt every cycle, even though for a very short time.

Further, since silver (Ag) is deposited on the counter electrode surface, polarization at the counter electrode in this example is suppressed at the initial cycles to a potential substantially equal with that of silver. However, silver (Ag) of the counter electrode is gradually dissolved into the electrolyte and the polarization potential increases particularly upon oxidation of the counter electrode by repeating driving for 3000 cycle. On the contrary, the polarization potential of the working electrode showed scarce change. Therefore, it was confirmed that the repeating driving can be conducted further with no undesired effects on deposition/dissolution to the working electrode, that is, in a state of keeping the light controlling performance.

This example is one of best modes in the present invention.

Seventh Example

Figure 31:
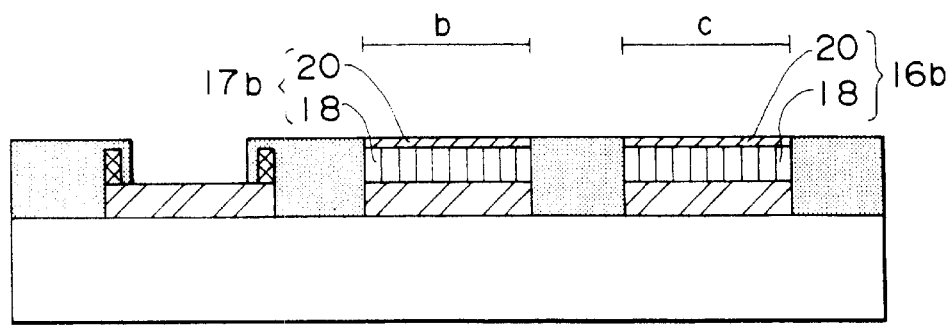
FIG. 31 is a cross sectional view for explaining the constitution of an optical device of Example 7.

This example is different from Example 6, in that silver 20 was electrolytically deposited not only to the counter electrode forming region b but also to the platinum film 18 in the reference electrode forming region c in the fabrication of a light control cell as shown in FIG. 31. Silver 20 was electrolytically deposited in the same manner as described for Example 2. Then, the counter electrode 17b and the reference electrode 16b were obtained by electrolytically depositing silver 20 on the platinum film 18. Subsequently, in the same manner as explained in Example 5, an appended light control cell was fabricated and an external circuit was disposed to the light control cell to fabricate an optical device.

A driving test was conducted to the thus fabricated optical device as described below.

The optical device was driven repeatedly at a current cycle as shown in FIG. 32A and FIG. 32B. That is, the current density in the working electrode was set to 18 mA/cm2 and the time was set to 2 sec both for electrolytic deposition of silver (Ag) onto the working electrode and dissolution of deposition substance (Ag) from the working electrode (hereinafter referred to as deposition/dissolution). Current supply by the constant current power source was controlled by the limiter such that the potential of the working electrode relative to the reference electrode was kept at +1.2 V or lower. Further, a potential of the counter electrode relative to the reference electrode was also measured at the same time.

Further, FIG. 32A shows the potential for the working electrode and the potential for the counter electrode measured at the initial cycle in the driving test. Further, FIG. 32B shows the potential for the working electrode and the potential for the counter electrode measured at the 4000$^{th}$ cycle in the driving test.

As shown in the graphs, it was confirmed that the potential difference of the working electrode relative to the reference electrode, the dipping potential of which was the same as silver, was controlled within a range of +1.2 V or lower and the potential difference of the counter electrode relative to the reference electrode was also kept within a range of +1.2 V or lower within the repeating driving range of 4000 cycles. Then, it was confirmed that coloration of the electrolyte considered to be attributable mainly to the oxidation reaction of iodine ions (I–) as anions in the support electrolyte was prevented at the working electrode and the counter electrode, and the electrolyte was kept transparent.

On the other hand, without controlling current supply by the limiter, the electrolyte near the working electrode was observed to turn yellow after a large number of cycles. It is assumed that iodine ions were oxidized because the potential of the working electrode was up higher than 1.2 V vs. Ag/Ag$^+$ every cycle, even though for a very short time.

Further, since silver (Ag) is deposited on the counter electrode surface, as in Example 6, polarization at the counter electrode in this example is suppressed at the initial cycle to a potential substantially equal with that of silver. However, silver (Ag) of the counter electrode is gradually dissolved into the electrolyte and the polarization potential increases particularly upon oxidation of the counter electrode by repeating driving for 4000 cycles. On the contrary, the polarization potential for the working electrode showed scarce change. Therefore, it was confirmed that the repeating driving can be conducted further with no undesired effects on deposition/dissolution to the working electrode, that is, in a state of keeping the light controlling performance.

This example is another best mode in the present invention as in Example 6.

Eighth Example

This example is different from Example 6, in that a carbon past layer 37 was formed on a platinum film 18 of the reference electrode forming region c by a screen printing method in the fabrication of a light control cell as shown in FIG. 33. The carbon paste layer 37 was formed in the same manner as explained for the counter electrode in Comparative Example 6. Then, a reference electrode 16b comprising a material prepared by dispersing conductive particles into a binder was formed by way of an adhesion layer comprising an ITO film 19 and a current collector layer comprising platinum 18 on a substrate 11.

Subsequently, an appended light control cell was fabricated and further an external circuit was attached to the light control cell to fabricate an optical device in the same manner as explained for Example 5.

Driving test for the thus fabricated optical device was conducted as below.

The optical device was driven repeatedly at a current cycle as shown in FIG. 34A and FIG. 34B. That is, the current density in the working electrode was set to 18 mA/cm2 and the time with set to 2 sec both for electrolytic deposition of silver (Ag) onto the working electrode and dissolution of deposition substance (Ag) from the working electrode (hereinafter referred to as deposition/dissolution). Since silver particles like the deposition substance were mixed in the carbon paste layer constituting the electrode surface of the reference electrode, current supply by the constant current power source was controlled by the limiter such that the potential of the working electrode relative to the reference electrode was kept at +1.2 V or lower. Further, a potential of the counter electrode relative to the reference electrode was also measured at the same time.

Further, FIG. 34A shows the potential for the working electrode and the potential for the counter electrode measured at the initial cycle in the driving test. Further, FIG. 34B shows the potential for the working electrode and the potential for the counter electrode measured at the 10000$^{th}$ cycle in the driving test.

In the example, since the repeating driving was conducted as far as 10,000 cycles, change was observed for the polarization potential of the working electrode relative to the reference electrode. However, it was confirmed that the potential difference of the working electrode relative to the reference electrode was controlled within a range of +1.2 V or lower and the potential of the counter electrode relative to the reference electrode was also kept within a range of +1.2 V or lower even after repeating driving for 10,000 cycles. Then, it was confirmed that coloration of the electrolyte considered to be attributable mainly to the oxidation reaction of iodine ions (I–) as anions in the support electrolyte was prevented at the working electrode and the counter electrode, and the electrolyte was kept transparent.

On the other hand, without controlling current supply by the limiter, the electrolyte near the working electrode was observed to turn yellow after a large number of cycles. It is assumed that iodine ions were oxidized because the potential of the working electrode was up higher than 1.2 V vs. Ag/Ag$^+$ every cycle, even though for a very short time.

Ninth Example

In Example 1 to Example 8, platinum, palladium or gold constituting the first layer or the second layer of the counter electrode and the reference electrode was laminated on the ITO surface as the underlying layer (adhesion layer). In addition, it was examined for the effect of using transition metal elements such as chromium, titanium and tungsten, metal oxides such as tin oxide or insulators such as silicon nitride and amorphous silicon instead of ITO.

Adhesion of various kinds of metals and metal oxides described above with various kinds of underlying layers was examined with regard to the occurrence of defoliation from the underlying layers in a silver salt electrolyte. The results are shown in the following Table 4.

In a case of directly disposing platinum or gold by an EB vapor deposition method on a glass substrate with no deposition of the underlying layer as a blank, defoliation was observed merely by dipping the substrate in the electrolyte. In a case of disposing palladium in the same manner, some defoliation was observed (defoliation did not occur depending on the case). However, platinum, gold or palladium causes no defoliation and shows sufficient adhesion if the substrate is covered with silicon nitride or amorphous silicon.

TABLE 4

| Underlying layer/upper layer | Pt | Pd | Au | Cr | Ti | W | ITO | Tin oxide |
| --- | --- | --- | --- | --- | --- | --- | --- | --- |
| Glass | x | Δ | x | ○ | ○ | ○ | ○ | ○ |
| Chromium | ○ | ○ | ○ | — | — | — | — | — |
| Titanium | ○ | ○ | ○ | — | — | — | — | — |
| Tungsten | ○ | ○ | ○ | — | — | — | — | — |
| Tin oxide | ○ | ○ | ○ | ○ | ○ | ○ | ○ | ○ |

TABLE 4-continued

| Underlying layer/upper layer | Pt | Pd | Au | Cr | Ti | W | ITO | Tin oxide |
|---|---|---|---|---|---|---|---|---|
| ITO | o | o | o | o | o | o | o | o |
| α-Silicon | o | o | o | — | — | — | — | — |

In the table,
o: no defoliation
Δ: slight defoliation
x: complete defoliation
—: not examined On the contrary, transition metals such as chromium, titanium and tungsten, metal oxides such as ITO and tin oxide showed satisfactory adhesion with substrate glass and each of them did not defoliate at all. Further, when the metals or metal oxides were used as the underlying layer and platinum, palladium or gold was vapor deposited thereon, adhesion with the underlying layer was satisfactory and no defoliation was observed at all. Accordingly, the underlying layers are effective as an adhesion layer to platinum, palladium and gold as the first layer and such a laminate structure is advantageous for the counter electrode or the reference electrode.

Since each of the metals such as chromium, titanium and tungsten and metal oxides such as ITO and tin oxide used for the underlying layer as the second layer is a good conductor and platinum, palladium or gold as the first layer is also a good conductor and the counter electrode obtained by using any of the metals or metal oxides usable as the second layer to the underlying layer for the first layer, it gives no undesired effects on the characteristics of the device.

Tenth Example

This is a camera system including a light control cell as described above.

Figure 35:
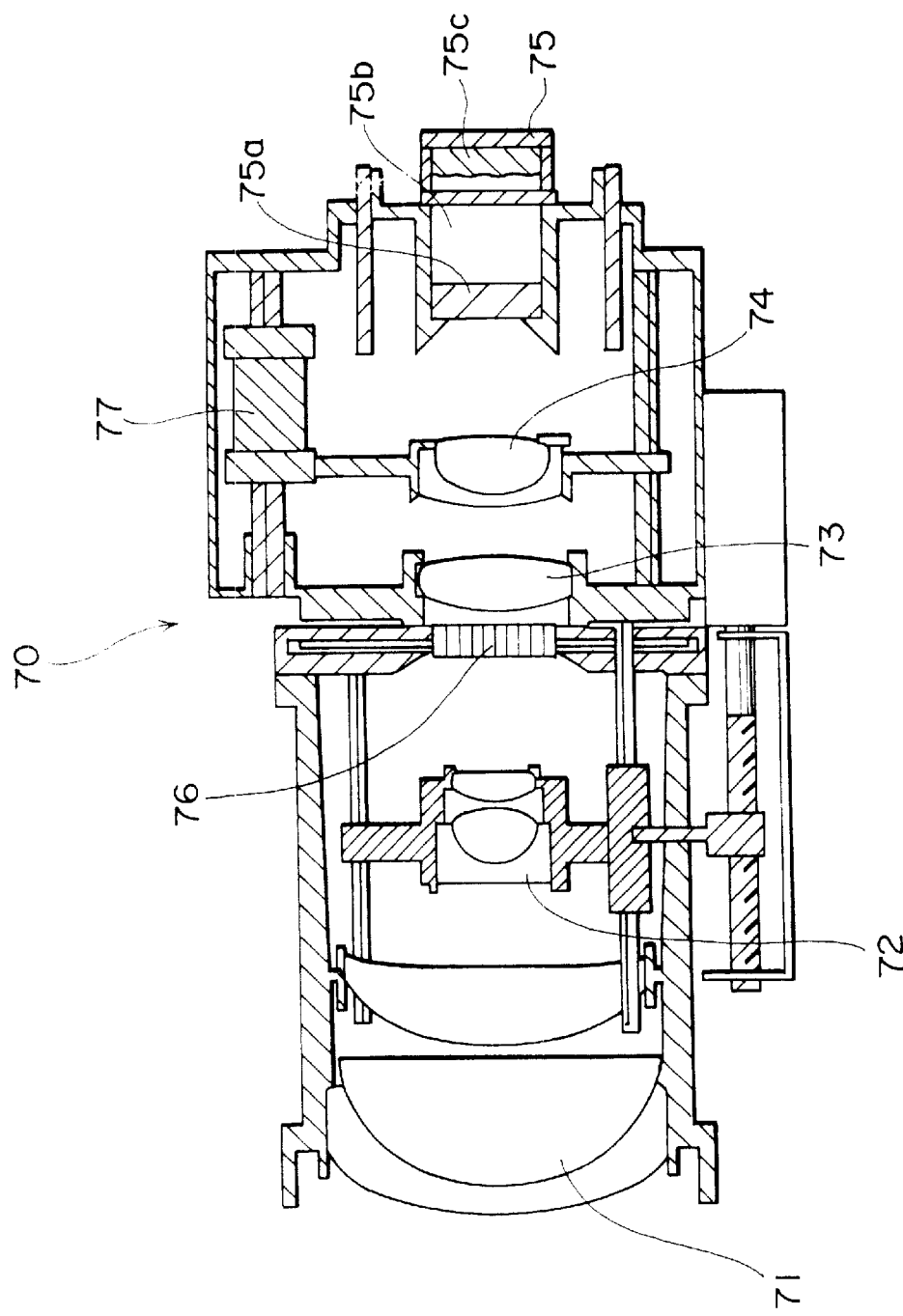
FIG. 35 is a cross sectional view illustrating the constitution of a camera system of Example 10.

Explanation is to be made for an example of assembling a light control cell 76 (for example having an electrode pattern as shown in FIG. 4 or FIG. 7) of an optical device according to the present invention described above in a CCD (Charge Coupled Device) camera, with reference to FIG. 35.

In a CCD camera 70 shown in FIG. 35, there are arranged, along an optical axis indicated by a dash-single-dot line, a first lens group 71, a second lens group (for zoom) 72, a third lens group 73, a fourth lens group (for focus) 74 and a CCD package 75 in this order each at an appropriate distance. The CCD package 75 houses therein an infrared cut filter 75a, a liquid crystal optical low path filter system 75b and a CCD image sensing device 75c. Between the second lens group 72 and the third lens group 73, a light control cell 76 of an optical device according to the present invention as described previously is attached on an identical optical path for the control of light amount (light amount restriction) at a position nearer to the third lens group 73. The fourth lens group 74 for focusing is disposed between the third lens group 73 and the CCD package 75 along the optical path movably by a linear motor 77, and the second lens group 72 for zooming is disposed between the first lens group 71 and the optical device 70 movably along the optical path.

A driving circuit has a driving circuit section for a CCD image sensing device disposed on the light emitting side of a light control cell and an output signal from the CCD image sensing device 88 (corresponding to 75c in FIG. 35) according to entering light through a low pass filter (corresponding to 75b in FIG. 35) is processed in a Y/C signal processing section and fed back as a luminance signal (Y signal) to a light cell controlling circuit section. In the control circuit section, the control signal from a controller is synchronized with a basic clock from the driving circuit. Further, a potential of a working electrode (corresponding to 17 described above) relative to a reference electrode (corresponding to 16 described above) in the light control cell (corresponding to 76 shown in FIG. 35) is detected by a voltmeter (corresponding to 53 shown in FIG. 11) and, when the detected value reaches a predetermined value, current supplied to a power source is controlled by a limiter (corresponding to 54 shown in FIG. 11) a function generator thereby controlling transmittance of the light control cell.

In this example, since the light amount of the light control cell 76 according to the present invention which is set between the second lens group (corresponding to 72 shown in FIG. 35) and the third lens group (corresponding to 73 shown in FIG. 35) can be controlled by the application of an electric field as described above, it requires no mechanical constitution for driving the diaphragm, basically different from the existent mechanical diaphragm for the control of light amount, so that the size of the system can be reduced substantially to a size of an effective range for the optical path. Accordingly, it is possible to decrease the size of the camera. Further, the light amount can be controlled properly depending on the level of the voltage applied to the patterned electrode, and diffraction phenomenon in the prior art can be prevented and a sufficient amount of light can be entered into the image sensing device to eliminate image blurring.

Also in another camera system, an emission light from the light control cell may be received by a photodetector (or photo-multiplier), from which a luminance information of the emission light may be fed back to the control circuit section to obtain a driving pulse under waveform control from the function generator in synchronization with clocks from a light control cell driving circuit section.

Preferred examples of the present invention have been explained with reference to the example of using the silver salt solution but the present invention can be practiced by using any other metal so long as it can be electrolytically deposited and dissolved at the working electrode. For example, the present invention can be practiced with an electrolyte system containing, dissolved therein, an electrodepositable metal such as zinc, cadmium, lead, copper, iron, nickel, tin, indium, platinum, palladium, mercury, chromium, tungsten, molybdenum, cesium or lithium.

According to the present invention, since a material having lower ionization tendency than that of a metal dissolved in an electrolyte is used for the counter electrode in an optical device for electrochemically controlling the light by the application of an electric field to the electrolyte such as a silver salt solution, polarization at the counter electrode can be suppressed, driving of the optical device can be stabilized and, in addition, driving is stabilized even after much more cycles compared with existent cases and the device can be driven at a reduced power consumption. Further, side reactions in the device can be suppressed since the counter electrode is electrochemically stable.

Further, according to the present invention, since the counter electrode can be formed by a gas phase film forming method or a plating method, the counter electrode itself can be formed as a thin film with no substantial angled corner (edge), so that local concentration of electric fields at the counter electrode can be effectively suppressed or prevented, to thereby suppress deposition and suspension of inactive particles in the electrolyte during driving to avoid lowering of the transparency and short circuit between the electrodes in the optical device.

Further, according to the present invention, since a reference electrode is disposed in an electrolyte, which is independent of a circuit in direct concern with reversible electrolytic deposition to the surface of the working electrode and shows a constant dipping potential, an accurate potential can be obtained for the working electrode or the counter electrode in the electrolyte. Therefore, light control is possible by controlling the potential for the working electrode and the counter electrode at high accuracy.

Further, according to the present invention, since a limiter for controlling an external power source so as to keep the potential difference between the working electrode or the counter electrode and the reference electrode within a predetermined range in the optical device is disposed, excess polarization at the working electrode can be prevented. Therefore, it is possible to prevent excessive polarization at the working electrode from giving undesired effects on the substances in the electrolyte and degradation of the optical device. Specifically, coloration of the electrolyte due to oxidation of the support electrolyte can be prevented.

Furthermore, according to the present invention, current supply to the working electrode can be controlled based on the accurate potential for the working electrode in the electrolyte by detecting a potential difference between the working electrode and the reference electrode having no concerns with electrolytic deposition and controlling current supply to the working electrode so as to keep the potential difference within a predetermined range. Accordingly, it is possible to control light by reversible electrolytic deposition from the electrolyte to the surface of the working electrode while preventing denaturation of the electrolyte caused by excess polarization at the working electrode. As a result, it is possible to prevent degradation of characteristics of the optical device. Also in this case, it is possible to avoid unnecessary suppression of electric current which makes deposition/dissolution at the working electrode insufficient to cause disadvantages such as insufficient extinction of deposited substances or insufficient deposition, so that light control can be conducted at high accuracy.

Furthermore, according to the camera system of the present invention, since an optical device utilizing the electrochemical reaction is used for light control, it is possible to decrease the size for that portion and accordingly, the entire camera system can also be decreased in the size. Then, by the stabilized optical characteristics of the optical device, it is possible to properly control the amount of light, prevent diffraction phenomenon as in the prior art and enter a sufficient amount of light to an image sensing device to eliminate image blurring.

What is claimed is:

1. An optical device having at least a working electrode and a counter electrode in which an electrode is disposed in contact with both of the electrodes and light can be controlled electrochemically by controlling an electric field applied to the electrolyte, wherein
the counter electrode comprises a single layer or a laminate structure having at least two layers, and
the single layer or a first layer in the laminate structure present on a side of the electrolyte contains a metal having a lower ionization tendency than that of a metal dissolved in the electrolyte.

2. An optical device as claimed in claim 1, wherein the electrolyte is a silver salt solution.

3. An optical device as claimed in claim 2, wherein the single layer or the first layer of the counter electrode is formed with at least one member selected from the group consisting of palladium, platinum and gold.

4. An optical device as claimed in claim 1, wherein a second layer covered by the first layer comprises at least one material selected from the group consisting of a metal, a metal oxide and an insulator different from that of the first layer.

5. An optical device as claimed in claim 4, wherein the second layer of the counter electrode is formed with at least one metal selected from the group consisting of titanium, chromium and tungsten.

6. An optical device as claimed in claim 4, wherein the second layer of the counter electrode is formed with indium-tin oxide formed by doping tin into indium oxide, or tin oxide.

7. An optical device as claimed in claim 4, wherein the second layer of the counter electrode is formed with silicon nitride or amorphous silicon.

8. An optical device as claimed in claim 4, wherein the second layer is disposed as an adhesion layer of the first layer to a substrate.

9. An optical device as claimed in claim 1, wherein the counter electrode has, on the single layer or the first layer, a third layer comprising a material different from that of the layer.

10. An optical device as claimed in claim 9, wherein the third layer comprises a metal dissolved in the electrolyte.

11. An optical device as claimed in claim 10, wherein the electrolyte is a silver solution and the third layer comprises silver.

12. An optical device as claimed in claim 1, wherein the single layer or the first layer and the second layer is connected by a gas phase film forming method, a plating method or a sol-gel method.

13. An optical device as claimed in claim 9, wherein the third layer is formed by a gas phase film forming method, a plating method or a sol-gel method.

14. An optical device as claimed in claim 1, wherein no substantial angled corner is present at the end edge of the counter electrode.

15. An optical device as claimed in claim 1, wherein each of the peripheral edge or the peripheral portions of the working electrode and the counter electrode is covered with a shading layer, and each of main surfaces of the working electrode and the counter electrode is present at a position nearer to a substrate than the surface of the shading layer.

16. An optical device as claimed in claim 15, wherein the shading layer comprises a black resist.

17. An optical device as claimed in claim 1, wherein the device comprises a pair of transparent or semi-transparent substrates opposed to each other, at least one pair of transparent or semi-transparent working electrodes disposed to the opposing surfaces of the pair of transparent or semi-transparent substrate respectively and opposed to each other, the electrolyte comprising a silver salt disposed in contact with the pair of working electrodes and the counter electrodes disposed in contact with the electrolyte and disposed to the periphery of the working electrode.

18. An optical device having a working electrode and a counter electrode in which an electrode is disposed in contact with both of the electrodes and light can be controlled electrochemically by controlling an electric field applied to the electrolyte, wherein the device further comprises:
a reference electrode disposed in contact with the electrolyte for monitoring the potential of the working electrode and/or the counter electrode, and an external circuit electrically connecting the reference electrode with the working electrode and/or the counter electrode.

19. An optical device as claimed in claim 18, wherein the reference electrode comprises a single layer or a laminate structure having at least two layers.

20. An optical device as claimed in claim 19, wherein the single layer or a first layer of the laminate structure present on a side of the electrolyte contains a material of higher standard electrode potential than a metal dissolved in the electrolyte.

21. An optical device as claimed in claim 20, wherein the metal dissolved in the electrolyte is silver.

22. An optical device as claimed in claim 21, wherein the single layer or the first layer of the reference electrode is formed with at least one member selected from the group consisting of palladium, platinum, gold, indium tin oxide by doping tin into indium oxide.

23. An optical device as claimed in claim 19, wherein a second layer covered by the first layer comprises at least one material selected from the group consisting of a metal, a metal oxide and an insulator different from the first layer.

24. An optical device as claimed in claim 23, wherein the second layer of the reference electrode is formed with at least one metal selected from the group consisting of titanium, chromium and tungsten.

25. An optical device as claimed in claim 22, wherein the second layer of the reference electrode is formed with indium-tin oxide formed by doping tin into indium oxide, or tin oxide.

26. An optical device as claimed in claim 23, wherein the second layer of the reference electrode is formed with silicon nitride or amorphous silicon.

27. An optical device as claimed in claim 23, wherein the second layer is disposed as an adhesion layer of the first layer to a substrate.

28. An optical device as claimed in claim 19, wherein the reference electrode has, on the single layer or the laminate structure, a third layer comprising a material different from that of the layer.

29. An optical device as claimed in claim 28, wherein the third layer comprises a metal dissolved in the electrolyte.

30. An optical device as claimed in claim 29, wherein the electrolyte is a silver salt solution and the third layer comprises silver.

31. An optical device as claimed in claim 28, wherein the third layer comprises a conductive layer containing silver particles.

32. An optical device as claimed in claim 28, wherein the third layer contains a carbonaceous material.

33. An optical device as claimed in claim 28, wherein the third layer contains a binder.

34. An optical device as claimed in claim 20, wherein the single layer or the first layer is formed by a gas phase film forming method, a plating method or a sol-gel method.

35. An optical device as claimed in claim 23, wherein the second layer is formed by a gas phase film forming method, a plating method or a sol-gel method.

36. An optical device as claimed in claim 28, wherein the third layer is formed by a gas phase film forming method, a plating method or a sol-gel method.

37. An optical device as claimed in claim 18, wherein no substantial angled corner is present at the end edge of the counter electrode.

38. An optical device as claimed in claim 18, wherein each of the peripheral edge or the peripheral portions of the working electrode, the counter electrode and the reference electrode is covered with a shading layer, and each of main surfaces of the electrodes is present at a position nearer to a substrate than a surface of the shading layer.

39. An optical device as claimed in claim 38, wherein the shading layer comprises a black resist.

40. An optical device as claimed in claim 18, wherein the device comprises a pair of transparent or semi-transparent substrates opposed to each other, at least one pair of transparent or semi-transparent working electrodes disposed to the opposing surfaces of the pair of transparent or semi-transparent substrate respectively and opposed to each other, the electrolyte comprising a silver salt disposed in contact with the pair of working electrodes, the counter electrodes and the reference electrodes disposed in contact with the electrolyte and disposed to the periphery of the working electrode.

41. An optical device as claimed in claim 18, wherein the external circuit comprises a measuring unit for measuring the potential difference of the working electrode and/or the counter electrode relative to the reference electrode.

42. An optical device as claimed in claim 18, wherein the external circuit comprises control means for controlling the potential difference of the working electrode and/or the counter electrode relative to the reference electrode within a predetermined range.

43. A method of fabricating an optical device having a working electrode, a counter electrode and a reference electrode in which an electrolyte is disposed in contact with both of the electrodes and light can be controlled electrochemically by controlling an electric field applied to the electrolyte, wherein the method comprises:

a step of depositing a material of higher standard electrode potential than that of a metal dissolved in the electrolyte on a substrate by a gas phase film forming method, a plating method or a sol-gel method thereby forming a counter electrode material layer and/or a reference electrode material layer, a step of patterning the counter electrode material layer and/or the reference electrode material layer thereby forming the counter electrode and/or the reference electrode, and a step of covering the peripheral edge or the peripheral portion of the counter electrode and/or the reference electrode with a shading layer.

44. A method of fabricating an optical device as claimed in claim 43, wherein the counter electrode material layer and/or the reference electrode is patterned, then the entire surfaces covered with the shading layer and, subsequently, a region of the shading layer on the main surface of the counter electrode and/or the reference electrode is removed.

45. A method of fabricating an optical device as claimed in claim 43, which comprises forming the counter electrode and/or the reference electrode with a single or a laminate structure having at least two layers, forming the single layer or a first layer of the laminate structure present on the side of the electrolyte with a material of higher standard electrode potential than a metal dissolved in the electrolyte and forming a second layer covered by the first layer with a metal of an oxide thereof different from the material of the first layer by a gas phase film forming method, a plating method or a sol-gel method.

46. A method of fabricating an optical device as claimed in claim 43, wherein the method comprises forming a material layer for forming the second layer on the substrate by a gas phase film forming method, a plating method or a sol-gel method, patterning the material layer thereby forming the second layer, then depositing the forming material for the first layer over the entire surface in a state of covering the second layer other than the main surface with a photo-resist by a gas phase film forming method or the deposited film by a lift-off method of removing the photo-resist thereby forming the counter electrode and/or the reference electrode and, further, covering the entire surface with a photo-resist and removing a portion of the photo-resist on the main surface of the counter electrode and/or the reference electrode.

47. A method of fabricating an optical device as claimed in claim 45, wherein the single layer or the first layer of the counter electrode and/or the reference electrode is formed with at least one member selected from the group consisting of palladium, platinum and gold.

48. A method of fabricating an optical device as claimed in claim 45, wherein the single layer or the first layer of the reference electrode is formed with indium tin oxide formed by doping tin into indium oxide.

49. A method of fabricating an optical device as claimed in claim 45, wherein the second layer of the counter electrode and/or the reference electrode is formed with at least one metal selected from the group consisting of titanium, chromium and tungsten.

50. A method of fabricating an optical device as claimed in claim 45, wherein the second layer of the counter electrode and/or the reference electrode is formed with indium tin oxide formed by doping indium to tin oxide, or tin oxide.

51. A method of fabricating an optical device as claimed in claim 45, wherein the second layer of the counter electrode and/or the reference electrode is formed with silicon nitride or amorphous silicon.

52. A method of fabricating an optical device as claimed in claim 45, wherein the second layer is disposed as an adhesion layer of the first layer to the substrate.

53. A method of fabricating an optical device as claimed in claim 45, wherein the counter electrode and/or the reference electrode has, on the single layer or the first layer, a third layer comprising a material different from that of the layer.

54. A method of fabricating an optical device as claimed in claim 45, wherein the third layer comprises a metal dissolved in the electrolyte.

55. A method of fabricating an optical device as claimed in claim 45, wherein the third layer is formed by a gas phase film forming method, a plating method or a sol-gel method.

56. A method of fabricating an optical device as claimed in claim 43, wherein each of the peripheral edge or the peripheral portion of the working electrode and the counter electrode and/or the reference electrode is covered with a shading layer, and each of the main surfaces of the working electrode and the counter electrode and/or the reference electrode is present at a position nearer to the substrate than the surface of the shading layer.

57. A method of fabricating an optical device as claimed in claim 43, wherein the shading layer comprises a black resist.

58. A method of fabricating an optical device as claimed in claim 43, wherein the method, upon forming the working electrode and the counter electrode and/or the reference electrode, comprises:

a step of forming a forming material layer for the working electrode and a wiring material layer for the working electrode in this order on a substrate by a gas phase film forming method, a step of patterning the material layers each in an identical shape, a step of etching the wiring material layer in a state of covering areas other than the peripheral edge and the wiring region of the wiring material layer in the region of the working electrode and the counter electrode and/or the reference electrode with a mask, leaving the wiring material layer only in the peripheral edge and the wiring region in the region of the working electrode and the counter electrode and/or the reference electrode, thereby forming the second layer for the working electrode and the counter electrode and/or the reference electrode, and the wirings of those electrodes, a step of removing the mask and then depositing the first layer forming material over the entire surface in a state of the area other than the main surface of the second layer of the counter electrode and/or the reference electrode with a mask by gas phase film forming method, a step of removing the mask together with the first layer forming material thereabove by a lift-off method thereby forming the first layer of the counter electrode and/or the reference electrode, a step of covering the entire surface with a shading layer, and a step of removing a predetermined portion of the shading layer thereby exposing each of the main surfaces of the first layer of the working electrode and the counter electrode and/or the reference electrode.

59. A method of fabricating an optical device as claimed in claim 43, wherein a transparent or semi-transparent working electrode is formed on the transparent or semi-transparent substrate, the counter electrode and/or the reference electrode is formed to the periphery of the working electrode, a pair of the substrates each having the working electrode and the counter electrode and/or the reference electrode are opposed to each other and the electrolyte is sealed between the substrates being in contact with the working electrode and the counter electrode and/or the reference electrode.

60. A method of fabricating an optical device having a reference electrode other than a working electrode and a counter electrode in which an electrolyte is disposed in contact with the electrodes and light can be controlled electrochemically by controlling an applied potential on the working electrode and/or the counter electrode relative to the reference electrode, wherein the method comprises:

a step of depositing a transition metal or an electrically conducting metal oxide by a gas phase film forming method, a plating method or a sol-gel method thereby forming a reference electrode current collector layer, a step of patterning the reference electrode current collector layer thereby forming the reference electrode current collector layer, a step of covering the peripheral edge or the peripheral portion of the reference electrode with a shading layer, and a step of covering the portion of the reference electrode current collector layer with a layer, including conducting particles.

61. A method of driving an optical device having at least a working electrode and a counter electrode in contact with an electrolyte in which light is controlled by reversible electrolytic deposition and dissolution from the electrolyte to the surface of the working electrode, wherein a reduction potential is applied to the counter electrode when metal deposited/dissolved to the working electrode is eliminated from the dipped surface of the counter electrode and the metal is deposited to the counter electrode.

62. A method of driving an optical device as claimed in claim 61, wherein the elimination of the metal is detected by the dipping potential of the counter electrode in the electrolyte.

63. A method of driving an optical device having a working electrode, a counter electrode and a reference electrode having no concern with electrolytic deposition in contact with an electrolyte in which light is controlled by reversible electrolytic deposition and dissolution from the electrolyte to the surface of the working electrode, wherein the method comprising:

detecting a potential difference of the working electrode to the reference electrode, and controlling the current supply to the working electrode and the counter electrode upon reversible electrolytic deposition/dissolution to the surface of the working electrode so as to keep the potential difference within a predetermined range.

64. A camera system including an optical device having at least a working electrode and a counter electrode in which an electrolyte is disposed in contact with both of the electrodes and light can be controlled electrochemically by controlling an electric field applied to the electrolyte, wherein the counter electrode comprises a single layer or a laminate structure having at least two layers, and the single layer or a first layer in the laminate structure present on a side of the electrolyte contains a metal having a lower ionization tendency than that of a metal dissolved in the electrolyte.

65. A camera system as claimed in claim 64, wherein the electrolyte is a silver salt solution.

66. A camera system as claimed in claim 65, wherein the single layer or the first layer of the counter electrode is formed with at least one member selected from the group consisting of palladium, platinum and gold.

67. A camera system as claimed in claim 64, wherein a second layer covered by the first layer comprises at least one material selected from the group consisting of a metal, a metal oxide and an insulator different from that of the first layer.

68. A camera system as claimed in claim 67, wherein the second layer of the counter electrode is formed with at least one metal selected from the group consisting of titanium, chromium and tungsten.

69. A camera system as claimed in claim 67, wherein the second layer of the counter electrode is formed with indium-tin oxide formed by doping tin into indium oxide, or tin oxide.

70. A camera system as claimed in claim 67, wherein the second layer of the counter electrode is formed with silicon nitride or amorphous silicon.

71. A camera system as claimed in claim 67, wherein the second layer is disposed as an adhesion layer of the first layer to a substrate.

72. A camera system as claimed in claim 64, wherein the counter electrode has, on the single layer or the first layer, a third layer comprising a material different from that of the layer.

73. A camera system as claimed in claim 72, wherein the third layer comprises a metal dissolved in the electrolyte.

74. A camera system as claimed in claim 73, wherein the electrolyte is a silver solution and the third layer comprises silver.

75. A camera system as claimed in claim 64, wherein the single layer or the first layer and the second layer is formed by a gas phase film forming method, a plating method or a sol-gel method.

76. A camera system as claimed in claim 72, wherein the third layer is formed by a gas phase film forming method, a plating method or a sol-gel method.

77. A camera system as claimed in claim 64, wherein no substantial angled corner is present at the end edge of the counter electrode.

78. A camera system as claimed in claim 64, wherein each of the peripheral edge or the peripheral portions of the working electrode and the counter electrode is covered with a shading layer, and each of main surfaces of the working electrode and the counter electrode is present at a position nearer to a substrate than the surface of the shading layer.

79. A camera system as claimed in claim 78, wherein the shading layer comprises a black resist.

80. A camera system as claimed in claim 64, wherein the device comprises a pair of transparent or semi-transparent substrates opposed to each other, at least one pair of £transparent or semi-transparent working electrodes disposed to the opposing surfaces of the pair of transparent or semi-transparent substrate respectively and opposed to each other, the electrolyte comprising a silver salt disposed in contact with the pair of working electrodes and the counter electrodes disposed in contact with the electrolyte and disposed to the periphery of the working electrode.

81. A camera system including an optical device having a working electrode and a counter electrode in which an electrode is disposed in contact with both of the electrodes and light can be controlled electrochemically by controlling an electric field applied to the electrolyte, wherein the device further comprises:

a reference electrode disposed in contact with the electrolyte for monitoring the potential of the working electrode and/or the counter electrode, and an external circuit electrically connecting the reference electrode with the working electrode and/or the counter electrode.

82. A camera system as claimed in claim 81, wherein the reference electrode comprises a single layer or a laminate structure having at least two layers.

83. A camera system as claimed in claim 82, wherein the single layer or a first layer of the laminate structure present on a side of the electrolyte contains a material of higher standard electrode potential than a metal dissolved in the electrolyte.

84. A camera system as claimed in claim 83, wherein the metal dissolved in the electrolyte is silver.

85. A camera system as claimed in claim 84, wherein the single layer or the first layer of the reference electrode is formed with at least one member selected from the group consisting or palladium, platinum, gold, indium tin oxide by doping tin into indium oxide.

86. A camera system as claimed in claim 83, wherein the second layer covered by the first layer comprises at least one material selected from the group consisting of a metal, a metal oxide and an insulator different from the first layer.

87. A camera system as claimed in claim 86, wherein the second layer of the reference electrode is formed with at least one metal selected from the group consisting of titanium, chromium and tungsten.

88. A camera system as claimed in claim 86, wherein the second layer of the reference electrode is formed with indium-tin oxide formed by doping tin into indium oxide, or tin oxide.

89. A camera system as claimed in claim 86, wherein the second layer of the reference electrode is formed with silicon nitride or amorphous silicon.

90. A camera system as claimed in claim 86, wherein the second layer is disposed as an adhesion layer of the first layer to a substrate.

91. A camera system as claimed in claim 82, wherein the reference electrode has, on the single layer or the laminate structure, a third layer comprising a material different from that of the layer.

92. A camera system as claimed in claim 91, wherein the third layer comprises a metal dissolved in the electrolyte.

93. A camera system as claimed in claim 92, wherein the electrolyte is a silver salt solution and the third layer comprises silver.

94. A camera system as claimed in claim 91, wherein the third layer comprises a conductive layer containing silver particles.

95. A camera system as claimed in claim 91, wherein the third layer contains a carbonaceous material.

96. A camera system as claimed in claim 91, wherein the third layer contains a binder.

97. A camera system as claimed in claim 83, wherein the single layer or the first layer is formed by a gas phase film forming method, a plating method or a sol-gel method.

98. A camera system as claimed in claim 96, wherein the second layer is formed by a gas phase film forming method, a plating method or a sol-gel method.

99. A camera system as claimed in claim 91, wherein the third layer is formed by a gas phase film forming method, a plating method or a sol-gel method.

100. A camera system as claimed in claim 81, wherein no substantial angled corner is present at the end edge of the counter electrode.

101. A camera system as claimed in claim 81, wherein each of the peripheral edge or the peripheral portions of the working electrode, the counter electrode and the reference electrode is covered with a shading layer, and each of main surfaces of the electrodes is present at a position nearer to a substrate than a surface of the shading layer.

102. A camera system as claimed in claim 100, wherein the shading layer comprises a black resist.

103. A camera system as claimed in claim 81, wherein the device comprises a pair of transparent or semi-transparent substrates opposed to each other, at least one pair of transparent or semi-transparent working electrodes disposed to the opposing surfaces of the pair of transparent or semi-transparent substrate respectively and opposed to each other, the electrolyte comprising a silver salt disposed in contact with the pair of working electrodes, the counter electrodes and the reference electrodes disposed in contact with the electrolyte and disposed to the periphery of the working electrode.

104. A camera system as claimed in claim 81, wherein the external circuit comprises a measuring unit for measuring the potential difference of the working electrode and/or the counter electrode relative to the reference electrode.

105. A camera system as claimed in claim 81, wherein the external circuit comprises control means for controlling the potential difference of the working electrode and/or the counter electrode relative to the reference electrode within a predetermined range.

\* \* \* \* \*

UNITED STATES PATENT AND TRADEMARK OFFICE
CERTIFICATE OF CORRECTION

PATENT NO. : 6,336,753 B1
DATED : January 8, 2002
INVENTOR(S) : Toru Kihira and Toru Udaka It is certified that error appears in the above-identified patent and that said Letters Patent is hereby corrected as shown below:

Column 13,
Line 31, insert -- FIG. 36 is a block diagram of the camera system of Example 10 --

Column 41,
Line 62, delete "A" and insert -- The --
Line 63, after "device" insert -- 88 --
Line 66, after "filter" insert -- 87 --

Column 42,
Line 62, insert -- Fig. 36 is a block diagram of a driving circuit constituting a camera system according to the present invention. --
Line 1, after "section" insert -- 89 --
Line 2, after "section" insert -- 90 --
Line 3, after "controller" insert -- 95 --
Line 4, after "circuit" insert -- 97 --
Line 5, after "electrode" insert -- 86 --
Line 6, after "electrode" insert -- 84 --
Line 8, after "35" insert -- 83 --
Line 9, after "volmeter" insert -- 92 --
Line 11, after "source" insert -- 91 --
Line 11, after "limiter" insert -- 93 --
Line 12, after "generator" insert -- 94 --
Line 13, after "cell" insert -- 83 --
Line 16, after "group" insert -- 81 --
Line 17, after "group" insert -- 82 --
Line 31, after "cell" insert -- 83 --

Signed and Sealed this

Tenth Day of September, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,336,753 B1
DATED         : January 8, 2002
INVENTOR(S)   : Toru Kihira and Toru Udaka It is certified that error appears in the above-identified patent and that said Letters Patent is hereby corrected as shown below:

Column 13,
Line 31, insert -- FIG. 36 is a block diagram of the camera system of Example 10 --

Column 41,
Line 62, delete "A" and insert -- The --
Line 63, after "device" insert -- 88 --
Line 66, after "filter" insert -- 87 --

Column 42,
Line 62, insert -- Fig. 36 is a block diagram of a driving circuit constituting a camera system according to the present invention. --
Line 1, after "section" insert -- 89 --
Line 2, after "section" insert -- 90 --
Line 3, after "controller" insert -- 95 --
Line 4, after "circuit" insert -- 97 --
Line 5, after "electrode" insert -- 86 --
Line 6, after "electrode" insert -- 84 --
Line 8, after "35" insert -- 83 --
Line 9, after "volmeter" insert -- 92 --
Line 11, after "source" insert -- 91 --
Line 11, after "limiter" insert -- 93 --
Line 12, after "generator" insert -- 94 --
Line 13, after "cell" insert -- 83 --
Line 16, after "group" insert -- 81 --
Line 17, after "group" insert -- 82 --

UNITED STATES PATENT AND TRADEMARK OFFICE
CERTIFICATE OF CORRECTION

PATENT NO. : 6,336,753 B1
DATED : January 8, 2002
INVENTOR(S) : Toru Kihira and Toru Udaka It is certified that error appears in the above-identified patent and that said Letters Patent is hereby corrected as shown below:

<u>Column 42 (cont'd),</u>
Line 31, after "cell" insert -- 83 --
Line 35, after "generator" insert -- 94 --; and
Line 36, after "section" insert -- 97 --.

This certificate supersedes Certificate of Correction issued September 10, 2002.

Signed and Sealed this

Sixth Day of May, 2003

JAMES E. ROGAN
*Director of the United States Patent and Trademark Office*